(12) United States Patent
Sun et al.

(10) Patent No.: US 10,853,730 B2
(45) Date of Patent: Dec. 1, 2020

(54) SYSTEMS AND METHODS FOR GENERATING A BRAND BAYESIAN HIERARCHICAL MODEL WITH A CATEGORY BAYESIAN HIERARCHICAL MODEL

(71) Applicant: Google LLC, Mountain View, CA (US)

(72) Inventors: Yunting Sun, Jersey City, NJ (US); David Chan, Milburn, NJ (US); James Koehler, Boulder, CO (US); Yuxue Jin, Short Hills, NJ (US); Yueqing Wang, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 670 days.

(21) Appl. No.: 15/704,939

(22) Filed: Sep. 14, 2017

(65) Prior Publication Data

US 2019/0080246 A1    Mar. 14, 2019

(51) Int. Cl.
*G06N 5/02* (2006.01)
*G06Q 30/02* (2012.01)

(52) U.S. Cl.
CPC ......... *G06N 5/022* (2013.01); *G06Q 30/0201* (2013.01); *G06Q 30/0202* (2013.01); *G06Q 30/0242* (2013.01)

(58) Field of Classification Search
USPC .......................................................... 706/46
See application file for complete search history.

(56) References Cited

U.S. PATENT DOCUMENTS

| 445,388 | A | * | 1/1891 | Block | A47B 88/941 312/330.1 |
| 9,269,051 | B2 | * | 2/2016 | Guo | G06N 7/005 |
| 9,775,506 | B2 | * | 10/2017 | Burlina | A61B 3/10 |

(Continued)

FOREIGN PATENT DOCUMENTS

WO    WO 2017/070555 A1    4/2017

OTHER PUBLICATIONS

Ataman, M.B., Van Heerfe, H.J., & Mela, C.F. (2010). The long-term effect of marketing strategy on brand sales. Journal of Marketing Research, 47(5), 866-882.

(Continued)

*Primary Examiner* — Michael B Holmes
(74) *Attorney, Agent, or Firm* — Foley & Lardner LLP

(57) ABSTRACT

Systems, methods, and computer-readable storage media that may be used to generate a category Bayesian hierarchical model. One method includes receiving a brand data set for each of a plurality of brands within a category, each brand data set comprising content input for a particular brand of the plurality of brands for a plurality of media channels at a plurality of times and a response for the particular brand of the plurality of brands at the plurality of times. The method includes determining a plurality of informative priors by generating a category Bayesian hierarchical model based on the plurality of brand data sets and a plurality of weak priors. The method further includes generating a brand Bayesian hierarchical model that models response for the particular brand for each of the plurality of media channels based on the brand data set for the particular brand and the plurality of informative priors.

20 Claims, 37 Drawing Sheets

(56) References Cited

U.S. PATENT DOCUMENTS

| | | | |
|---|---|---|---|
| 9,892,367 B2* | 2/2018 | Guo | G06F 16/9558 |
| 10,282,357 B1* | 5/2019 | Halpin, Jr. | G06F 16/2379 |
| 10,325,183 B2* | 6/2019 | Swaminathan | B01L 9/06 |
| 10,706,191 B2* | 7/2020 | Sun | G06T 7/11 |

OTHER PUBLICATIONS

Blake, T., Nosko, C., & Tadelis, S. (2015). Consumer heterogeneity and paid search effectiveness: a large-scale field experiment. Econometrica, 83(1), 155-174.

Borden, N. H. (1964). The concept of the marketing mix. Journal of Advertising Research, 4(2), 2-7.

Cain, P.M. (2005). Modelling and forecasting brand share: a dynamic demand system approach. International Journal of Research in Marketing, 22(2), 203-220.

Chan, D. & Perry, M. (2017). Challenges and opportunities in media mix modeling. research.google.com.

Chen, A., Chan, D., Perry, M., Jin, Y., Sun, Y., Wang, Y., & Koehler, J. (2017) Bias correction for paid search in media mix modeling. Forthcoming on https://research.google.com.

Dekimpe, M.G. & Hanssens, D.M. (1999). Sustained spending and persistent response: a new look at long-term marketing profitability. Journal of Marketing Research, 36(4), 397-412.

Dekimpe, M.G. & Hanssens, D.M. (2000). Time-series models in marketing: past, resent and future. International Journal of Research in Marketing, 17(2-3), 183-193.

Ehrenberg, A. & Barnard, N. (2000). Problems with marketing's 'decision' model. ANZMAC.

Foll, M. & Gaggiotti, O. (2008).A genome-scan method to identify selected loci appropriate for both dominant and codominant markers: a Bayesian perspective. Genetics, 180, 977-993.

Gelman, A. & Hill, J. (2006). Data analysis using regression and multilevel/hierarchical models (1st ed.). Cambridge University Press.

Gesztelyi, R., Zsuga, J., Kemeny-Beke, A., Varga, B., Juhasz, B., & Tosaki, A. (2012). The Hill equation and the origin of quantitative pharmacology. Archive for History of Exact Sciences, 66(4), 427-438.

Jastram, R.W. (1955). A treatment of distributed lags in the theory of advertising expenditure. Journal of Marketing, 20(1):36-46.

Jin, Y., Wang, Y., Sun, Y., Chan, D., & Koehler, J. (2017). Bayesian methods for media mix modeling with carryover and shape effects. research.google.com.

Leeflang, P.S.H., Bijmolt, T.H.A., Van Doorn, J., Hanssens, D.M., Van Heerde, H.J., Verhoef, P.C. & Wieringa, J.E. (2009). Creating lift versus building the base: current trends in marketing dynamics. International Journal of Research in Marketing, 26(1), 13-20.

Lewis, R.A. & Rao, J.M. (2015). The unfavorable economics of measuring the returns to advertising. Quarterly of Economics, 130(4), 1941-1973.

Li, F.-F. & Perona, P. (2005). A Bayesian hierarchical model for learning natural scene categories. In Proceedings of the 2005 ieee computer society conference on computer vision and pattern recognition.

Little, J.D.C. (1979). Aggregate advertising models: The state of the art . Operations Research, 27(4):629-667.

Mela, C.F., Gupta, S., & Lehmann, D.R. (May 1997). The long-term impact of promotion and advertising on consumer brand choice. Journal of Marketing Research, 34(2), 248-261.

Nisbett, R.E. & Wilson, T.D. (1977). The halo effect: evidence for unconscious alteration of judgments. Journal of personality and social psychology, 35(4), 250-256.

Palda, K.S. (1965). The measurement of cumulative advertising effects. The Journal of Business, 38(2), 162-179.

Quandt, R.E.(1964). Estimating the effectiveness of advertising: some pitfalls in econometric methods. Journal of Marketing Research, 1920, 51-60.

Rossi, P.E., Allenby, G.M., & McCulloch, R. (2005). Bayesian statistics and marketing. Chichester England: Wiley-Interscience. (Book).

Stan Development Team. (2015). Stan modeling language user's guide and reference manual, version 2.10.0.

Stephens-Davidowitz, S., Varian, H., & Smith, M.D. (2017. Super returns to Super Bowl ads? Quantitative Marketing and Economics, 15(1).

Sun, Y., Wang, Y., Jin, Y., Chan, D., & Koehler, J. (2017). Geo-level Bayesian hierarchical media mix modeling.

Tellis, G.J. (2006). Modeling marketing mix. In R. Grover & M. Vriens (Eds.), Handbook of marketing research: uses, misuses, and future advances (pp. 506-522). Thousand Oaks, CA.

Vaver, J. & Koehler, J. (2011). Measuring ad effectiveness using geo experiments.

Yildiz, I.B., von Kriegstein K., & Kiebel, S.J. (2013). From birdsong to human speech recognition: Bayesian inference on a hierarchy of nonlinear dynamical systems.

International Search Report and Written Opinion, pp. 1-56, dated Aug. 14, 2018.

* cited by examiner

FIG. 22

SYSTEMS AND METHODS FOR GENERATING A BRAND BAYESIAN HIERARCHICAL MODEL WITH A CATEGORY BAYESIAN HIERARCHICAL MODEL

BACKGROUND

A Bayesian model is a model that is generated based on priors and gathered data. Specifically, the Bayesian model may include one or more parameters that are modeled with posterior distributions. The posterior distributions may be based on prior distributions for the one or more parameters and data gathered for the one or more parameters. A prior is a probability distribution that models one of the parameters, it is a belief regarding a parameter before data is gathered for said parameter. Experiments (or otherwise data collection) can be performed for the various parameters. Based on the collected or experimental data and the priors, posteriors can be determined. A posterior may be a probability distribution that is based on both the prior and the collected data.

SUMMARY

One illustrative method includes receiving a brand data set for each of a plurality of brands within a category, each brand data set including content input for a particular brand of the plurality of brands for a plurality of media channels at a plurality of times and a response for the particular brand of the plurality of brands at the plurality of times. The method includes determining a plurality of informative priors by generating a category Bayesian hierarchical model based on the plurality of brand data sets for the plurality of brands and a plurality of weak priors. The method further includes generating a brand Bayesian hierarchical model that models response for the particular brand for each of the plurality of media channels based on the brand data set for the particular brand and the plurality of informative priors. Generating the brand Bayesian hierarchical model based on the informative priors provides data anonymity of the plurality of brand data sets from the brand data set of the particular brand.

Some implementations relate to a system with at least one computing device operably coupled to at least one memory The computing device is configured to receive a brand data set for each of a plurality of brands within a category, each brand data set comprising content input for a particular brand of the plurality of brands for a plurality of media channels at a plurality of times and a response for the particular brand of the plurality of brands at the plurality of times. The computing device is configured to determine a plurality of informative priors by generating a category Bayesian hierarchical model based on the plurality of brand data sets for the plurality of brands and a plurality of weak priors. The computing device is further configured to generate a brand Bayesian hierarchical model that models response for the particular brand for each of the plurality of media channels based on the brand data set for the particular brand and the plurality of informative priors. Generating the brand Bayesian hierarchical model based on the informative priors provides data anonymity of the plurality of brand data sets from the brand data set of the particular brand.

Some implementations relate to one or more computer-readable storage media having instructions stored thereon. When executed by at least one processor, the instructions cause the at least one processor to perform operations including receiving a brand data set for each of a plurality of brands within a category, each brand data set including content input for a particular brand of the plurality of brands for a plurality of media channels at a plurality of times and a response for the particular brand of the plurality of brands at the plurality of times. The operations further include determining a plurality of informative priors by generating a category Bayesian hierarchical model based on the plurality of brand data sets for the plurality of brands and a plurality of weak priors. The operations further include generating a brand Bayesian hierarchical model that models response for the particular brand for each of the plurality of media channels based on the brand data set for the particular brand and the plurality of informative priors, wherein generating the brand Bayesian hierarchical model based on the informative priors provides data anonymity of the plurality of brand data sets from the brand data set of the particular brand. Generating the brand Bayesian hierarchical model that models response for a particular brand of the plurality of brands for each of the plurality of media channels includes generating a joint empirical distribution based on the plurality of informative priors and generating the brand Bayesian hierarchical model for the particular brand based on the brand data set for the particular brand of the plurality of brands and the joint empirical distribution.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 22 is a chart illustrating content input for multiple media channels for the shampoo brands according to an illustrative implementation.

DETAILED DESCRIPTION

Figure 1:
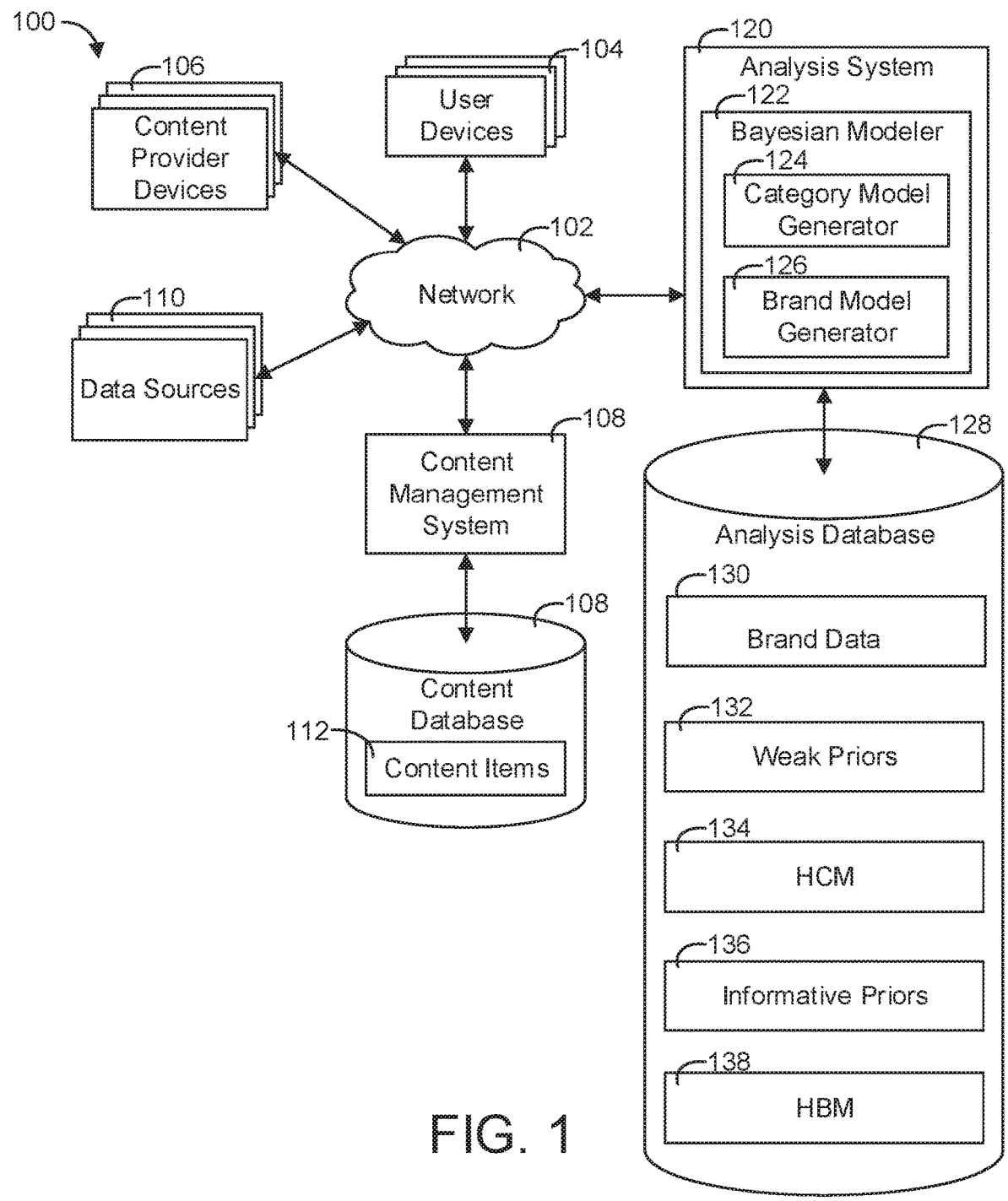
FIG. 1 is a block diagram of an analysis system including a Bayesian modeler and associated environment according to an illustrative implementation.

Referring generally to the Figures, various illustrative systems and methods for generating a brand hierarchical Bayesian model with informative priors generated by a category Bayesian hierarchical model are shown. A hierarchical Bayesian model may be a Bayesian model that has a hierarchy of model levels or "sub-models." Bayesian hierarchical models are used to generate posterior distributions for parameters of the model based on collected data for said parameters and a prior distribution for said parameters. In a hierarchical Bayesian model, the prior distribution may have its own parameters, referred to as hyper-parameters. In this regard, the hyper-parameters themselves may be trained based on data and priors for said hyper-parameters, referred to as a hyper-priors.

A category Bayesian hierarchical media mix model can be generated based on the systems and methods discussed herein. The category Bayesian hierarchical media mix model can be generated based on weak (e.g., non-informative) priors and can be generated based on data for a particular product category (e.g., data for companies that sell shampoo, data for companies that sell soda, etc.). The posteriors that are generated for the parameters of the category Bayesian hierarchical media mix model can be generated based on the weak priors and the category level data. The posteriors generated for the category Bayesian hierarchical media mix model can be used as (or used to generate) informative priors for generating a specific brand Bayesian hierarchical media mix model. For example, if the category Bayesian hierarchical model is generated based on soda sales (e.g., response data) and ad spend data (e.g., content input data) for one or more soda brands, a brand Bayesian hierarchical model can be generated for one specific soda brand using the posteriors of the category Bayesian hierarchical model and data for the specific soda brand. In this way, the posteriors of the category Bayesian hierarchical model can act as informative priors for the brand specific Bayesian hierarchical model.

In developing media mix models, the data that is generally available to a modeler may lack sufficient quantity and information content to reliably estimate parameters of a model of moderate complexity. Pooling data from different brands within the same product category provides more observations and greater variability in media spend patterns. The results from a hierarchical Bayesian model built on the category dataset can be either directly used or the information learned from the category model can be passed to a brand-specific media mix model via informative priors within a Bayesian framework. This informative prior "proxy" can be used where data sharing restrictions are active across brands.

The systems and methods described herein can be tested using both simulation and real case studies that to show that category analysis can improve parameter estimation and reduce uncertainty of model prediction and extrapolation. Media Mix Models (MMMs) can be used as the basis for understanding the effect different media types have on Key Performance Indices (KPIs, e.g. sales, response), as well as for optimizing media mix for maximal KPI. Several challenges may be present when developing MMMs. One challenge may be the lack of data with sufficient information to adequately estimate a model with the many parameters required to account for the all media types modern advertisers utilize.

Media mix studies may be based on nationally aggregated weekly data over 2 to 5 years or monthly data over 4 to 6 years resulting in about 50 to 250 observations, in some implementations. If data is available for a longer duration, e.g., more than 10 years, it may not be desirable as the market dynamics could have shifted drastically during that time. Various restrictions on data availability and relevancy leaves a very modestly sized dataset for developing a MMM, given that the number of media types involved can be as many as 20 or more, and that media effects tend to be significantly smaller than some non-media factors, such as price or retailer promotion (e.g., retailer feature or special display of the products).

Moreover, advertisers often align their media spending with the underlying seasonality of their products or brands historically established promotion cycles. Advertisers also tend to resist significantly varying their spend from historic patterns due to planning inertia, lack of quantitative knowledge on media's true effects, and an aversion to risk of misspending. Such advertising behaviors can often lead to highly correlated observations of media spend that vary within a relatively small range, making it almost impossible to distinguish each media's impact on key performance indicators (KPIs), manifesting as large model estimation and extrapolation uncertainties.

One approach to address the problem of data sparsity is to inject variability through randomized experiments, in particular geo experiments. These experiments involve assigning non-overlapping geographic regions to either a control or treatment group, modifying advertising level on a certain media channel in the treatment region, and measuring the KPI against the unchanged control regions. Given the complex structures of media spending, however, not all advertisers can afford or would want to run experiments across all of their adopted media channels for sufficiently long time periods.

If experiments are expensive and difficult to scale, observational data can be collected with sufficient natural variability to measure the effectiveness of ads. Some possible solutions may include observing "a natural experiment" over special events, or using data collected at a finer geographic granularity.

Pooling datasets from multiple brands within a product category can be performed to form a joint dataset with more independent variation and a wider range of media spend and potential control factors, e.g., product price. A hierarchical Bayesian model can be used to represent the category-brand relationship. There may be many types of models in addition to hierarchical Bayesian models that can be used to model data. The benefits of pooling multiple brand datasets, and passing information learned from a category to a brand, may be useful regardless of the specific model family used to describe the data.

The systems and methods discussed herein may assume that media effects on sales are similar across brands within the category, in some implementations. Therefore, media similarity can be used as a guideline for conducting category analysis on a group of entities, assessed from data and subject knowledge. If a group of entities have substantially diverse media responses, the systems and method discussed herein may need to be adjusted. For example, a subset of these entities among which media responses are similar can be considered. Two examples of pooling multiple brands within the same Consumer Packaged Goods (CPG) category, i.e. shampoo (FIGS. 21-25) and soda (FIGS. 26-30), are described herein. Such pooled datasets can be hard to acquire for individual advertisers due to cost, but may be accessible for some third-party MMM vendors.

When the assumption of similar media response within the category is reasonable, the high correlation between various media variables (sometimes including non-media variables) that often exist within a single brand can be reduced, by observing them along with the response variable (e.g., sales) over multiple brands in the category. More variation in the data can be expected, because different brands do not always share the same ad directing preferences and historical patterns in their media expenditure.

Category analysis may also provide an increase in the number of observations available for the model. In the case studies discussed herein, the category datasets can have more than ten times the number of observations than a single brand. An increase in sample size and improved variability allows for a better chance at understanding the effects of media on sales.

The pooled datasets for an approximation of the underlying demand of a product category can be leveraged, in terms of seasonality and long-term trend, using the total sales of all brands within the category. It is unlikely these brands share the same promotional activities, and thus their total sales may represent total demand for a category of products, rather than the brand's individual traits.

One further advantage of category analysis is the ability to incorporate competitive factors, e.g., impact across brands, into an MMM. Developing MMMs for a single brand can suffer from omitted variables, of which competitive factors, such as competitor price and promotion, are common ones. In category analysis, impact from competitor activities on a brand of interest can be explicitly included in the model to help reduce bias in parameter estimates.

One barrier to directly using the MMM results based on the category datasets may be data sharing restrictions among different and often competing advertisers. An advertiser may allow its data to participate in establishing a category benchmark, but not to derive any brand-specific results other than for its own brand. Such restrictions may be common based for advertisers and MMM vendors. Where restrictions apply, condensing the information learned from a category dataset into Bayesian informative priors can be performed, which can then be used in a brand-specific MMM without directly accessing the data of the other brands.

Figure 6:
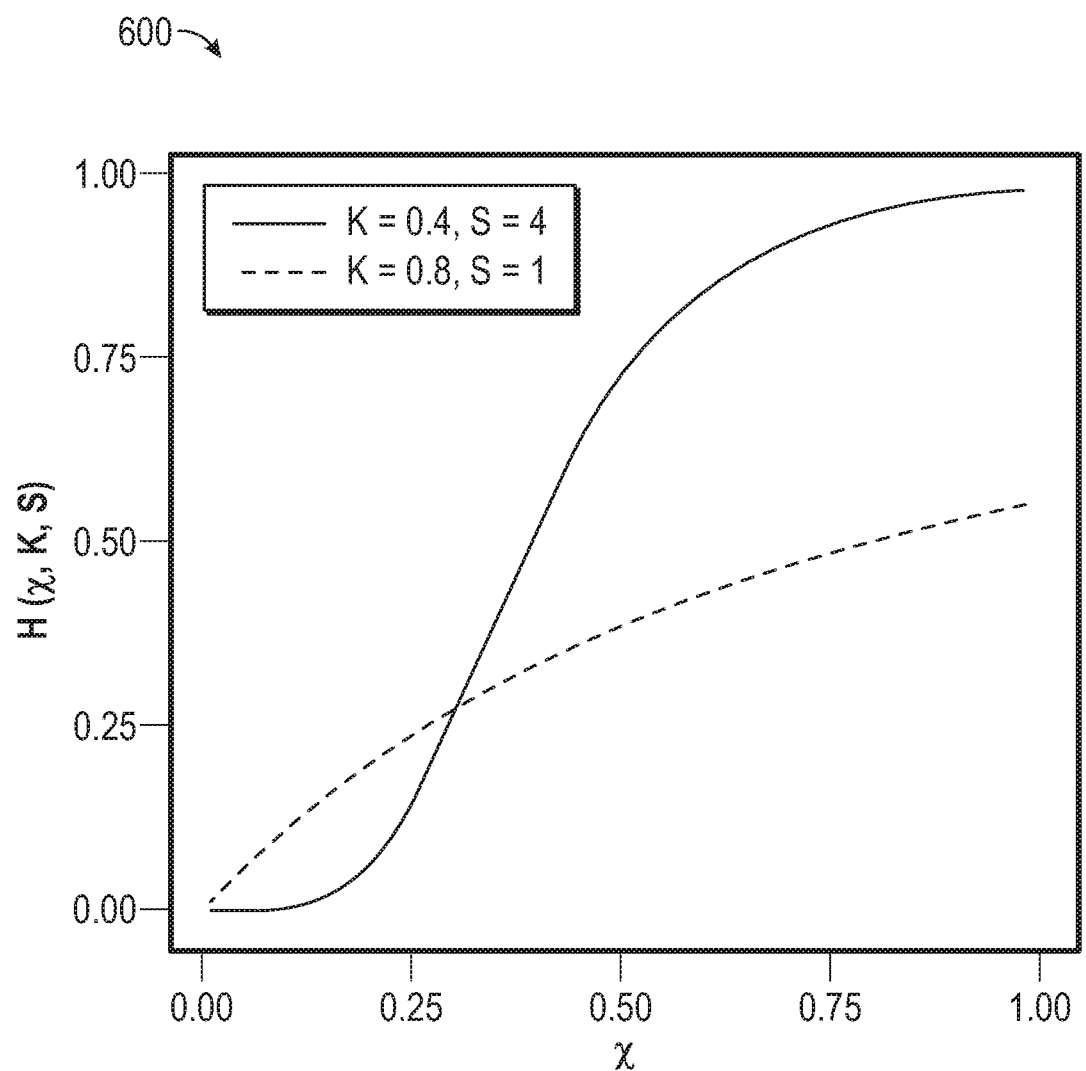
FIG. 6 is a chart illustrating a hill transformation with two different sets of parameters according to an illustrative implementation.

The discussion with reference to FIG. 6 introduces a framework of MMMs, which are used as an example to demonstrate the advantages of pooling multiple brand datasets in an MMM study. Further a discussion relating to hierarchical Bayesian modeling using a pooled dataset, extracting informative priors from the category results and utilizing the priors in brand-specific models is set forth herein. The discussion with reference to FIGS. 7-20 discuss analysis and model comparisons in four simulation scenarios. The discussion with reference to FIGS. 21-30 applies the systems and method discussed herein on two real case categories and compare brand MMMs using informative priors derived from the category versus weak priors.

Referring now to FIG. 1, a block diagram of an analysis system 120 and associated environment 100 is shown according to an illustrative implementation. One or more user devices 104 may be used by a user to perform various actions and/or access various types of content, some of which may be provided over a network 102 (e.g., the Internet, LAN, WAN, etc.). A "user" or "entity" used herein may refer to an individual operating user devices 104, interacting with resources or content items via the user devices 104, etc. The user devices 104 may be used to access websites (e.g., using an internet browser), media files, and/or any other types of content. A content management system 108 may be configured to select content for display to users within resources (e.g., webpages, applications, etc.) and to provide content items 112 from a content database 108 to the user devices 104 over the network 102 for display within the resources. The content from which the content management system 108 selects items may be provided by one or more content providers via the network 102 using one or more content provider devices 106.

In some implementations, the content management system 108 may select content items from content providers to be displayed on the user devices 104. In such implementations, the content management system 108 may determine content to be published in one or more content interfaces of resources (e.g., webpages, applications, etc.). The content management system 108 can be configured to conduct a content auction among third-party content providers to determine which third-party content is to be provided to the user device 104. The auction winner can be determined based on bid amounts and a quality score (i.e., a measure of how likely the user of the user device 104 is to click on the content). In some implementations, the content management system 108 allows content providers to create content campaigns. A campaign can include any number of parameters, such as a minimum and maximum bid amount, a target bid amount, or one or more budget amounts (e.g., a daily budget, a weekly budget, a total budget, etc.).

The analysis system 120 can include one or more processors (e.g., any general purpose or special purpose processor), and can include and/or be operably coupled to one or more transitory and/or non-transitory storage mediums and/or memories (e.g., any computer-readable storage media, such as a magnetic storage, optical storage, flash storage, RAM, etc.). In various implementations, the analysis system 120 and the content management system 108 can be implemented as separate systems or integrated within a single system (e.g., the content management system 108 can be configured to incorporate some or all of the functions/capabilities of the analysis system 120).

The analysis system 120 can be communicably and operatively coupled to the analysis database 128. The analysis system 120 can be configured to query the analysis database 128 for information and store information in the analysis database 128. In various implementations, the analysis database 128 includes various transitory and/or non-transitory storage mediums. The storage mediums may include but are not limited to magnetic storage, optical storage, flash storage, RAM, etc. The database 128 and/or the analysis system 120 can use various APIs to perform database functions (i.e., managing data stored in the database 128). The APIs can be but are not limited to SQL, ODBC, JDBC, etc.

The analysis system 150 can be configured to receive information from the network 102. The information may include browsing histories, cookie logs, television advertising data, printed publication advertising data, radio advertising data, online activity data and/or any other indication or interactions with an online resources that a user (i.e., user devices 104) may have on the network 102. The analysis system 120 can be configured to receive and/or collect the interactions that the user devices 104 have on the network 102. This information may be stored as brand data 130.

Data sources 110 may be data collectors or content providers that can provide advertising data to the analysis system 120. The data may be data for particular media channels e.g., television, Internet advertising, radio, billboards, printed publications (e.g., magazines and/or newspapers), etc. Data sources 110 may be also be various data aggregating systems and/or entities that collect advertising data. The analysis system 120 can receive the brand data 130 from the data sources 110 via the network 102. The brand data 130 may be data for a particular brand or brands. For example, brand A may have various content inputs (e.g., advertising spending amounts) and responses (e.g., revenue) for a one or more of points in time (e.g., the data may be a time series) for one or more media channels (e.g., Internet, television, radio, printed publications). Further, the brand data 130 may also include data for a brand B which may also include content inputs and responses. The brand data 130 may be advertising data for one or more particular categories. For example, brand A and brand B may be competitors, i.e., they may sell products within the same market space, e.g., they both sell soft drink products, shampoo products, toys, automobiles, etc.

The analysis system 120 can be configured to send information and/or notifications relating to various metrics or models it determines to the content provider devices 106. This may allow a user of one of the content provider devices 106 to review the various metrics or models which the analysis system 120 determines. Further, the analysis system 120 can use the various metrics to identify opportune times to make contact with a user or appropriate amounts to spend on various media channels (e.g., television advertising, Internet advertising, radio advertising, etc.). The analysis system 120 can cause a message to be sent to the content management system 108 and/or the content provider devices 106 indicating that the content management system 108 should make contact with a certain user at a certain time and/or a content campaign operate with certain parameters (e.g., certain amounts of advertising spend for certain media channels). This may cause the content management system 108 to manage content auctions accordingly and/or identify various system loads.

The analysis system 120 may include one or more modules (i.e., computer-readable instructions executable by a processor) and/or circuits (i.e., ASICs, Processor Memory combinations, logic circuits, etc.) configured to perform various functions of the analysis system 120. In some implementations, the modules may be or include a Bayesian modeler 122. The Bayesian modeler 122 is shown to include a category model generator 124 and a brand model generator 126.

The brand data 130 may include sets for different brands that each include responses, content inputs, a content types, and/or time identifiers. The content type may indicate a particular media channel of the set of data, for example, television, radio, Internet advertising, a particular advertising campaign, etc. The response may indicate particular amounts of revenue at particular times. In some embodiments, the response is number of conversions, number of sales, etc. The content inputs may indicate particular amounts of advertising spending for the content type at particular times. The content inputs may indicate a number of advertisements run. The time identifiers may indicate that there was a particular amount of response and content input for a particular content type for a particular brand. In this regard, the brand data 130 may be stored as time based vectors.

The Bayesian modeler 122 can be configured to generate Bayesian models, particularly hierarchical Bayesian models based on the brand data 130. More particularly, the category model generator 124 can be configured to generate a category hierarchical Bayesian media mix model, referred to herein as a hierarchical category model (HCM) 134, based on the brand data 130 and the weak priors 132. By generating the HCM 134, the category model generator 124 may generate informative priors 136. The informative priors may be trained versions of the weak priors 132, i.e., the informative priors may be (or can be generated from) posteriors of the HCM 134. Based on the informative priors 136, the brand model generator 126 can be configured to generate a brand hierarchical Bayesian media mix model, referred to herein as a hierarchical brand model (HBM) 138. More particularly, the brand model generator 126 can be configured to generate the HBM 138 based on the informative priors 136 and a particular data set of the brand data 130. The particular data sets may be data of a particular brand. In this regard, if there is a particular brand, e.g., "Brand 1," the Brand model generator 126 can be configure to generate the HBM 138 for "Brand 1" based on the informative priors 136 and the data of the brand data 130 i.e., for the "Brand 1." This may provide data anonymity between the entire set of brand data i.e., brand data 130, and the brand data for the particular brand that the HBM 138 is generated for. One or more HBM 138 models can be generated for different brands, in this regard, a HBM 138 may be a model including multiple specific models for the different brands.

Figure 2:
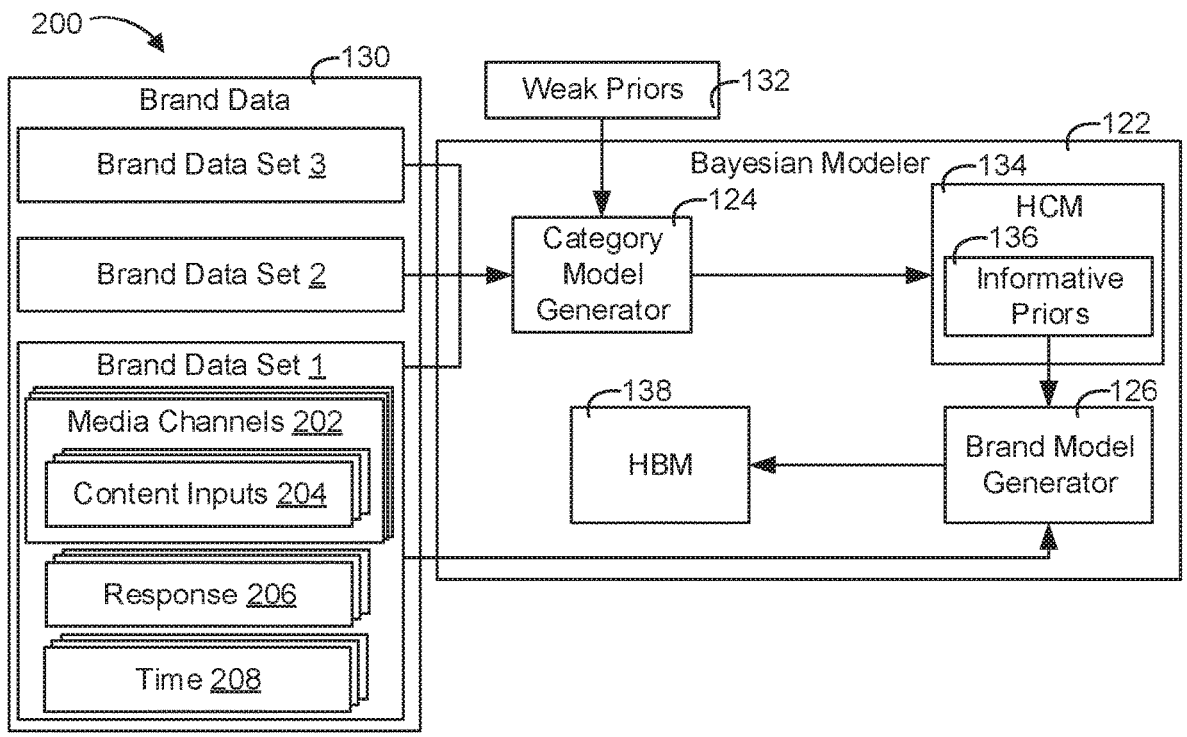
FIG. 2 is a block diagram of the Bayesian modeler of FIG. 1 shown in greater detail according to an illustrative implementation.

Referring now to FIG. 2, the Bayesian modeler 122 is shown in greater detail according to an illustrative implementation. The brand data 130 is shown to be an input to the category model generator 124. Based on the brand data 130 and the weak priors 132, the category model generator 124 can be configured to generate the HCM 134. The brand data 130 is shown to be brand data for three separate brands, i.e., brand data set 1, brand data set 2, and brand data set 3, however, there may be any number of brands. The Brand data set 1 is shown to include media channels 202, content inputs 204, responses 206, and time 208. The brand data set 1 may include data for one or more media channels 202 e.g., Internet advertising media channel data, radio media channel data, printed advertising, etc. The content inputs 204 may indicate a particular content input for one of the media channels 202 at a particular time, e.g., a particular amount of advertising spend, a particular number of advertisement impressions, etc. The responses 206 may indicate a total response for the brand data 1 at a particular time 208. For example, the response 206 may be total revenue for the brand, number of online conversions for the brand, number of registrations for a subscription, etc.

Based on the brand data 130 and the weak priors 132, the category model generator 124 can be configured to generate the HCM 134. Generating the HCM 134 may involve fitting the HCM 134 based on the weak priors 132 and the brand data 130. Specifically, the HCM 134 may include one or more parameters. There may be a weak priors 132 for each of the one or more parameters of the HCM 134. The brand data 130 and the weak priors 132 can be used to generate posterior distributions for each of the parameters of the HCM 134.

In generating the HCM 134, the informative priors 136 may be generated. The informative priors 136 may be trained versions of the weak priors 132 (or may be based on the weak priors 132) i.e., the informative priors 136 may be posteriors of the HCM 134. Based on the informative priors 136 and one particular set of brand data, i.e., brand data for one particular brand, the brand model generator 126 can be configured to generate the HBM 138 for the particular brand.

The category model generator 124 and/or the brand model generator 126 can be configured to generate the HCM 134 and/or the HBM 138 via various fitting algorithms. The algorithms may include Markov Chain Monte Carlo (MCMC), Gibbs-Sampling, and/or any other fitting algorithm. In fitting the HCM 134 and/or the HBM 138, the category model generator 124 and/or the brand model generator 126 can be configured to fit one or more parameters of the models. Fitting one or more parameters may include generating a posterior distribution based on a prior distribution and gathered data. The HCM 134 and/or the HBM 138 may include one or more parameters. The priors for the one or more parameters may be the weak priors 132 and/or the informative priors 136. The priors, i.e., the informative priors 136 and/or the weak priors 132 may be based on one or more parameters referred to as hyper-parameters. There may be priors for the hyper-parameters, referred to as hyper-priors. In this regard, the category model generator 124 and/or the brand model generator 126 can be configure to fit the HCM 134 and/or the HBM 138 by fitting the one or more hyper-parameters and parameters via data, e.g., the brand data 130, and priors and hyper-priors. Various systems and methods for Bayesian modeling are disclosed in U.S. patent application Ser. No. 15/693,326 file on Aug. 31, 2017 the entirety of which is incorporated by reference herein.

Figure 3:
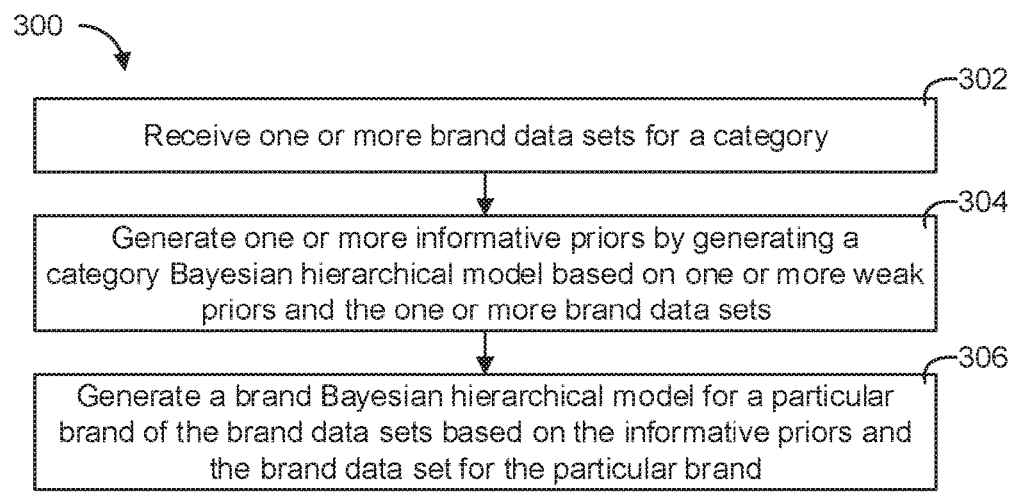
FIG. 3 is a flow diagram of a process for generating a brand Bayesian hierarchical model by generating informative priors with a category Bayesian hierarchical model with the Bayesian modeler of FIGS. 1-2 according to an illustrative implementation.

Referring now to FIG. 3, a process 300 for generating the HCM 134 and the HBM 138 is shown according to an illustrative implementation. The analysis system 120 can be configured to perform process 300. Specifically, the components of the analysis system 120, i.e., Bayesian modeler 122, the category model generator 124, and the brand model generator 126 can be configured to perform process 300. Further, any computing device described herein can be configured to perform process 300, e.g., the computing system 3600 of FIG. 36.

In step 302, the analysis system 120 can receive brand data sets, e.g., the brand data set 1, the brand data set 2, and/or the brand data set 3 (e.g., brand data 130). The analysis system 120 can be configured to store the received brand data sets in the analysis database 128. The Bayesian modeler 122 can be configured to receive the brand data 130 from the data sources 110. Further, the Bayesian modeler 122 can be configured to receive the brand data 130 from user devices 104 and/or the content provider devices 106.

In some embodiments, the Bayesian modeler 122 can be configured to scale the brand data 130. For example, the Bayesian modeler 122 can be configured to scale (e.g., normalize) the responses (e.g. response 206) and the content inputs (e.g., content inputs 204) of the brand data 130. The Bayesian modeler 122 can be configured to scale the content input of each brand data set between zero and one. The Bayesian modeler 122 can be configured to use Equation 3 described herein to perform normalization. This scaled brand data 130 can be used by the category model generator 124 to generate the HCM 134. Likewise, the scaled brand data 130 (e.g., a scaled version of a particular brand data set) can be used by the brand model generator 126 to generate the HBM 138.

In step 304, the category model generator 124 can be configured to generate the informative priors 136 based on one or more weak priors 132 and the one or more brand data sets (e.g., the brand data 130) received in step 302 by generating the HCM 134. By generating the HCM 134, the weak priors 132 may be trained on the received brand data sets, thus generating informative priors (i.e., posteriors for the HCM 134).

In some embodiments, the posteriors of the HCM 134, i.e., the informative priors 136 can be used to generate a joint empirical distribution. The joint empirical distribution can then be used by the brand model generator 126 to generate the HBM 138. In some embodiments, to generate the HBM 138, the brand model generator 126 can be configured to pseudo-randomly select samples from the joint empirical distribution for each iteration of an iterative fitting algorithm (e.g., Markov Chain Monte Carlo (MCMC)). Each pseudo-randomly selected sample of the joint empirical distribution can then be used to fit the HBM 138 for each respective iteration of the iterative fitting algorithm.

The HCM 134 generated by the category model generator 124 and the HBM 138 generated by the brand model generator 126 may each include a geometric adstock function (e.g., the geometric adstock function of Equation 1) and/or a Hill function (e.g., the Hill transformation function of Equation 2). The geometric adstock functions and the Hill functions of the HCM 134 and the HBM 138 may model carryover and shape effects of the HCM 134 and the HBM 138 respectively. The geometric adstock function and the Hill function are described in further detail elsewhere herein.

In step 306, the HBM 138 can be generated for a particular brand of all the brands included in the one or more brand data sets based on the informative priors generated in step 304 and the brand data set for the particular brand. For example, if the HBM 138 can be generated for the brand data set 1, the brand model generator 126 can generate the HBM 138 based on the informative priors 136 and the brand data set 1.

Based on the HBM 138, the brand model generator 126 can be configured to generate return on average spend (ROAS) and marginal return on average spend (mROAS). The brand model generator 126 can be configured to use Equation 17 and/or Equation 18 to generate the ROAS and mROAS respectively. More specifically, the brand model generator 126 can be configured to generate ROAS and mROAS for each media channel (e.g., content type) of the HBM 138. The generated HBM 138 may include one or more fitting model parameters (e.g., generating posteriors for the model parameters). Based on the fitted model parameter (e.g., posteriors), the brand model generator 126 can be configured to generate the ROAS and the mROAS.

In some implementations, the HCM 134 can be generated by the brand model generator 126 based on competitor variables. The competitor variables may be based on behavior of competitors of the brand that the HBM 138 is generated for. Using the competitor variables to generate the HCM 134 may cause the HCM 134 and/or the HBM 138 to account for behavior of competitors, for example, for all the brands of the brand data 130. The competitor variables may be direct competitor product price variables or indirect competitor product price variables, the category model generator 124 can be configured to use the direct competitor product price variables and/or the indirect competitor product price variables to generate the HCM 134.

In some embodiments, the Bayesian modeler 122 can generate the competitor variables, e.g., generate the direct competitor product price variables and/or the indirect competitor product price variables. The Bayesian modeler 122 can store indicators of multiple competitors within a category, for example, a competitor for each brand data set of the brand data 130 for a particular category. The Bayesian modeler 122 can be configured to group some of the brands into a direct competitor group and some of the brands into an indirect competitor group. This grouping may be done based on price. For example, if the products of the particular brand that the HBM 138 is generated for is a first price, the Bayesian modeler 122 can be configured to group brands that sell products within a range centered on the first price into the direct competitor group. Any competitors that sell a product outside the range may be grouped into the indirect competitor group.

The Bayesian modeler 122 can be configured to generate a direct competitor product price variable by generating a weighted average of competitor prices for direct competitor group. Similarly, the Bayesian molder 122 can be configured to generate an indirect competitor product price variable by generating a weighted average of competitor prices for the indirect competitor group.

Figure 4:
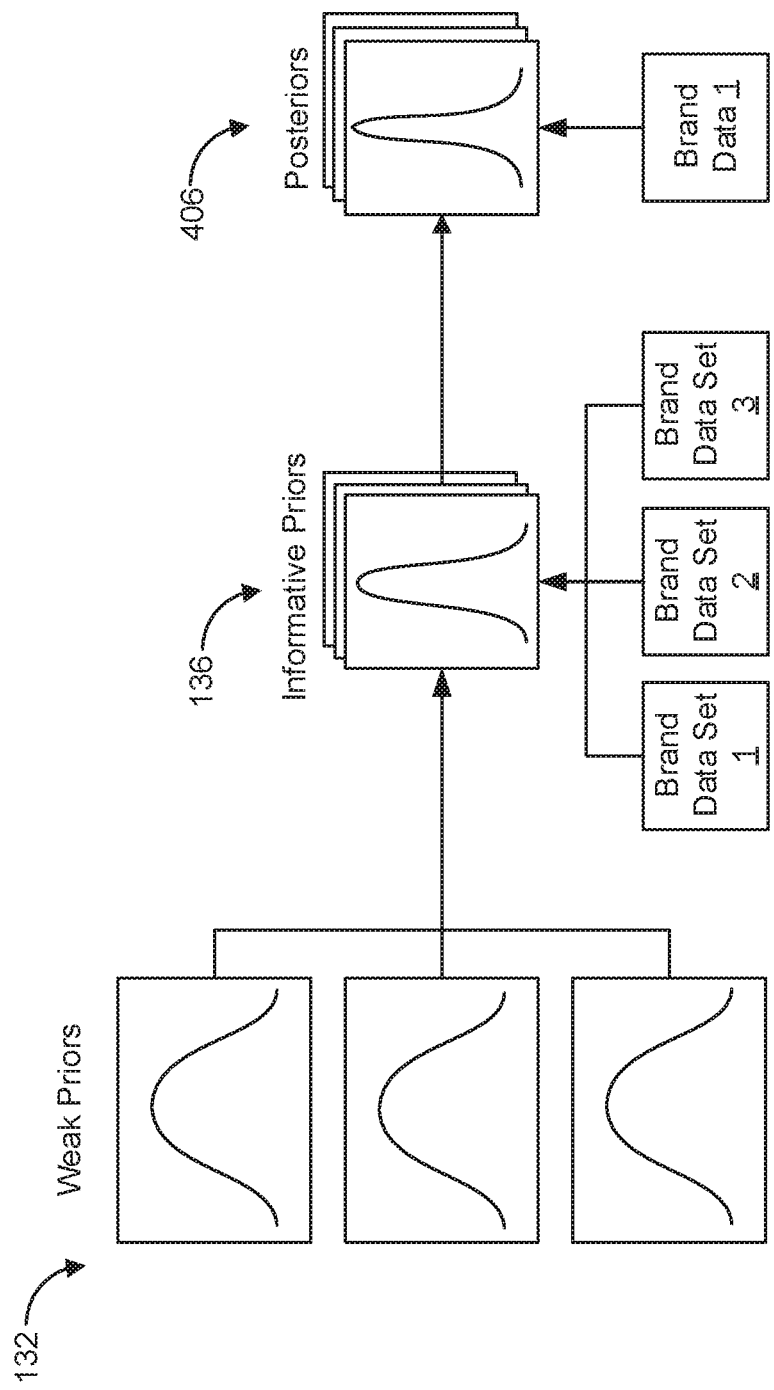
FIG. 4 is a block diagram illustrating the weak priors used to generate the category Bayesian hierarchical model and the informative priors used to generate the brand Bayesian hierarchical model according to an illustrative implementation.

Referring now to FIG. 4, the steps for generating the HCM 134 and the HBM 138 are illustrated in further detail. As shown in FIG. 4, the weak priors 132 are probability distributions that are "weak," i.e., they have a larger amount of uncertainty. The "weak" priors may be referred to as weak because they are uninformative, i.e., they are not based on any known knowledge, or at least strong knowledge, of how a parameter of the HCM 134 should be modeled. The informative priors 136 may be probability distributions that are "stronger" than the weak priors 132, i.e., the informative priors 136 may be (or may be based on) trained versions of the weak priors 132 based on the brand data sets, brand data sets 1, 2, and 3. In this regard, the informative priors 136 may contain less uncertainty than the weak priors 132. Visually, this is shown as the informative priors 136 being narrower than the weak priors 132. The informative priors 136 may be a posterior distribution of the HCM 134, i.e., the category model generator 14 may generate posteriors for parameters of the HCM 134 based on the weak priors 132 and the brand data sets 1, 2, and 3. Based on the informative priors 136, posteriors 406 for parameters of a brand specific model, the HBM 138, can be generated. The HBM 138 can be generated based on the informative priors and a single brand data set, i.e., the brand data 1.

Figure 5A:
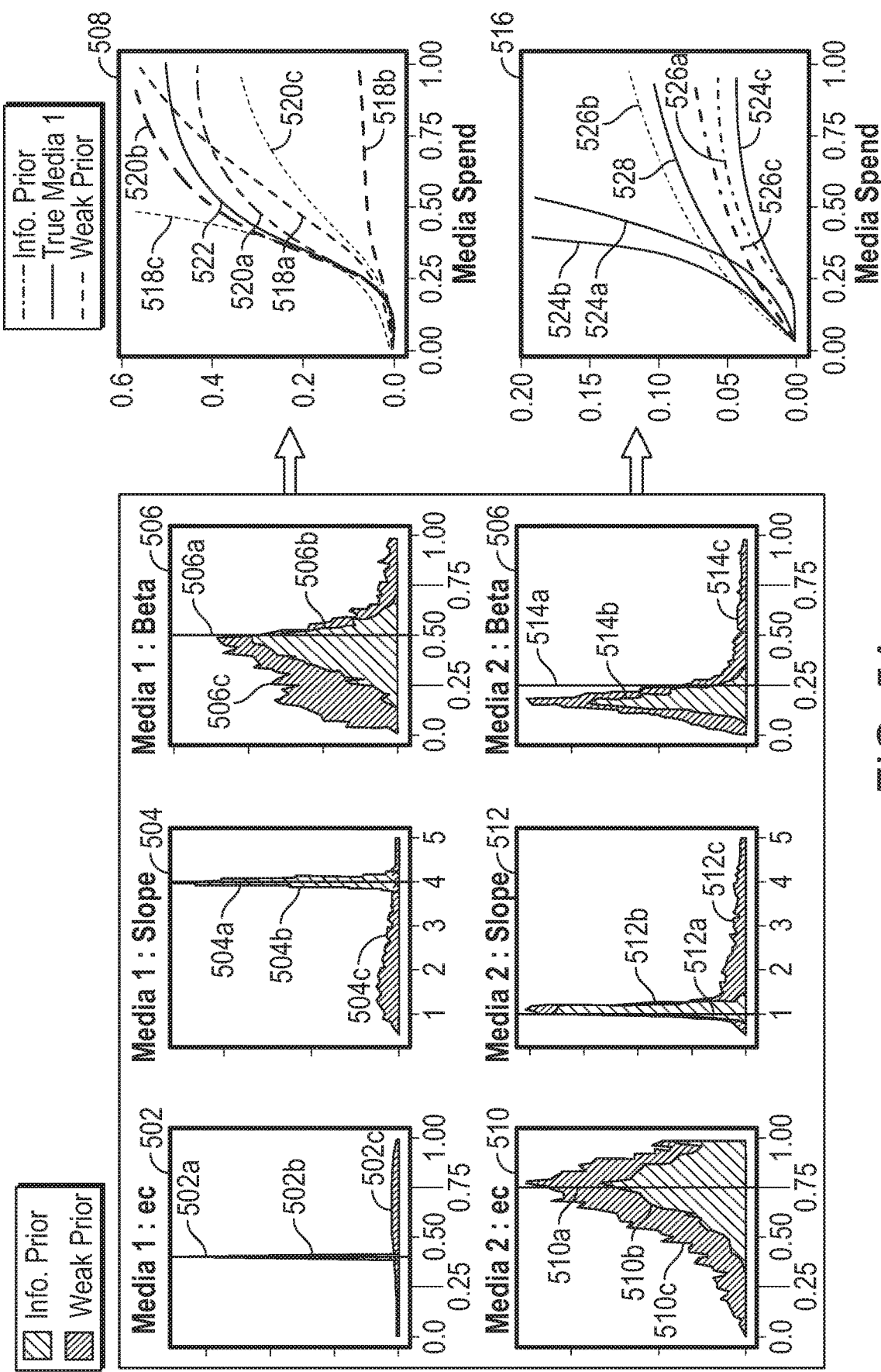
FIG. 5A is a set of charts comparing posteriors for the brand Bayesian hierarchical model generated with informative priors and weak priors and response curves for the brand Bayesian hierarchical model generated with informative priors and weak priors according to an illustrative implementation.

Referring now to FIG. 5A, an illustration of the performance of the HBM 138 is shown. The graphs 502-506 illustrate posterior distributions for parameters of the HBM 138 for one particular media channel generated based on informative and weak priors. The graph 508 illustrates a response curve illustrating media spend (e.g., content input) for models based on informative and weak priors. Similarly, the graphs 510-514 illustrate informative and weak priors for parameters of the HBM 138 for another media channel. The chart 516 illustrates a response curve illustrating media spend (e.g., content input) for models based on the informative priors and the weak priors.

Graphs 502-506 each illustrate a posterior based on an informative prior and a weak prior. Further, the ideal posterior is indicated. The posteriors are for three different parameters of the HBM 138 for a first media channel. In graphs 502-506, the actual "true" posterior is represented as a line i.e., lines 502a, 504a, and 506a. These lines indicate what an true posterior would be i.e., a posterior with no uncertainty. The posteriors based on weak priors are represented by distributions 502c, 504c, and 506c. The posteriors based on the informative priors are represented by distributions 502c, 504c, and 506b. As can be seen, the posteriors based on the informative priors have less uncertainty than the posteriors that are based on the weak priors and are closer to the true posterior.

Graph 508 illustrates the response curve for the HBM 138 based on the informative priors illustrated by graphs 502-506 and the weak priors illustrated in graphs 502-506 for a first media channel. Line 522 illustrates the true response. The lines 520a, 520b, and 520c illustrate the response of the HBM 138 generated based on the informative priors. The lines 518a, 518b, and 518c illustrate the response of the HBM 138 generated based on the weak priors illustrated in graphs 502-506. As can be seen the response of the HBM 138 generated based on the informative priors outperforms the response of the HBM 138 generated based on the weak priors.

Graphs 510-514 each illustrate posteriors generated based on an informative prior and a weak prior. The graphs further illustrate values for ideal posteriors. Graphs 510-514 illustrate posteriors for different parameters of the HBM 138 for a second medial channel. In graphs 510-514, the true value for the posteriors is represented as a vertical line i.e., lines 510a, 512a, and 514a. Posteriors based on the weak priors are represented by distributions 510c, 512c, and 514c. The posteriors based on informative priors are represented by distributions 510b, 512b, and 514b. As can be seen, the informative priors have less uncertainty than the weak priors and are closer to the ideal prior.

Chart 516 illustrate the response curve for the HBM 138 based on the posteriors illustrated graphs 502-506 for the second media channel. Line 528 illustrates the "ideal" response or the otherwise true response. The lines 524a, 524b, and 524c illustrate the response of the HBM 138 generate based on the weak priors. The lines 526a, 526b, and 526c illustrate the response of the HBM 138 generated based on the informative priors. As can be seen in chart 516, the response of the HBM 138 generated based on the informative priors outperforms the response of the HBM 138 generated based on the weak priors.

Figure 5B:
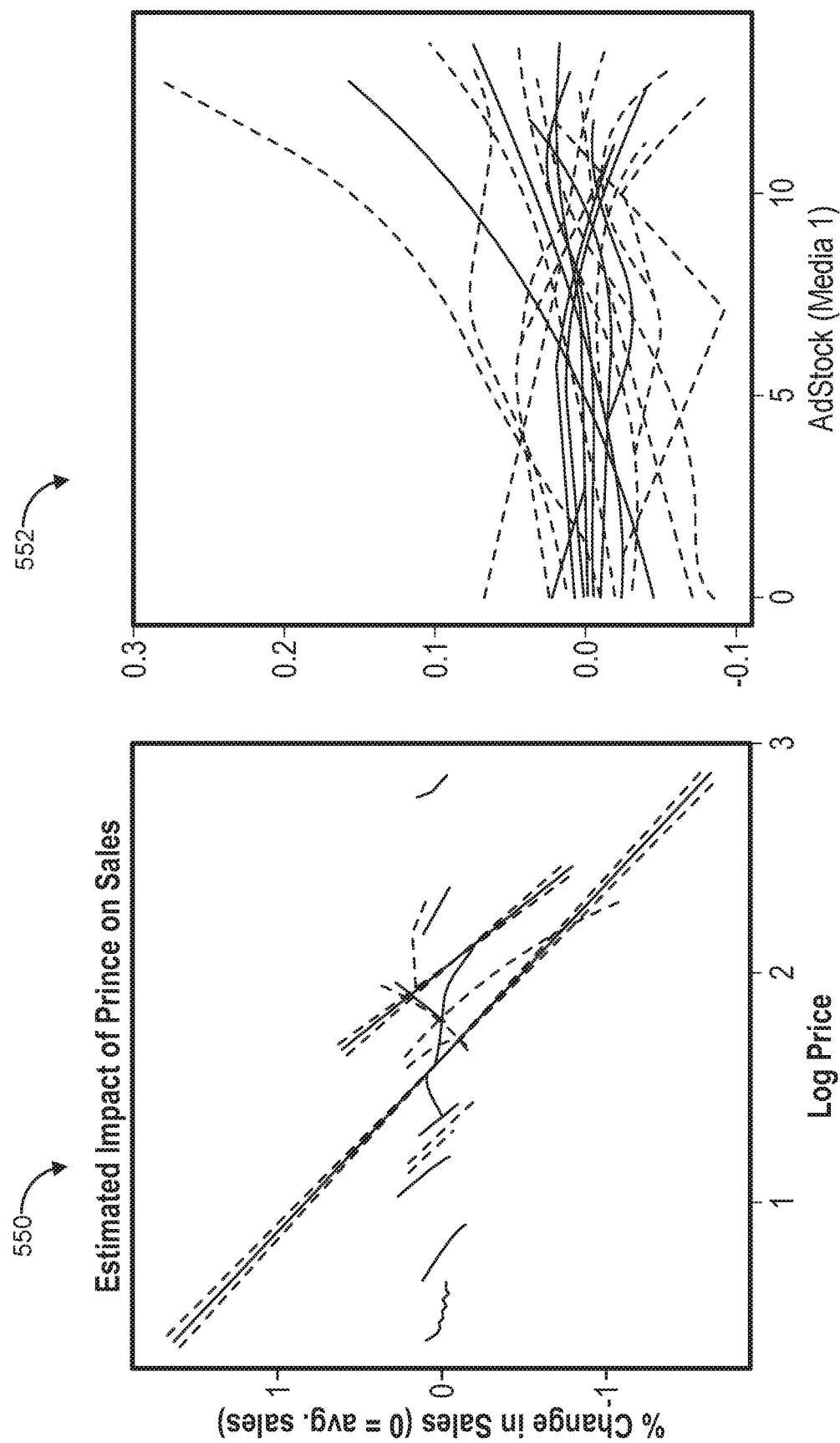
FIG. 5B includes two charts illustrating similarity across brands in terms of price and sales according to an illustrative implementation.

Referring now to FIG. 5B is a set of two charts, chart 550 and 552, that illustrate similarity across brands in terms of price and sales according to an illustrative implementation. Impact of price is shown in chart 550 while media sales for certain brands is shown in chart 552. This may support using a shared prior distribution on media parameters across similar brands.

Referring generally to FIGS. 2-5A, the systems and methods shown illustrate systems and methods for generating a hierarchical Bayesian model while maintaining data anonymity. The systems and methods mask aggregate sets of data (e.g., the brand data sets 1, 2, and 3) through the informative priors 136. This allows for specific brand based models to be generated indirectly from aggregate sets of data. If the HBM 138 is generated based on the weak priors 132 and only the brand data set 1, the posteriors 406 for the parameters of the HBM 138 would not be as strong as those generated based on the informative priors 136.

Allowing a brand specific model, the HBM 138, to be generated based on informative priors 136 and data for the specific brand results in a model that is stronger than generating HBM 138 based on the specific brand data set and weak priors 132. Therefore, aggregating brand data together to form category data used to generate the informative priors 136 allows for the brand specific model to leverage more data when determining the model for the specific brand, the HBM 138. In a particular category, the various brands may be competitors. In this regard, one competitor may not want another competitor access to that competitors data. For this reason, the systems and methods shown and described with reference to FIGS. 2-4 leverage aggregate sets of data for multiple competitors through the informative priors 136 rather than allowing the HBM 138 to be generated directly based on the aggregate data set.

Media Mix Modelling (MMM)

Referring generally to FIGS. 1 and 2, the systems and methods for generating a brand hierarchical Bayesian model with a category hierarchical Bayesian model are discussed in greater detail. For time t=1, . . . , T, notation $y_t$ may be used herein for a time series of the response variable (e.g., the response 206). In a media mix model (MMM), $y_t$ is usually a type of KPI, such as dollar sales or volume sales. The notation $x_{t,m}$ may be used herein to denote the media variable (e.g., the content inputs 204) for media channel $m$ (e.g., the media channels 202) at time t, for $m=1, \ldots, M$. $x_{t,m}$, can be the advertising spend (e.g., the content inputs 204) or Gross Rating Points (GRPs) of TV ads, advertising spend or number of impressions of online display ads over a week period, etc. Lastly, the notation $z_{t,c}$, c=1, . . . , C, may be used herein to indicate control variables. Common control variables include the product price, All Commodity Volume (ACV) weighted distribution of product and retailer promotion, weather, average competitor price, etc. The Bayesian modeler 122 can be configured to choose relevant control variables or a user can choose the relevant control variables via the user devices 104, depending on the business structure of the category and the influence of the control variable on the response. In various embodiments, the Bayesian modeler 122 receives the relevant controls variables (e.g., receives the variables from the content provider devices 106 and/or the user devices 104.)

Referring now to FIG. 6, an illustration of a Hill transformation under two sets of Hill parameters is shown in chart 600. Instead of a linear relationship between response $y_t$ and $x_{t,m}$, MMMs often incorporate flexibility to account for the nonlinear aspects of media effects on KPI, of which three main ones may include the carryover effect of media exposures, diminishing returns of media investment and the necessity to build a certain level of awareness before significant returns from media spend realized. The first one is also referred to as the lag structure (or adstock) of media impact, while the latter two can be combined to form the shape or curvature (an "S" curve) of sales response to media exposure.

Several functional forms can account for media carryover effects can be used, such as geometric adstock, delayed adstock, or polynomial distributed lags. As for the shape effect, the log transformation, Hill transformation (as shown in FIG. 6), or logistic growth function can be used to capture media's diminishing returns. As described herein, a geometric adstock and Hill transformation can be used for media carryover and shape effect respectively, as well as values of some fixed parameters and choices of weak priors.

The geometric adstock function can be defined as (Equation 1), $$GA(x_t; \alpha, L) = \frac{\sum_{l=0}^{L} x_{t-l} \alpha^l}{\sum_{l=0}^{L} \alpha^l}$$

where the carryover rate $\alpha \in (0,1)$. The length of the carryover effect can be set at 13 weeks for all media channels and/or any other length of time. Note that the denominator in the above definition makes the output of the function lie within the range of x.

The Hill transformation function can be defined as (Equation 2), $$H(x; K, S) = \frac{1}{1 + \left(\frac{x}{K}\right)^{-S}}$$

where $\mathcal{K} > 0$ and $\mathcal{S} > 0$. The Hill transformation function maps the positive real line to (0,1) and reaches ½, the half saturation point, when $x = \mathcal{K}$. Thus, the parameter $\mathcal{K}$ is often referred to as the half maximal Effective Concentration (EC or $EC_{50}$). The parameter $\mathcal{S}$ is also known as the Hill coefficient, interpreted as the largest absolute value of the slope of the curve. FIG. 6 illustrates two example shapes representable by the Hill transformation: the 'S' curve and diminishing-returns-only.

To simplify the specification of weak priors (e.g., the weak priors 132) for $\mathcal{K}$ across different media, media variables (e.g., the content inputs 204 and/or responses 206 for the media channels 202) can first be scaled to be between 0 and 1 (Equation 3), $$x_{t,m} = \frac{x_{t,m}^{(0)} - \min_t (x_{t,m}^{(0)})}{\max_t (x_{t,m}^{(0)}) - \min_t (x_{t,m}^{(0)})}$$

where $x_{t,m}^{(0)}$ denotes the original media variable of channel $m$ at time t. $\mathcal{K}$ can be restricted to be between 0 and 1 in order to avoid non-identifiability of the model and to achieve faster convergence.

Then, a first MMM that allows for geometric carryover effects and a flexible shape structure, can be written as (Equation 4-5), $$\Theta(y_t) = \tau_0 + \sum_{m=1}^{M} \beta_m h_m(x_{t,m}) + \sum_{c=1}^{C} \gamma_c z_{t,c} + \epsilon_t$$

where $$h_m(x) = H(GA(x; \alpha_m, L_m); \mathcal{K}_m, \mathcal{S}_m)$$

and $\epsilon_t \sim \text{Normal}(0, \sigma^2)$ for time t=1, . . . , T. Sometimes interaction terms can or should be added to the model to represent combined impact of media variables (e.g., the content inputs 204), or between media and control variables. For simplicity, and a focus on the benefits of category analysis, the interaction terms of the models discussed herein may be left out. Common choices of transformation $\Theta$ on the response variable (e.g., the responses 206) include the identity and the logarithm function. The specific choice depends on the distribution of the response variable.

The above model specification (i.e., Equations 4-5) add 5 parameters (or 4, if $L_m$ is preset) for every media variable included in the model. Estimating these parameters may be difficult given that MMMs are often based on weekly observations of a single brand over less than 5 years. Due to the lack of quantity and information content in MMM datasets relative to model complexity, media variable coefficients are often estimated as insignificant (wide confidence intervals), significantly negative, or too large to be true.

Hierarchical Bayesian Model

A Bayesian hierarchical model (e.g., the HCM 134) which utilizes data from all brands within the category can be generated based on the systems and methods described herein. The systems and methods can be used to derive informative priors (e.g., the informative priors 136) from category results (e.g., category data such as the brand data 130) and use the category results in a MMM for a specific brand of interest (e.g., HBM 138).

The value $\tau_b$ can be used to denote brand specific intercepts. $x_{t,m,b}$ may indicate the spend or exposure variable (e.g., content inputs 204) of media channel $m$ (e.g., media channels 202) for brand b (e.g., brand data set 3, brand data set 2, or brand data set 1) at time t (e.g., time 208), and $z_{t,c,b}$ can represent control variable c for brand b at time t. $\beta_{m,b}, m=1, . . . , \mathcal{M}$ can be used to denote brand-specific coefficients for the $\mathcal{M}$ media variables, and $\gamma_{c,b}, c=1, \ldots, C$ to denote brand-specific coefficients for the $C$ control variables. For b=1, ..., $B$, brand-specific coefficients for the same variable share a category-wide prior distribution (Equations 6-7), $$\beta_{m,b} \sim \text{Normal}^+(\beta_m, n_m^2), m=1, \ldots, M$$

$$\gamma_{c,b} \sim \text{Normal}(\gamma_c, \xi_c^2), c=1, \ldots, C$$

weak or non-informative hyper-priors can be specified for the category hyper-parameters $\{\beta_m, n_m\}$ and $\{\gamma_c, \xi_c\}$. For the distribution tilt, "\sim+space" can be used.

It can be counterintuitive to observe a media channel on which more spend would lead to less sales. A negative impact can be observed for a certain advertising campaign for a certain brand. An overall negative impact for a media channel over multiple years and numerous campaigns may be rare and likely the effect of an unobserved factor. Sometimes, models with unconstrained priors output negative media effect estimates due to omitted variables, rather than a negatively influencing media channel. Non-negative weak priors may be used on $\beta_m$ and $\beta_{m,b}$, as a representation of advertiser's expectation of an non-negative incremental impact of media effects. Non-negative priors are not the only reasonable choice of prior; in fact, several reasonable priors with slightly different assumptions for media parameters. For the other media parameters such as $\mathcal{K}_m$ and $\mathcal{S}_m$, weak priors can be used.

Similar to the MMM, the media variables (e.g., content inputs 204 or response 206) can be scaled to between 0 and 1 to be consistent with the support of $\mathcal{K}$ parameter in the Hill transformation. In category analysis, all brand datasets for each of the $M$ media channels can be scaled. In particular, the scaled media variables are obtained as follows (Equation 8), $$x_{t,m,b} = \frac{x_{t,m,b}^{(0)} - \min_{t,b}(x_{t,m,b}^{(0)})}{\max_{t,b}(x_{t,m,b}^{(0)}) - \min_{t,b}(x_{t,m,b}^{(0)})}$$

where $x_{t,m,b}^{(0)}$ indicates the original media variable. Scaling within a media channel but across all brands provides a possibility to observe different sections of the media spend spectrum, which in turn can help to better estimate the shape of media response. Note that the above scaling induces a data-dependency between the prior on K and the actual spend levels observed in the data which may not be desirable unless it reflects an actual set of background knowledge about the observed spend levels.

For brand b=1, ..., $B$, at time t=1, ..., T, the hierarchical category MMM, e.g., the HCM 134, can be written as (Equations 9-10), $$\Theta(\mathcal{Y}_{t,b}) \sim \text{Normal}(\mu_{t,b}, \sigma^2)$$

where $$\mu_{t,b} = \tau_b + \sum_{m=1}^{M} \beta_{m,b} h_m(x_{t,m,b}) + \sum_{c=1}^{C} \gamma_{c,b} z_{t,c,b}.$$

In Equation 10, the Hill transformation parameters $\mathcal{K}_m$ and $\mathcal{S}_m$ are shared across brands in the category for each $m$, while β and γ, as described in Equations 6-7, are brand-specific but follow a same category-wide distribution. The above model specification is one of many possibilities; it represents prior knowledge that a certain level of similarity exists in media effects across brands within the category, namely, similar shape and carryover but potentially varying magnitude. There can be situations where the model can be specified to allow for varying shape effects, for example. This is discussed in further detail with reference to FIGS. 16-20.

The hierarchical Bayesian model's fundamental idea (e.g., HCM 134 and HBM 138) is to approach a complex problem by breaking it into smaller parts through decomposing the joint distribution of a set of random variables into a series of conditional models.

Informative Priors for a Hierarchical Bayesian Model

When there are no restrictions on sharing data across brands, the steps for generating informative priors and the brand-specific parameters estimated by the HCM 134 can be used. For example, when a category model, the HCM 134, is built using all the brands of a similar product category owned by one company.

If the category dataset is not available to generate brand-specific MMM results directly, an alternative approach can be used for building a brand-specific MMM, the HBM 138, using only the data of the brand of interest and informative Bayesian priors in the form of posterior samples of the category-wide (hyper)parameters extracted from the HCM 134. This way, the joint distribution of the category-wide media parameters learned from the HCM 134 is preserved. At the same time, these parameters may not be specific to any particular brand and thus are anonymous.

In particular, for brand b* within the category of interest, a brand-specific model (e.g., the HBM 138) can be described as follows. For time t, t=1, ..., T (Equations 11-13), $$\Theta(\mathcal{Y}_{t,b^*}) \sim \text{Normal}(\mu_t^*, \sigma^2)$$

where, $$\mu_t^* = \tau^* + \sum_{m=1}^{M} \beta_m^* h_m(x_{t,m,b^*}) + \sum_{c=1}^{C} \gamma_c^* z_{t,c,b^*}$$

and $$\beta_m^* \sim \text{Normal}^+(\beta_m, n_m^2)$$

The notation, $\{\Phi_m\}^{(c)}$, can be used to represent the posterior samples from the category model (e.g., the HCM 134), where $\Phi_m = \{\beta_m, n_m^2, \alpha_m, K_m, S_m\}$. In each Markov Chain Monte Carlo (MCMC) iteration of the brand-specific model, instead of estimating $\Phi_m$ using only the brand dataset, one randomly draws a sample from the joint empirical distribution approximated by $\{\Phi_m\}^{(c)}$. By incorporating informative priors (e.g., the informative priors 136) in the format of $\{\Phi_m\}^{(c)}$ the brand-specific MMMs, one can preserve maximal information inherited from the category model to be passed onto brand models, while maintaining a certain level of anonymity for individual brand's datasets. The joint posterior of $\Phi_m$ can be extracted from the HCM 134, instead of the marginals. The media parameters, especially $\beta_m$, $K_m$, and $S_m$, may be highly correlated as they can trade off each other to represent similar media responses. In fact, in the above proposed sampling approach for a brand-specific model, the information exchange between the brand-specific parameters and $\{\Phi_m\}^{(c)}$ is equivalent to that between the brand-specific parameters and $\Phi_m$ in the HCM 134. Therefore, the parameter estimates from a brand-specific model (e.g., HBM 138) using informative priors (e.g., the informative priors 136) in the format of $\{\Phi_m\}^{(c)}$ may be equivalent to those of the brand-specific parameters directly from the HCM 134.

Besides the posterior samples of the category-wide parameters $\Phi_m$ the range of media variables of the category may need to be passed from category to brand analysis, in order to maintain the same scaling transformation in the brand MMM (e.g., the HBM 138) as the category MMM (e.g., the HCM 134) in Equation 8, which is essential for the informative priors 136 derived from category model (e.g., the HCM 134) to be meaningful to the brand-specific models. The minimum values of media variables (e.g., the content inputs 204) of a category are usually 0, while the maximum values are often not sensitive data and can be shared.

If an advertiser prohibits its data from participating in developing the HCM 134, a category model can be built using other brands in the category whose datasets are accessible. The resulting informative priors (e.g., the informative priors 136) can be used in a similar manner as discussed above, as long as it is reasonable to assume the media responses of the brand is similar to the brands used in the category model. Advertisers may relax data sharing restrictions based on the benefits of the HCM 134 and the HBM 138 and the data anonymization which the models provide, allowing cross advertiser data being used to generate at least the HCM 134.

Simulation Studies

Various simulations are described with reference to FIGS. 7-35 illustrating some of the key benefits of category analysis. Because MMMs can be developed and used in real practice for individual brands, FIGS. 7-35 focus on comparing the brand-specific models, using weak priors (e.g., the weak priors 132) versus using informative priors (e.g., the informative priors 136) represented by $\{\Phi_m\}^{(c)}$.

A sequential simulation process can be used to implement the simulation scenarios discussed herein. The sequential simulation process allows dependencies between covariates in addition to the dependency of the response variable on the covariates. For example, a simulation could be performed to simulate different brand's media spends based on each brand's underlying media planning behaviors, which is further correlated with the product's underlying seasonality. A sequential simulation process enables fulfillment of a chain of dependencies as is described above. The detail of the data simulation process are described in detail herein.

As described with reference to FIGS. 7-11, two common scenarios where category analysis can provide an advantage over a single brand MMM, a model that only uses data for a particular category, are discussed. The description with reference to FIGS. 7-11 discusses the simulation scenario where media variables exhibit a larger variation across brands, compared to within a single brand. The description with reference to FIGS. 12-15 investigates the scenario where the competitive factor among brands has a non-trivial impact on KPIs. The description with reference to FIGS. 16-20 demonstrates the importance of a category-brand hierarchy when non-trivial variation exists among brands.

Simulation with Across-Brand Media Variation Larger than within-Brand Variation

One scenario where pooling multiple datasets could be significantly beneficial is with larger variation of media variables across different brands than within a brand. In this setting, shrinkage across brands helps estimate the shape parameters and model coefficients more accurately and enables extrapolation (to a certain extent) with more confidence. Data simulation specifications and model setup are discussed with reference to Table 1 and FIG. 7. The discussion with reference to FIGS. 8-11 compare the brand-specific results in two perspectives, via estimations of ROAS and response curves, and discuss the differences in these two types of model performance metrics.

Figure 7:
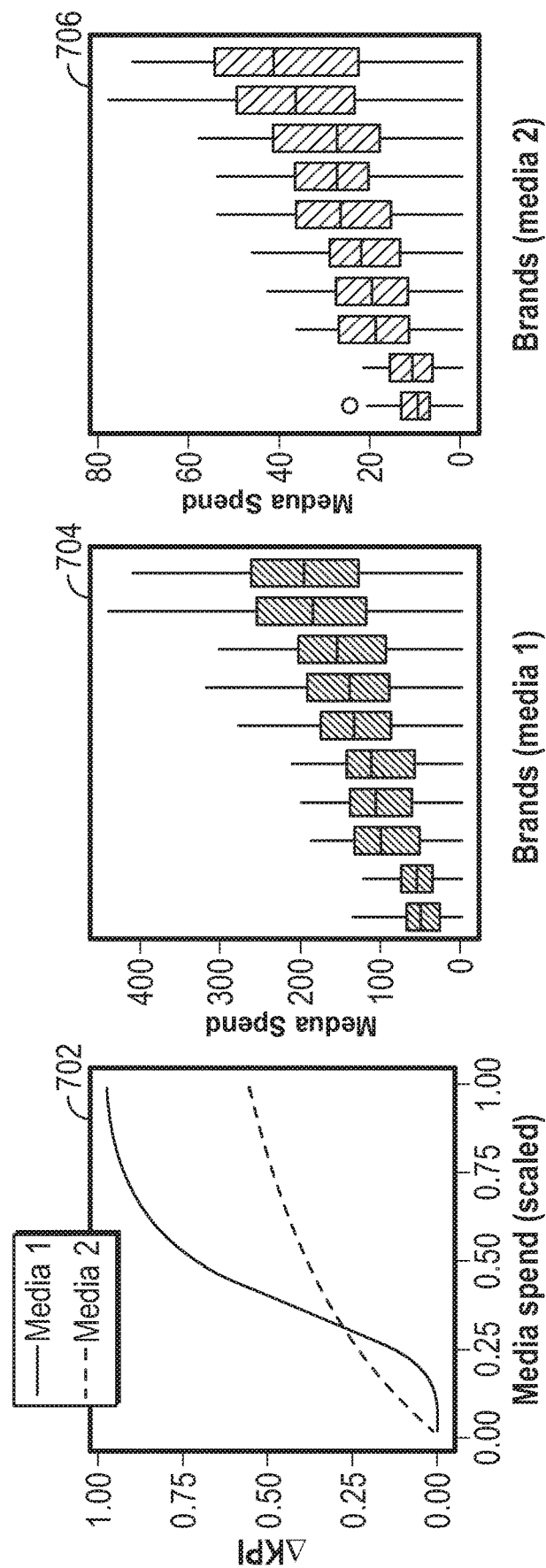
FIG. 7 is a chart illustrating response curves and content input amounts for two different media channels for multiple brands according to an illustrative implementation.

Referring now to FIG. 7, the data used for the simulation where across-brand media variation being larger than within-brand variation is shown. The chart 702 illustrates two simulated media shapes. The charts 704 and 706 illustrate simulated media spend on two channels across the 10 brands of an example dataset, ordered by the median spend of media 1.

For this simulation scenario, $\mathcal{M}=2$ media channels are simulated with the specifications listed in Table 1. The Hill transformations under these specifications are illustrated in chart 702 of FIG. 7. 100 datasets were simulated, each of which contains weekly observations of 10 brands over 104 weeks. For each simulated dataset, 2000 iterations were run with 4 parallel Markov Chain Monte Carlo (MCMC) chains using the RStan language.

TABLE 1

| Specification of media impact in simulation Section 5.1. | | |
|---|---|---|
| | Media 1 | Media 2 |
| $\mathcal{K}$ | 0.4 | 0.8 |
| $\mathcal{S}$ | 4 | 1 |
| Coefficient $\beta_{m,\bullet}$ | $\beta_{1,\bullet} \sim N(0.5, 0.01^2)$ | $\beta_{2,\bullet} \sim N(0.2, 0.01^2)$ |

Charts 704 and 706 of FIG. 7 illustrate the variation in media spend across brands in one example dataset. In both charts, brands are ordered by the median of media spend in media channel 1. The media spend in channel 2 roughly, though not exactly, follows the same order. It is because in the simulation, media spend is correlated with each brand's base size, i.e., the bigger the company, the more media spend.

Compared to the category dataset, the small brands' datasets individually would only correspond to the lower section of media's response curve, while the big brands' datasets could concentrate on the upper section of a media's response curve. By pooling the brand datasets together, small brands can benefit from the observations from bigger brands to extrapolate with improved accuracy; and vice versa for bigger brands. There may be still a limit on extrapolating from an estimated response curve, as accuracy may deteriorate quickly beyond what has been observed in the category.

For each simulated dataset, a category-level model specified in Equations 6-7 and 9-10 can be generated, using all simulated data of B=10 brands and T=104 weeks. For m=1, 2, the following weak priors can be used in the HCM 134 (Equation 14), $\mathcal{K}_m \sim \text{Beta}(2,2), \mathcal{S}_m \sim \text{Gamma}(3,1),$ and $\beta_m \sim \text{Uniform}(0,5)$.

For demonstration purpose, media shape and coefficients can be focused on; no carryover effects were simulated, and no lag structure was included in the models. In this and the following two simulation scenarios, logarithm transformation can be used on the response variable in both the data simulation and the models, i.e. $\Theta(\mathcal{Y})=\log(\mathcal{Y})$.

For each of the 100 simulations, the joint posterior samples $\{\Phi_m\}^{(c)}$ can be extracted from the HCM 134, to be passed onto the brand-specific MMMs, e.g., one or more of the HBMs 138.

Comparison of ROAS and mROAS Estimated by Brand-Specific Models

Figure 8:
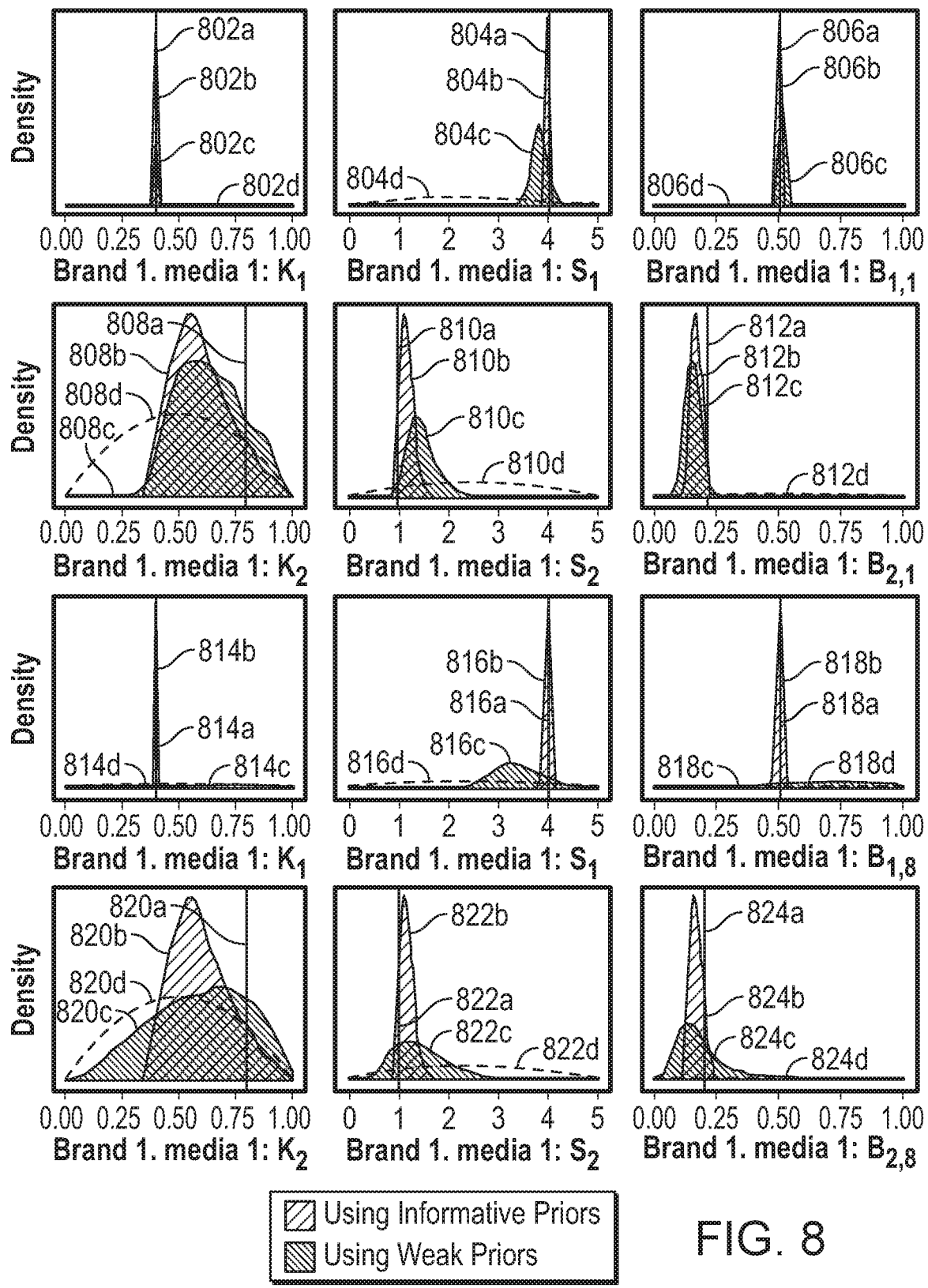
FIG. 8 is a set of charts illustrating posterior densities generated based on informative priors and weak priors according to an illustrative implementation.

Referring now to FIG. 8, marginal density plots of media parameter posterior samples estimated by brand models using informative priors (illustrated by posteriors 802b, 804b, 806b, 808b, 810b, 812b, 814b, 816b, 818b, 820b, 822b, and 824b), compared to those using weak priors (illustrated by posteriors 802c, 804c, 806c, 808c, 810c, 812c, 814c, 816c, 818c, 820c, 822c, and 824c), using an example dataset, as well as the true values (illustrated by lines 802a, 804a, 806a, 808a, 810a, 812a, 814a, 816a, 818a, 820a, 822a, and 824a) and the weak priors used (illustrated by dashed lines 802d, 804d, 806d, 808d, 810d, 812d, 814d, 816d, 818d, 820d, 822d, and 824d).

With reference to FIG. 8, a comparison of the results from brand models described in Equation 11 using informative priors represented by $\{\Phi_m\}^{(c)}$ with that using weak priors listed in Equation 14 can be seen. Taking one simulation dataset as an example, FIG. 8 compares the marginal density of posterior samples of the media parameters estimated by the brand models with the true values. Also plotted are the weak priors used (dashed lines) for reference. Only two simulated brands are shown in FIG. 8.

Several patterns are evident in FIG. 8. In some cases, like $\mathcal{K}_1$ of brand 1, the informative priors do not seem to make a difference, and both brand models estimate the parameter well. In some cases, e.g., the coefficients of both media for brand 8, the informative priors substantially reduce posterior uncertainty. In some cases, e.g. $S_1$ for both brand 1 and brand 8, the informative priors also improve the accuracy of the point estimate: the brand model with informative priors provides a more accurate estimate of $S_1$ with less uncertainty, compared to the brand model using weak priors. In other cases, both models show low estimation accuracy, e.g. $S_2$.

FIG. 8 shows that informative priors derived from the category model can help improve the estimation accuracy and reduce uncertainty by passing on learnings obtained from a richer dataset. The compromise between data and priors is a standard example of the posterior distribution as a result of both the data and the priors: when the information in the data is weak, an informative prior has more influence on the posterior. Using the category dataset to derive informative priors can supplement the lack of information content of a single brand dataset.

Further, when informative priors are used, the three parameters of the first media (first and third row of FIG. 8) are estimated with narrow uncertainty and good accuracy, while those for the second media (in second and fourth row) have wider uncertainty with lower accuracy. The different estimation precision reflects different transformation parameter values used in the simulation. Setting $\mathcal{K}_1=0.4$ indicates the saturation effect of media channel 1 is observed; setting $\mathcal{K}_2=0.8$, however, is equivalent to assuming we only observe a little more than the first half of the "S" curve. In such cases, the Hill transformation can be over-parameterized, resulting in more flexibility than the data can identify.

The brand-specific model estimates can also be compared in terms of (average) Return On Ad Spend (ROAS) and marginal Return On Ad Spend (mROAS). The definitions for these metrics is discussed further herein. One can calculate $ROAS_{m,b,i}$ and $mROAS_{m,b,i}$ for each media channel m and each brand b, estimated using the ith MCMC sample of the media parameters. The variation in these metrics can then be used to measure uncertainty.

Figure 9:
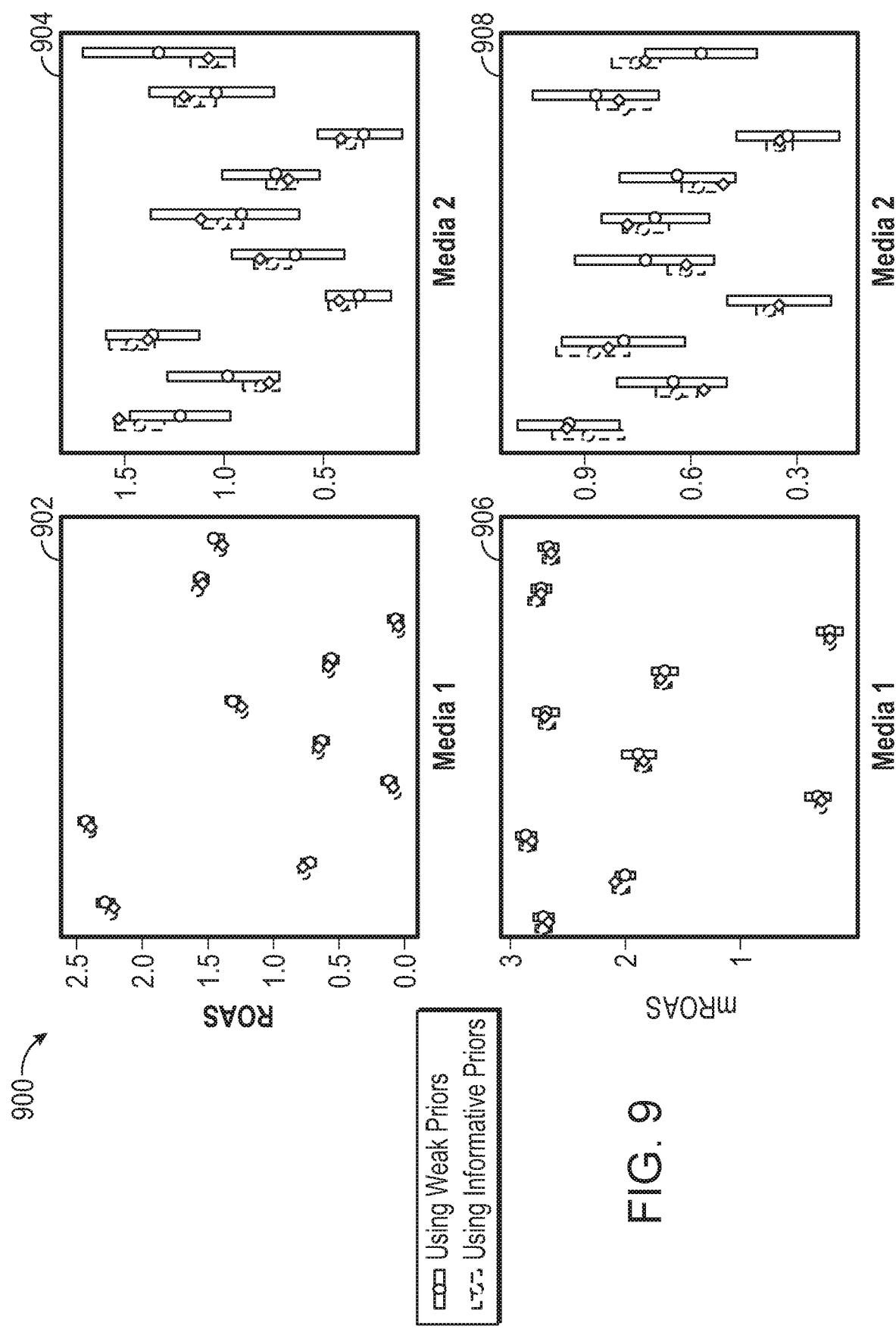
FIG. 9 is a set of charts comparing return on ad spend (ROAS) and marginal return on ad spend (mROAS) for a brand Bayesian hierarchical media mix model generated based on informative priors and brand Bayesian hierarchical media mix model based on weak priors according to an illustrative implementation.

Referring now to FIG. 9, charts 900 are shown illustrating a comparison of estimated average ROAS (charts 902 and 904) and mROAS (charts 906 and 908) for each of the 10 brands simulated in an example dataset, of media 1 (left bar of each set) and media 2 (right bar of each set), against the true values (illustrated by the diamond dots). The bottom level of each bar represents the 5th percentile of the estimated values, while the top level the 95th percentile and the dot the posterior mean. Another version of this figure for media 1 FIG. 31, where the true values are subtracted from the estimations.

FIG. 9 summarizes the ROAS metrics. For the 10 brands in the same example dataset as in FIG. 7, the ROAS metrics are calculated using samples drawn from the 2000 MCMC iterations (after warm-up). In general, the estimates are more accurate for media channel 1. The informative priors reduce the uncertainty in estimated ROAS and mROAS.

For media 1, the variation of ROAS and mROAS across brands is large compared to the variation within a single brand. By definition, ROAS measures the average performance of each media channel over its historical spend level and thus reflects the different media spend levels of the brands.

For an example of the impact of actual media spend on estimated ROAS, consider a small brand whose media spend mostly resides on the lower end of the media response curve. ROAS only measures the media channel performance restricted to the section of the response curve observed for this brand; it does not illustrate any information on the accuracy of potential extrapolation. Meanwhile, if a brand has media spend level that varies substantially over time, ROAS calculated over different time periods would be expected to have large variation due to advertising that corresponds to different sections of the media response curve. Therefore, the variation in estimated ROAS caused by different levels of media spend can sometimes be confounded with the variation introduced by model estimation. The other metric, mROAS, shares the same behavior, for it only measures the model performance induced by a small (1%) change in media variables and is partially influenced by the value at which the small change is applied.

Figure 10:
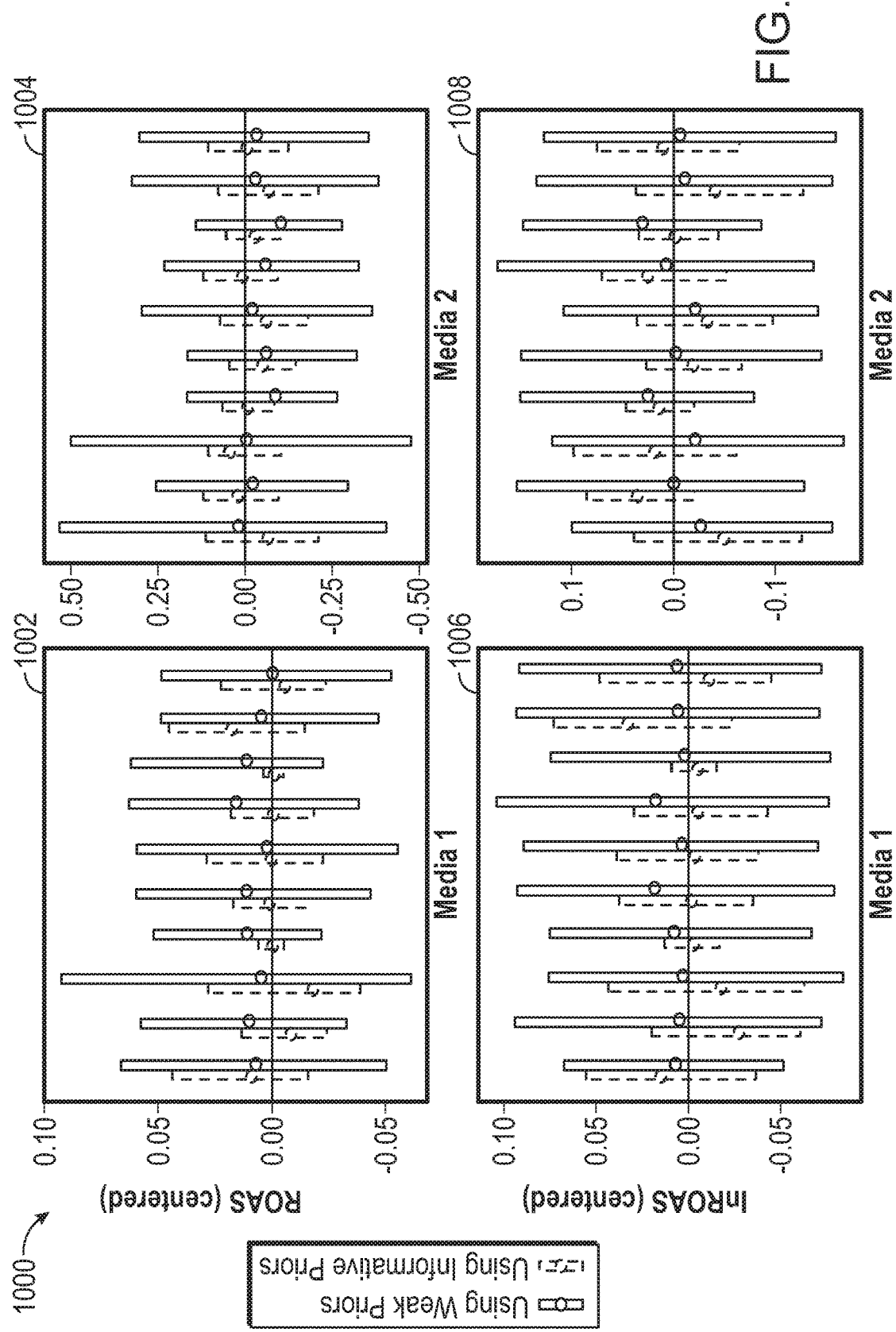
FIG. 10 is a set of charts comparing ROAS and mROAS for a model generated based on weak priors and a brand Bayesian hierarchical media mix model generated with informative priors where the true value is subtracted from the determined ROAS and mROAS values according to an illustrative implementation.

The above simulation can be repeated 100 times using the same category-level parameters specified in Table 1, as well as fixed overall brand sizes. Each simulation dataset contains 10 brands. The estimated average ROAS and mROAS after subtracting the true values is illustrated in FIG. 10. Each data point summarized in FIG. 10 is posterior mean estimates over all Markov Chain Monte Carlo (MCMC) iteration for a simulated dataset. The benefits of using informative priors are consistent across datasets with similar characteristics.

Referring now to FIG. 10, charts 1000 compare estimated average ROAS (charts 1002 and 1004) and mROAS (charts 1006 and 1008) summarized over the 100 simulated datasets, of media 1 (charts 1002 and 1006) and media 2 (charts 1004 and 1008), after subtracting the true values. The bottom level of each bar of charts 100 represents the 5th percentile of the estimated values, while the top level the 95th percentile and the dot the posterior mean.

Figure 11:
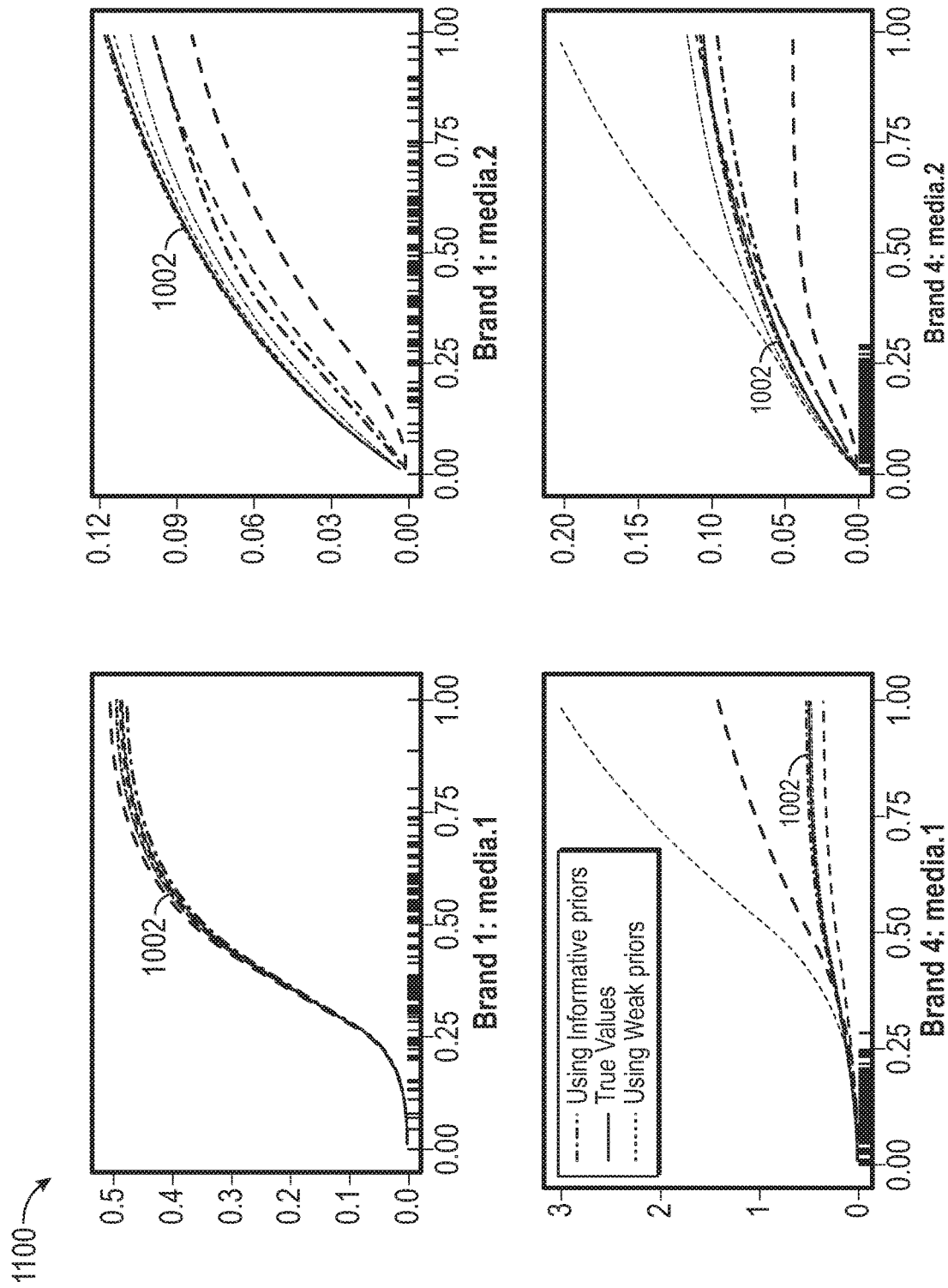
FIG. 11 is a set of charts illustrating response curves for a brand hierarchical Bayesian media mix model generated with informative priors and a brand Bayesian hierarchical media mix model generated with weak priors according to an illustrative implementation.

Referring now to FIG. 11, charts 1100 illustrate response curves estimated by the brand-specific models using informative priors with 5th and 95th percentiles (in dotted lines), compared with that using weak priors with 5th and 95th percentiles (in dotted lines), and the true response curve (line 102). Tick marks on the bottom indicate values of the observed media variables of each brand.

Comparisons of Response Curves Estimated by Brand Models

To isolate the media parameters from the variation in the dataset, a media response curve can be defined as $R(x)=\beta_m H(x, K_m, S_m)$ for $x \in [0, 1]$.

Though the average ROAS and mROAS are critical in reporting the overall effectiveness of media, a reasonable estimation of the response curve is required to extrapolate beyond the range of individual brand's media spend with good confidence, and therefore, is critical to obtaining a reasonable estimate of optimal media mix. The response values can be predicted using each of the Markov Chain Monte Carlo (MCMC) samples at each sampled values of $x \in [0,1]$ and then use the 5th and 95th percentiles of the response values at each evaluation point of x, i.e., the pointwise 90% credible interval, to indicate the uncertainty in estimating the response curve.

FIG. 11 illustrates the response curves for two of the 10 brands. The brand model using informative priors often provides a narrower credible interval, as well as a smaller error. Three types of patterns can be observed FIG. 11. Both brand models offer a reasonable estimate of the response curve for media 1 of brand 1. For media 2 of brand 1, the weak priors produce estimates with larger deviation from the true response curve than the category informative priors, but both still have fairly similar shape. Lastly, for media 1 of brand 4, the response curve estimated using weak priors is highly deviated from the true response curve and has a wrong trajectory.

The improvement realized by using informative priors can be explained by the enriched variation from the category dataset, compared to a single brand's dataset. The tick marks along the base of each plot in FIG. 11 indicate the locations of each media spend observation of the brand plotted. Substantial improvements are seen in regions where the advertiser has little data. For media 1 of brand 1 and 4, it can be seen that within the range of the brand's own observations, the response curve estimated by the brand model with weak priors agrees with the true response curve. It is the section beyond the range of each brand's media spend where the informative priors provide the most increase in estimation accuracy and confidence. A growing brand could potentially be interested in that section, for extrapolation purposes, when they consider expanding and increasing their media spend in certain media, e.g., online channels.

FIG. 11 shows that the informative priors derived from the category model can contain information learned from other brands, and therefore help brands to estimate the later section of the response curves better than they could with their own data. The improvement lies not only in the accuracy of point estimates (solid lines in FIG. 11), but also in the width of the credible intervals (dashed lines).

In particular, the improvement can occur because of the trade-off among the media parameters. The category model uses a larger range of values of media variables to better narrow down the media parameters. By providing the brand model with an informative prior derived from the category model, the estimation accuracy of the media parameters can be improved, even beyond the range of media spend one brand observes. On the other hand, Brand 1 has a wide range of spend levels. Its response curve estimated using weak priors already agrees with the true curve well.

In general, brands that have a good variation in their own media spend would see less improvement in extrapolation accuracy and estimation confidence from incorporating category informative priors. However, they may still benefit from category analysis in media channels where other brands have spent differently, and also from accurately capturing competitor effects (further discussion with reference to FIGS. 12-15).

Figure 12A:
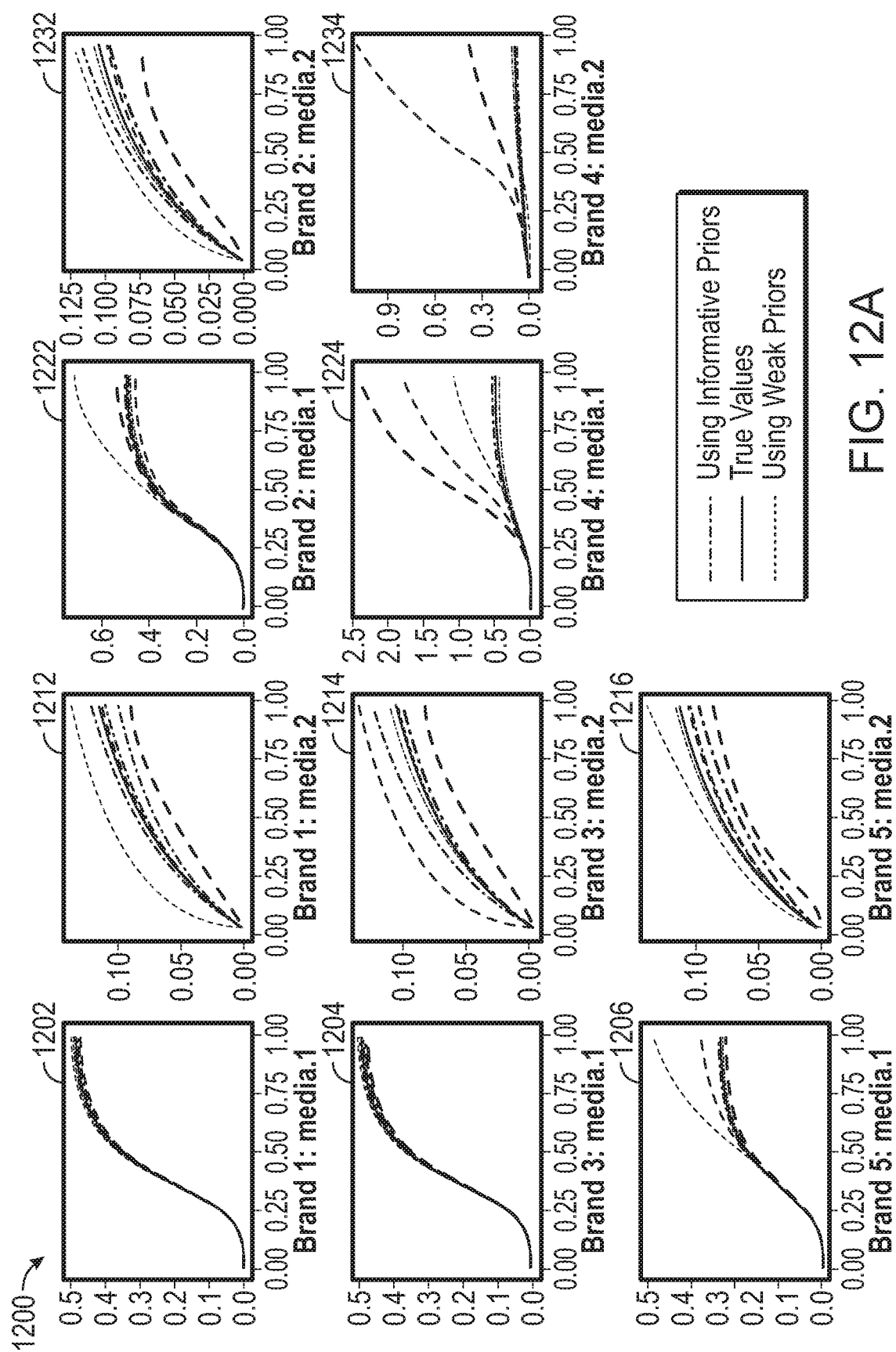
FIGS. 12A-12B are a set of charts comparing response curves for a brand Bayesian hierarchical media mix model generated with informative priors and a brand Bayesian hierarchical media mix model generated with weak priors according to an illustrative implementation.
Figure 12B:
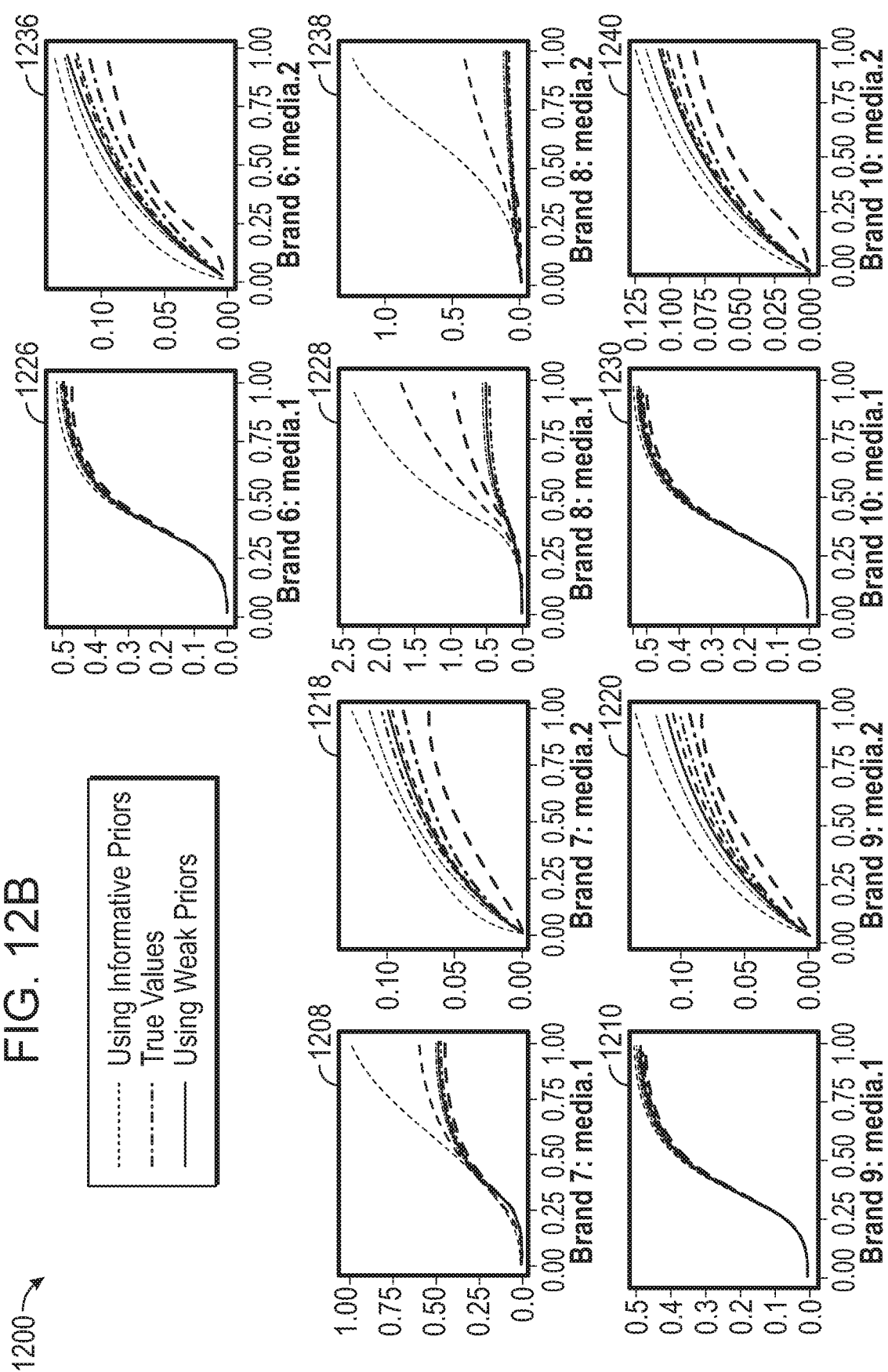

To inspect the generality of our above observations, the distribution of mean response curve estimated based on each of the 100 simulated datasets for all 10 brands can be plotted in FIGS. 12A-12B. The improvement of using informative priors is not an isolated case.

Through the above simulation study, it can be seen that pooling different brands' datasets can improve the estimation accuracy of response curves of media impact, as the cross-brands variation in media variables can be the key to better inference. This conclusion may apply to both media variables and control variables.

In some implementations, pooling datasets across brands may improve the accuracy of parameter estimation, but not guarantee the estimation be unbiased, nor the estimation uncertainty reasonably small. Bias or large uncertainties could be introduced by other factors such as omitted variables.

Competitive Factors Impacting KPIs

The potential benefits of including competitive factors in the HCM can be illustrated with reference to FIGS. 12A-12B. In particular, price of the brand and of its competitors can be used as example control variables.

Referring now to FIGS. 12A-12B, charts 1200 illustrate a comparison of estimated response curves summarized over the 100 simulated datasets with 5th and 95th percentiles indicated with the true response curves, of media 1 (charts 1202-1210 and 1222-1230) and media 2 (1212-1220 and 1232-1240).

TABLE 2

Specification of media and price impact

| | Media 1 | Price | Competitor price |
|---|---|---|---|
| Transformation | $H(x, K = 0.4, S = 4)$ | $\log(x)$ | $\log(x)$ |
| Coefficient | $\beta_1, {}^{\bullet} \sim N(0.5, 0.01^2)$ | $\gamma_p, {}^{\bullet} \sim N(-1, 0.05^2)$ | $\gamma_{cp}, {}^{\bullet} \sim N(0.5, 0.05^2)$ |

Data Simulation and Model Setup

In this scenario, only one media variable may be simulated, in order to focus on the effects of competitive factors. The price variable is simulated as an autoregressive process of order 4, to imitate what is observed in the soda case study (see FIG. 27). The competitor price variables can be determined as described elsewhere herein and with respect to FIG. 31. The simulated response depends on a control variable that can be assumed to be known to the category dataset but withheld from any individual brand alone. 100 simulated datasets using the same specifications listed in Table 2 can be used, each of which contains weekly observations of 10 brands over 104 weeks. For each simulation instance, we ran 2000 Markov Chain Monte Carlo (MCMC) iterations using RStan with 4 parallel chains.

For each simulated dataset, the HCM specified (e.g., HCM 134) (described with reference to Equations 6-7 and 9-10) was developed, using the category data of B=10 brands and T=104 weeks. The same weak priors (e.g., the weak priors 132) described in (Equation 6-7) can be used for the media parameters. The two control variables, price and competitor price, can be included in the model. The following weak priors in the category model for the price coefficient $\gamma_p$ and the competitor price coefficient $\gamma_{cp}$ (Equation 15), $\gamma_p \sim \text{Uniform}(-5,5), \gamma_{cp} \sim \text{Uniform}(-5,5)$.

Comparisons of Brand-Specific Models Using Informative and Weak Priors

Two sets of brand-specific models can be developed, one set uses the same weak priors as the category model, the other uses the informative priors derived from the category model results. Each brand-specific model uses only the single brand's data of the one media variable and the brand's own price variable. The competitor price variable may be omitted in the brand-specific models. If competitor variables are available to individual brands, it may be beneficially to be used in a full category model.

Figure 13:
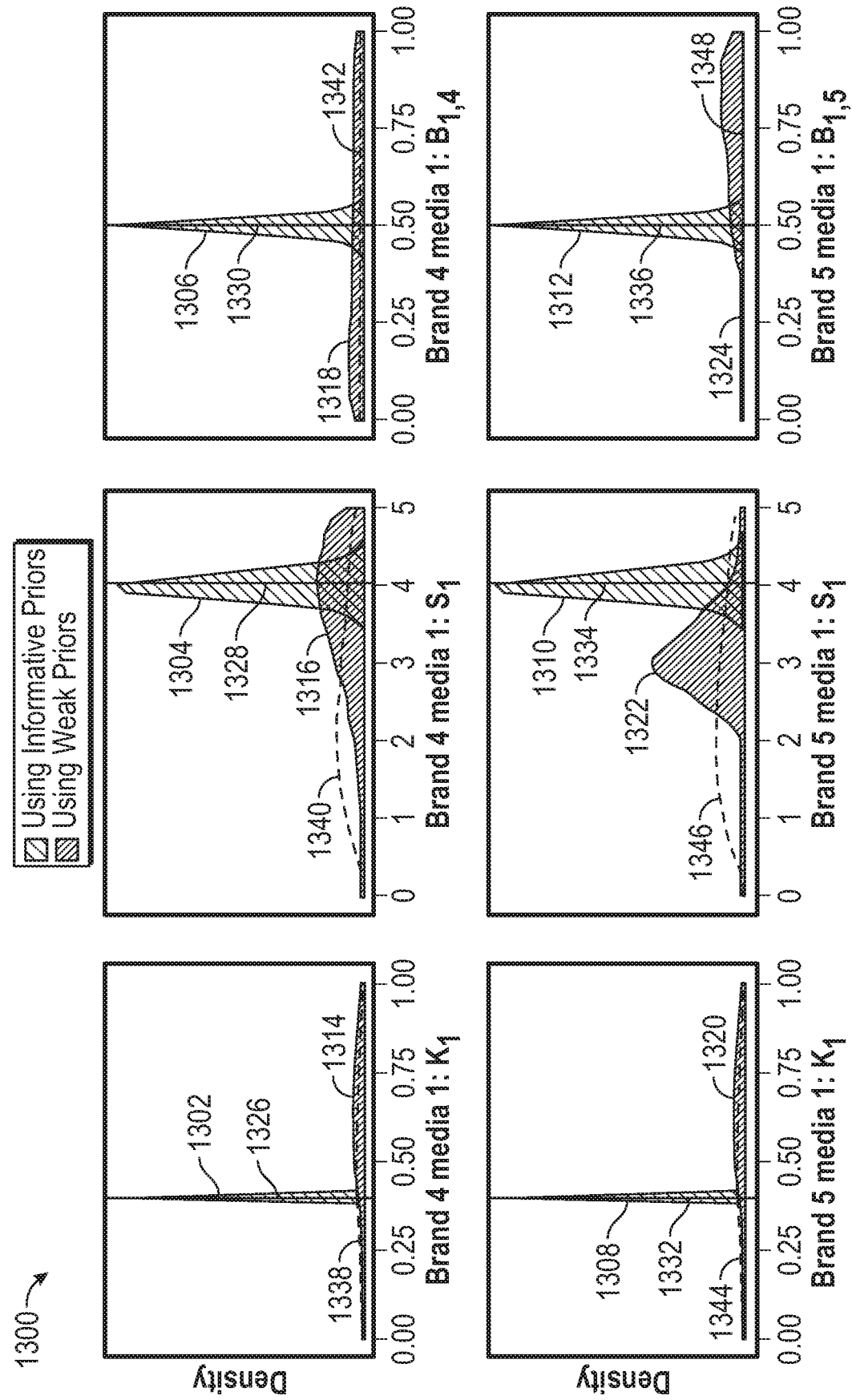
FIG. 13 is a set of charts comparing posterior densities of a hierarchical Bayesian media mix model generated with informative priors and a brand Bayesian hierarchical media mix model generated with weak priors according to an illustrative implementation.

Referring now to FIG. 13, marginal density plots 1300 of media parameters posterior samples estimated by brand models using informative priors (posteriors 1302-1312), compared to those using weak priors (posteriors 1314-1324), using an example dataset, as well as the true values (lines 1326-1336) and the weak priors used (priors 1338-1348) are shown.

FIG. 13 compares the individual media parameter estimates by the brand-specific models against the true values for two of the 10 brands in one of the 100 simulated datasets. The brand models using the weak priors show relatively low estimation accuracy and large uncertainties, partially due to the omitted competitor variable. FIG. 13 shows that informative priors can improve the estimation accuracy (e.g., brand 4) and confidence (for both brands shown). Additional results are discussed with reference to FIGS. 32-33, i.e., the centered ROAS and mROAS comparisons (FIG. 32) and response curve comparison (FIG. 33).

Figure 14:
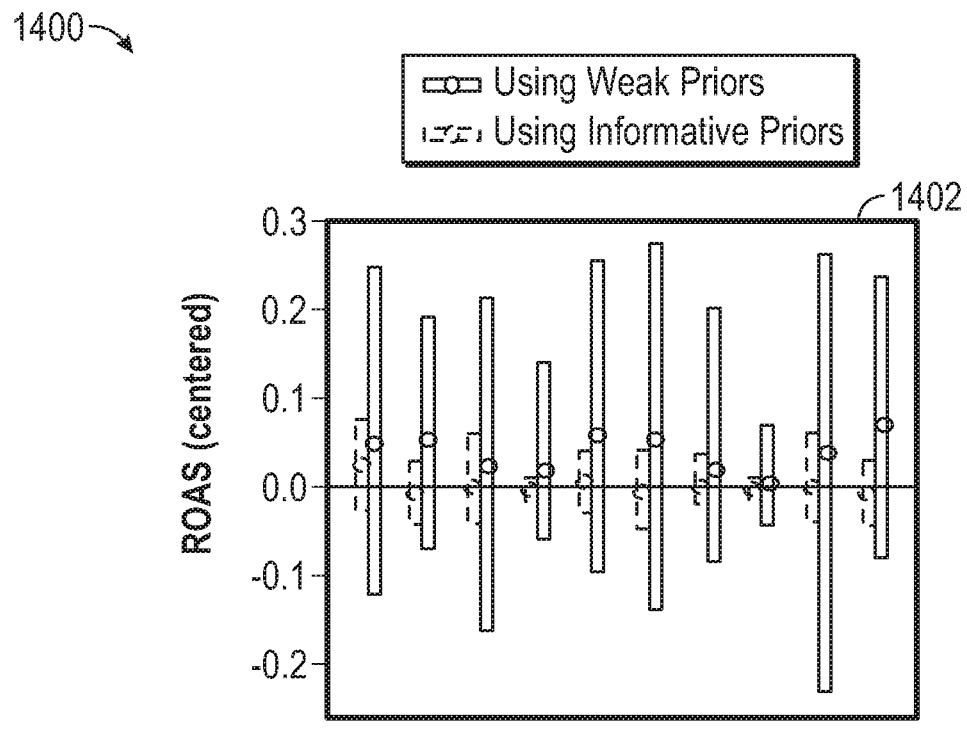
FIG. 14 is a set of charts comparing ROAS and mROAS values for a brand Bayesian hierarchical media mix model generated with informative priors and a Brand Bayesian hierarchical media mix model generated with weak priors according to an illustrative implementation.
Figure 14:
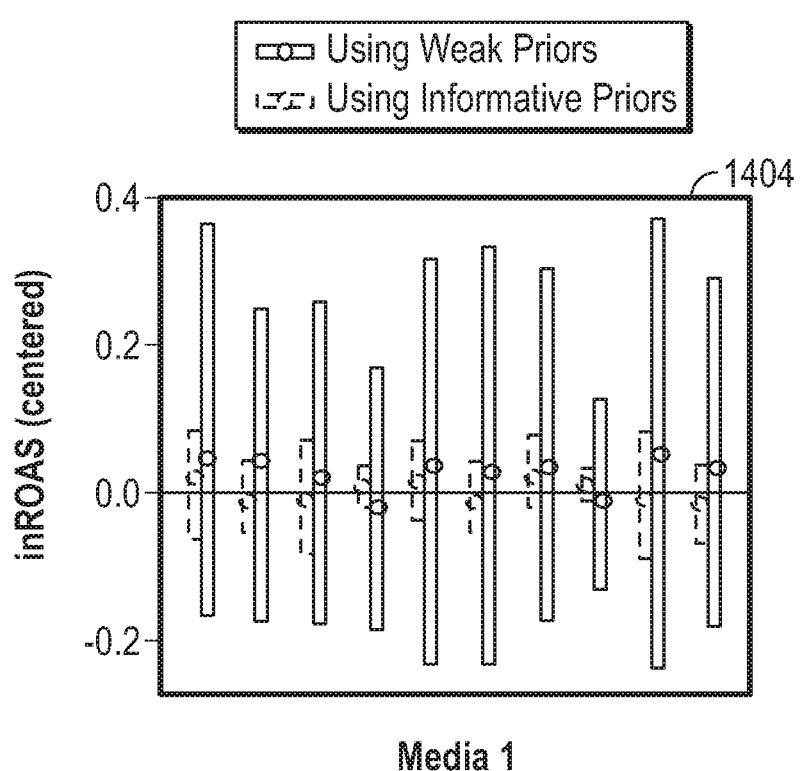

Referring now to FIG. 14, charts 1400 illustrate a comparison of estimated average ROAS (chart 1402) and mROAS (chart 1404) summarized over the 100 simulated datasets of media 1, after subtracting the true values. The bottom level of each bar represents the 5th percentile of the estimated values, while the top level the 95th percentile and the dot the posterior mean.

Figure 15:
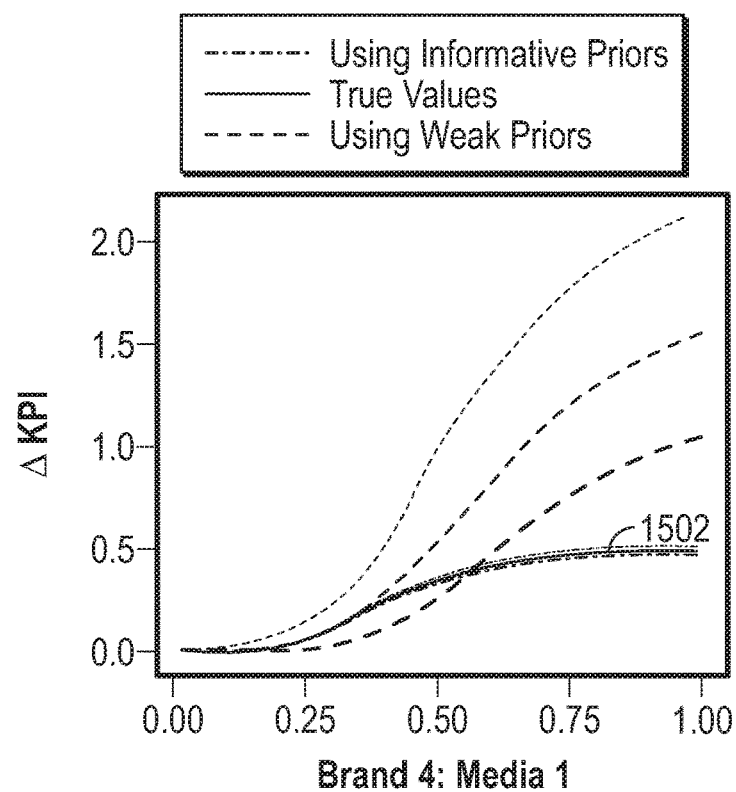
FIG. 15 is a set of charts comparing response curves for a brand Bayesian hierarchical media mix model generated with informative priors and a brand Bayesian hierarchical media mix model generated with weak priors according to an illustrative implementation.
Figure 15:
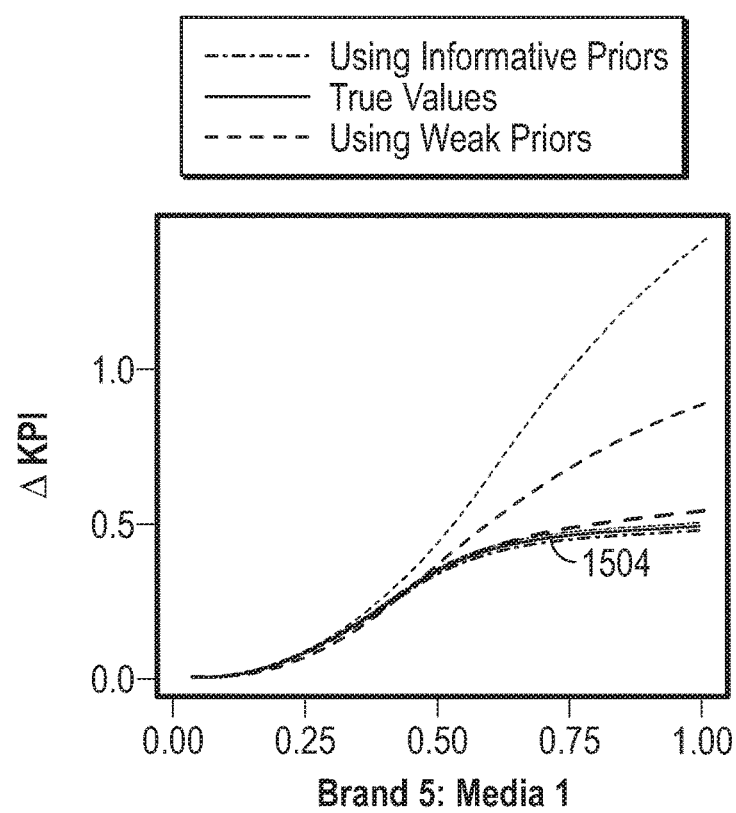

Referring now to FIG. 15, charts 1500 illustrate a comparison of estimated response curves summarized over the 100 simulated datasets with 5th and 95th percentiles (dashed lines) with the true response curves (lines 1502 and 1504), of media 1 for two example brands.

FIG. 14 compares the average ROAS and mROAS centered by true values summarized over the 100 datasets. FIG. 15 compares the estimated media response curves with the true response curve, summarized over the 100 datasets. It can be seen that informative priors consistently improves estimation accuracy as well as estimation confidence, especially for the estimated response curves.

TABLE 3

| Specification of media impact | | |
|---|---|---|
| | Media 1 | Media 2 |
| $\mathcal{K}$ | 0.4 | 0.8 |
| $\mathcal{S}$ | 4 | 1 |
| Coefficient $\beta_m$,• | $\beta_1$,•N(0.5, 0.01²) | $\beta_2$,•~N(0.2, 0.05²) |

Non-Trivial Variation Among Brands

In the following scenario, the importance of a category-brand hierarchy in developing a category model is demonstrated, when there is non-trivial variation among brands. The findings from this study can be extended to variation in control variable coefficients without loss of generality.

Data Simulation and Model Setup

Two media channels can be simulated with the specifications listed in Table 3. The standard deviation of the media coefficients are increased from previous simulations to 20-25% of the mean value, while the other media parameters remain the same as in Simulation where across brand media variation is larger than within-brand variation. We simulate 100 datasets using the same specifications, each of which contains weekly observations of 10 brands over 104 weeks.

Figure 16:
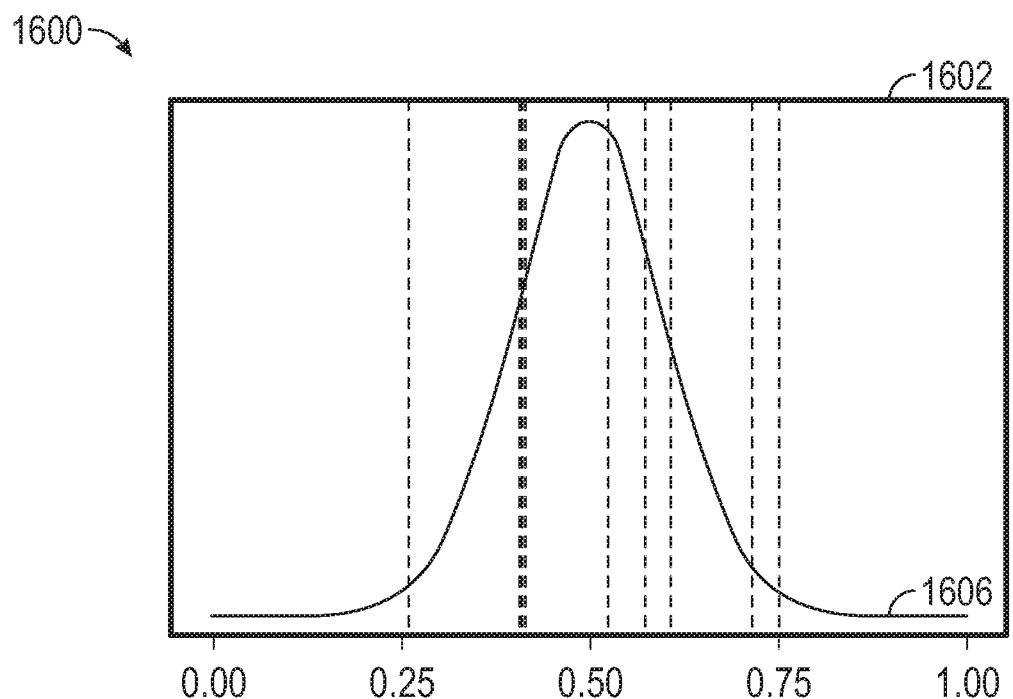
FIG. 16 is a set of charts illustrating distributions of media coefficients for a brand Bayesian hierarchical media mix model according to an illustrative implementation.
Figure 16:
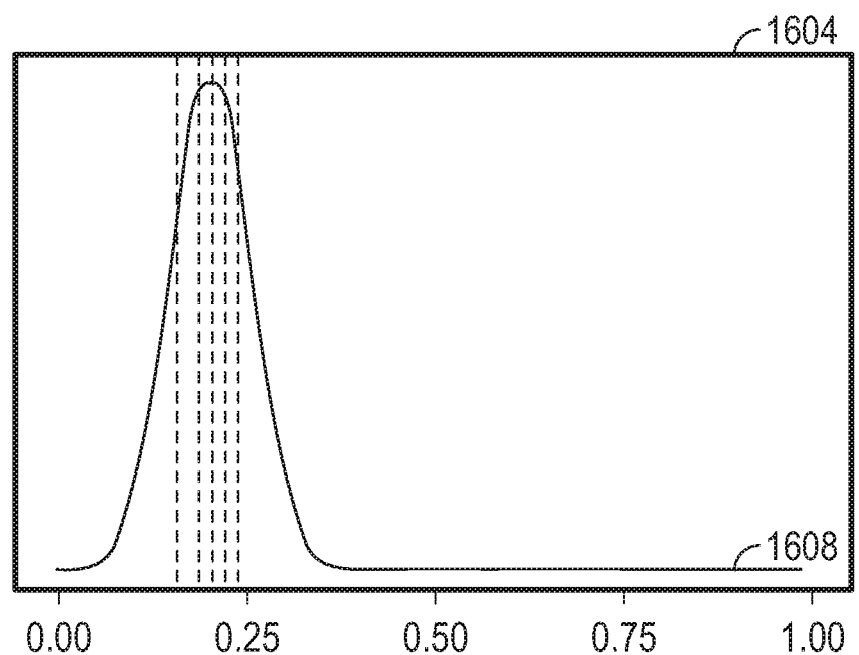

Referring now to FIG. 16, charts 1600 illustrate illustrates the distributions used to sample the brand-specific media coefficients in solid lines, and the 10 values sampled for the 10 brands in dotted vertical lines, for one simulated dataset. In FIG. 16, distributions (solid lines 1606 and 1608) of brand-specific media coefficients for media 1 (chart 1602) and media 2 (chart 1604), as well as the 10 brand-specific coefficients (dashed lines).

In this simulation, brand-specific models can be compared using informative priors derived from the HCM with informative priors derived from a category model without a hierarchy. The latter can be specified similarly to the HCM, but with the following additional assumption (Equation 16), $$\beta_{m,1} = \ldots = \beta_{m,B} = \beta_m,$$

for m=1, . . . , M. We refer to a category model under (Equation 16) as a flat category model (FCM) from here on.

Summaries of Derived Informative Priors

Figure 17:
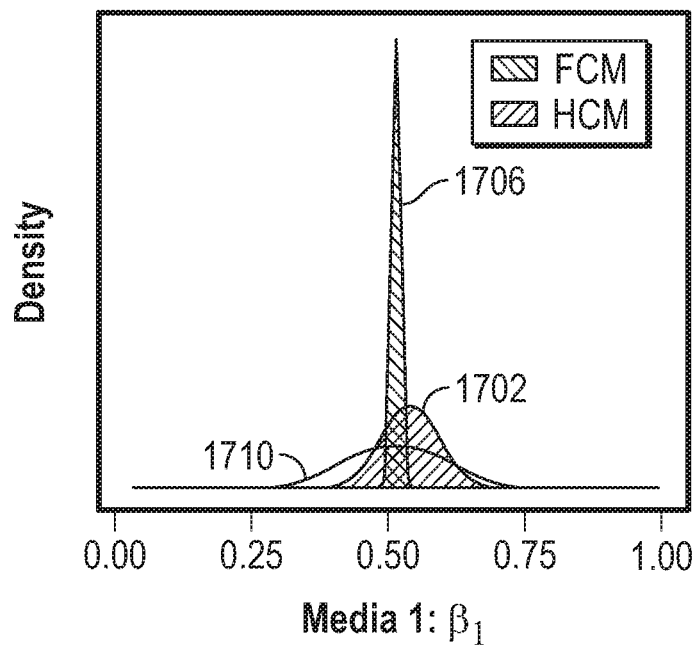
FIG. 17 is a set of charts comparing marginal density plots of media parameter posterior samples for a category Bayesian hierarchical media mix model and a flat category Bayesian hierarchical media mix model according to an illustrative implementation.
Figure 17:
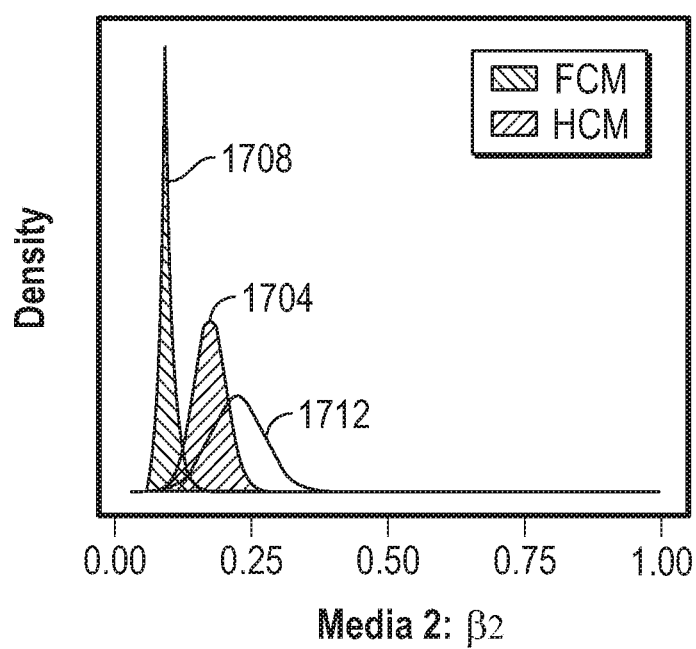

Referring now to FIG. 17, charts 1700 illustrate marginal density plots of media parameters. The marginal density plots of media parameters posterior samples estimated by the HCM are shown by plots 1702 and 1704. The marginal density plots of media parameters posterior samples estimated by the FCM are shown by plots 1706 and 1708. The density plots for the HCM and the FCM are compared to the true distribution (distributions 1710 and 1712) used to generate the brand-level media coefficients $\beta_{m,b}$'s.

The posterior samples of the category-level media coefficients $\beta_m$ estimated by the two category models can be examined and compared. FIG. 17 displays such a comparison using one simulated dataset. It is not entirely an equitable comparison, considering that the posterior samples of $\beta_m$ in HCM represents the distribution of the mean parameter of the distribution from which the brand-specific coefficients $\beta_m$, ·are drawn, while the posterior samples of $\beta_m$ in FCM represents the distribution of the brand-specific $\beta_m$, ·, due to Equation 16. Here a comparison is conducted in order to understand the difference in the two category model structures.

FIG. 17 shows that the posterior distribution of $\beta_1$ estimated by the FCM is noticeably tighter than that from both the HCM and the distribution from which $\beta_{1,b}$'s are drawn. The plotted posterior samples are estimates of the mean parameter of the distribution from which the brand-specific media coefficients are sampled. The FCM under the assumption in Equation 16 is equivalent to a HCM with a prior distribution on $\beta_{m,b}$ with a standard deviation of 0, i.e. $\beta_{m,b}$~N($\beta_m$, 0²). The FCM posterior estimates, being a combination of the prior and data, are thus a lot tighter towards the sample mean than the HCM with a prior distribution whose standard deviation is greater than 0.

It should be noted that the $\beta_2$ estimated by both the HCM and the FCM are shifted towards 0, compared to the true distribution we used to sample the $\beta_{2,b}$'s. In fact, FIG. 16 shows that such underestimation is mostly due to chance. The 10 randomly-drawn values for the brand-specific coefficients, $\{\beta_{2,b}\}_{b=1}^{B=10}$, are not evenly distributed, more than half of the 10 values are less than the mean $\beta_2$. This simulation case shows us the limitation of category analysis when the category is small. It serves as motivational evidence to accumulate datasets from and conduct an analysis over a large category composed of many similar brands.

In this study, the posterior samples of the media parameters estimated by the HCM can be denoted as $\{\Phi_m\}^{(hc)}$ and those by the FCM as $\{\Phi_m\}^{(fc)}$. For every brand of each simulated dataset, two brand-specific models can be built using informative priors in the format of $\{\Phi_m\}^{(hc)}$ and $\{\Phi_m\}^{(fc)}$ respectively.

Comparisons of Brand-Specific Models Using Priors from the HCM V.S. FCM

Figure 18:
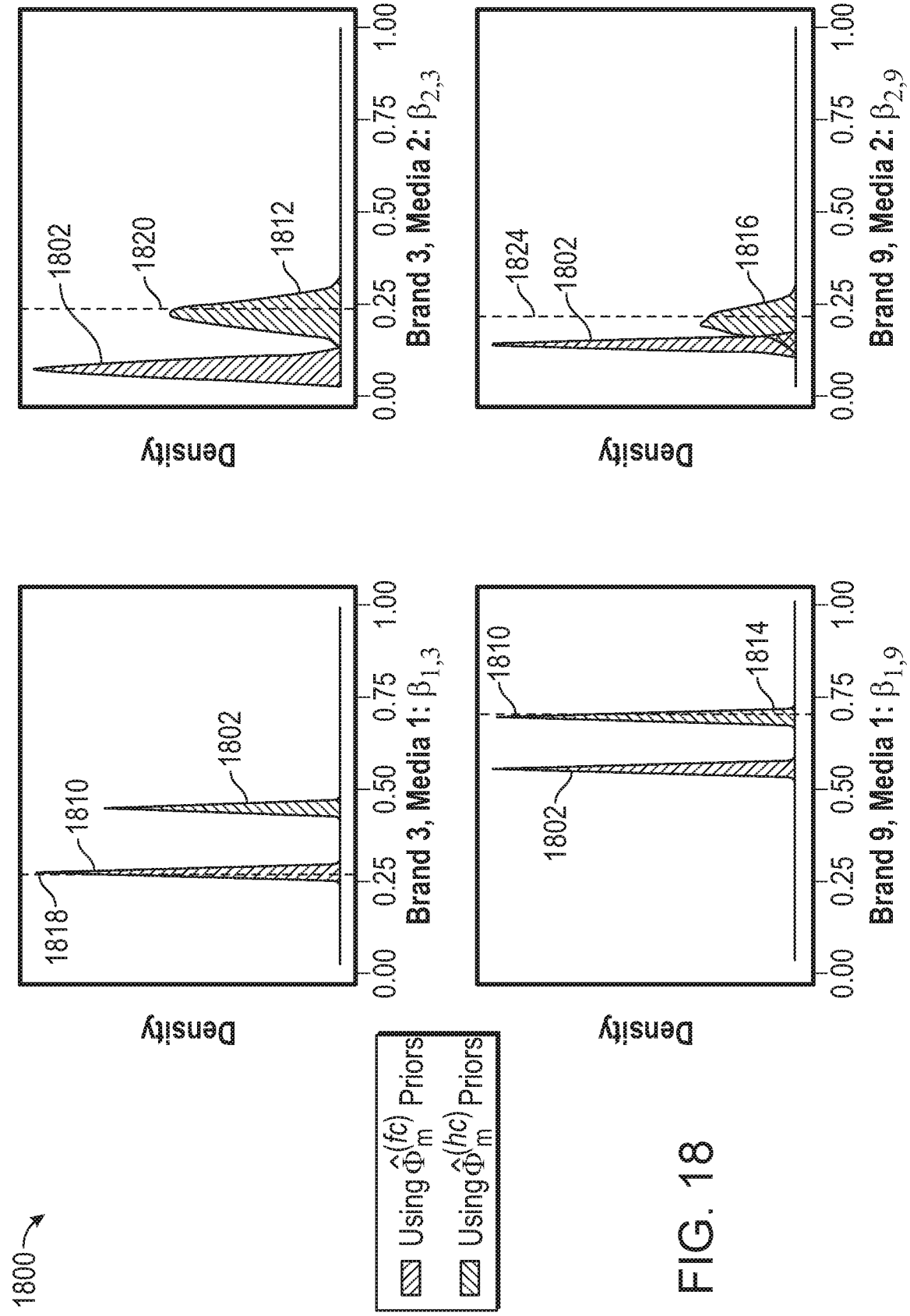
FIG. 18 is a set of charts comparing marginal density plots of media parameter posterior samples of a brand hierarchical media mix model that is generated based on informative priors generated by a category Bayesian hierarchical media mix model and a flat category Bayesian hierarchical media mix model according to an illustrative implementation.

Referring now to FIG. 18, marginal density plots of media parameters posterior samples estimated by brand models using informative priors derived from the HCM and those from the FCM (in blue), as well as the brand-specific true values (vertical red lines) using an example dataset. The posterior samples estimated using informative priors derived from the HCM are shown by posteriors 1802-1808. The posterior samples estimated using informative priors derived from the FCM are shown by posteriors 1810-1816. The brand-specific true values are shown by lines 1818-1824.

FIG. 18 compares the posterior estimates of brand-specific media coefficients using $\{\Phi_m\}^{(hc)}$ or $\{\Phi_m\}^{(fc)}$ as informative priors, with the true values indicated by the red lines, for one simulated dataset as an example. The informative priors represented by $\{\Phi_m\}^{(hc)}$ allow the brand-specific model to adapt to the underlying variation of $\beta_{1,b}$'s, while $\{\Phi_m\}^{(fc)}$ leads to high estimation error. The average ROAS and mROAS comparison for this simulated dataset (FIG. 34) is included, along with the comparison of estimated response curves (FIG. 35).

Figure 19:
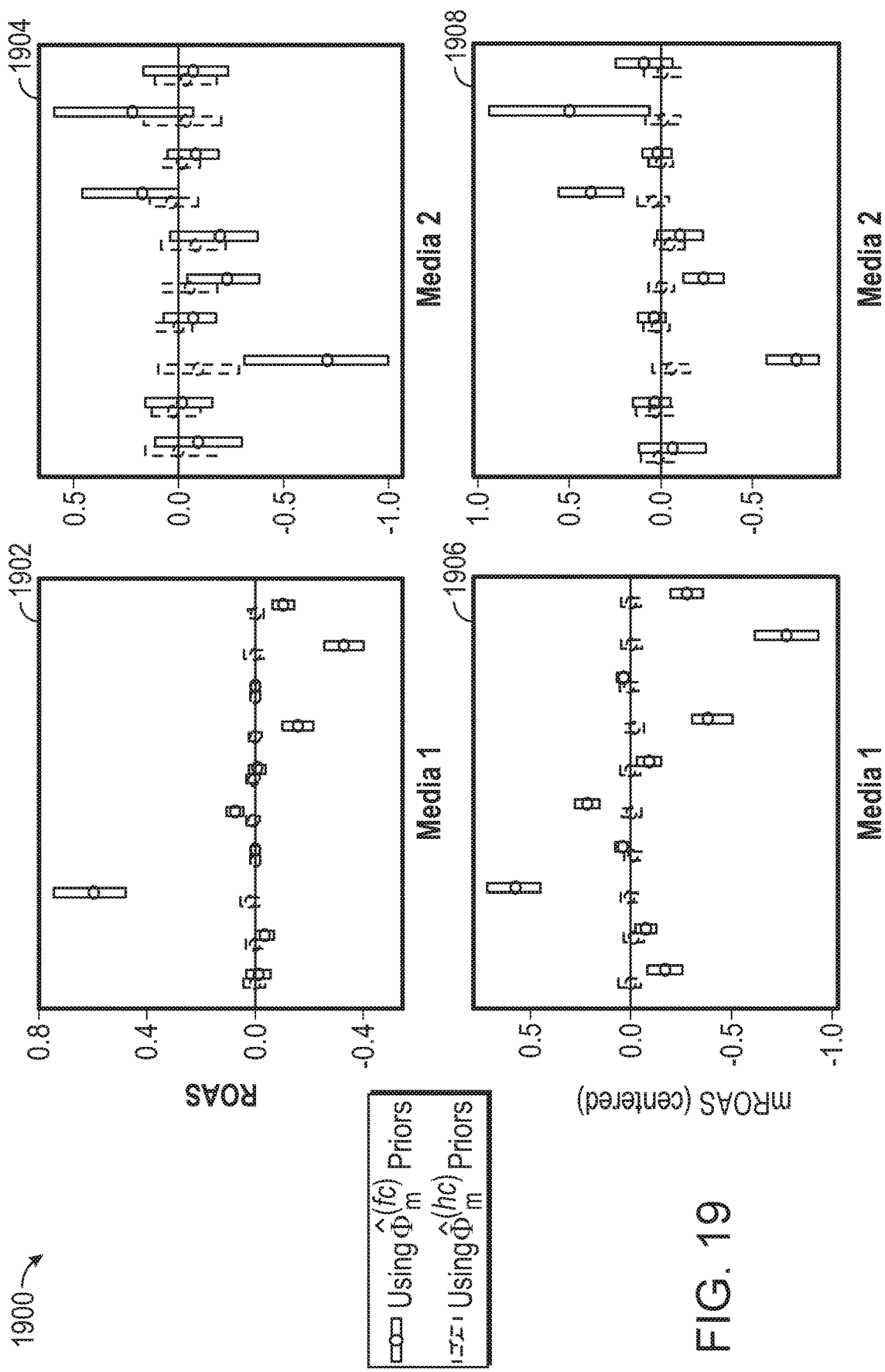
FIG. 19 is a set of charts comparing ROAS and mROAS after subtracting a true value for a brand Bayesian hierarchical media mix model that is generated based on informative priors generated by a category Bayesian hierarchical media mix model and a flat category Bayesian hierarchical media mix model according to an illustrative implementation.

Referring now to FIG. 19, charts 1900 illustrate a comparison of estimated average ROAS and mROAS summarized over the 100 simulated datasets, of media 1 and media 2, after subtracting the true values. Estimated average ROAS is illustrated by charts 1902 and 1904 while mROAS is illustrated in charts 1906 and 1908. ROAS and mROAS for media 1 is illustrated in charts 1902 and 1906 while ROAS and mROAS for media 2 is illustrated in charts 1904 and 1908. The bottom level of each bar represents the 5th percentile of the estimated values, while the top level the 95th percentile and the dot the posterior mean.

The simulation can be repeated 100 times using the same specifications summarized in Table 3 and the same 10 values of the brand-specific coefficients displayed in FIG. 16. FIG. 19 shows the distribution of the mean of estimated average ROAS and mROAS from each simulated dataset after subtracting the true values. We see that for some brands, the incorrectly flat structure of the FCM leads to significantly lower estimation accuracy of average ROAS and mROAS, compared to the uncertainties introduced by the data when calculating these two metrics. For some brands that behave similarly to the category mean, i.e. when $\beta_{m,b} \approx \beta_{m,\cdot}$, the estimation accuracy is understandably better.

Figure 20A:
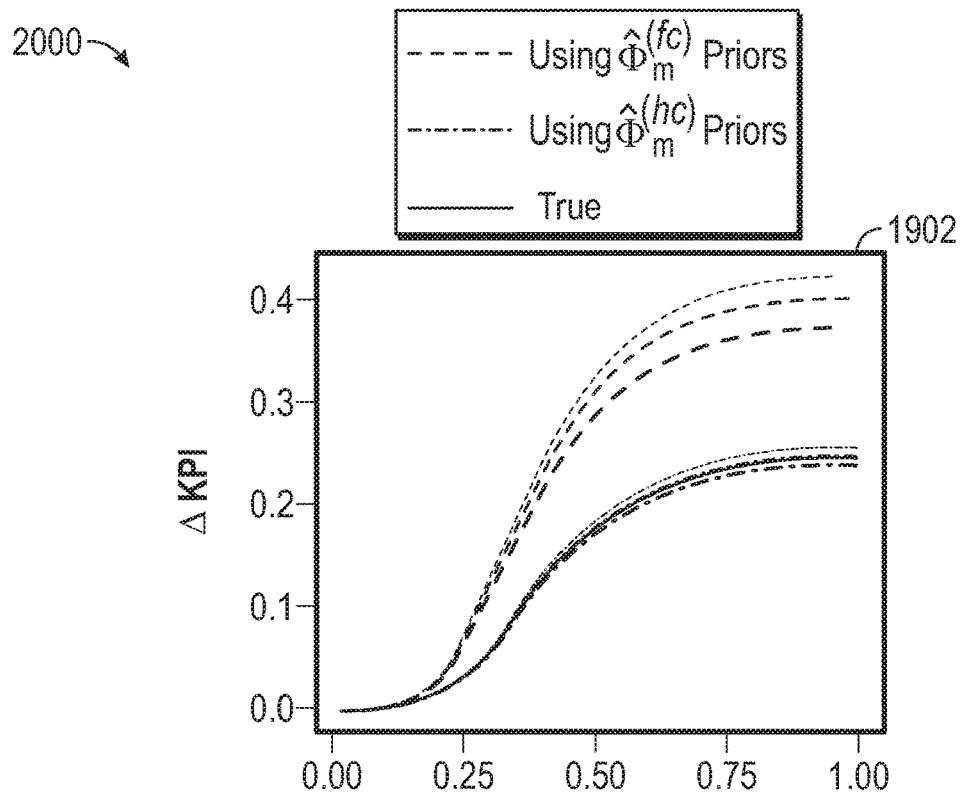
FIGS. 20A and 20B are a set of charts comparing response curves of a brand Bayesian hierarchical media mix model generated based on informative priors generated by a category Bayesian hierarchical media mix model and a flat category Bayesian hierarchical mixed medial model according to an illustrative implementation.
Figure 20A:
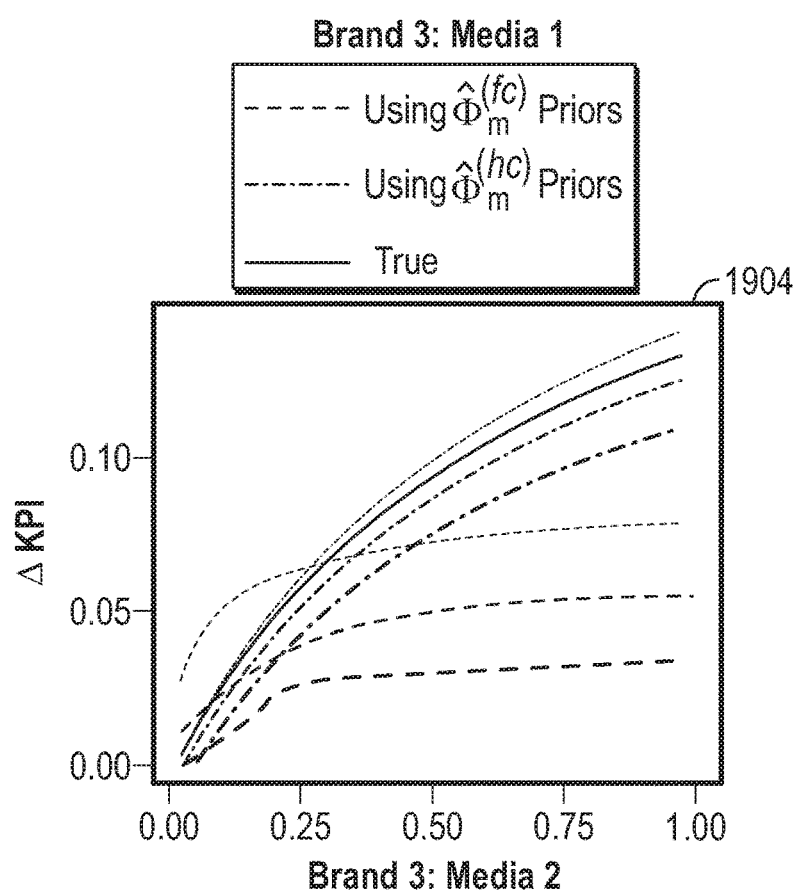
Figure 20B:
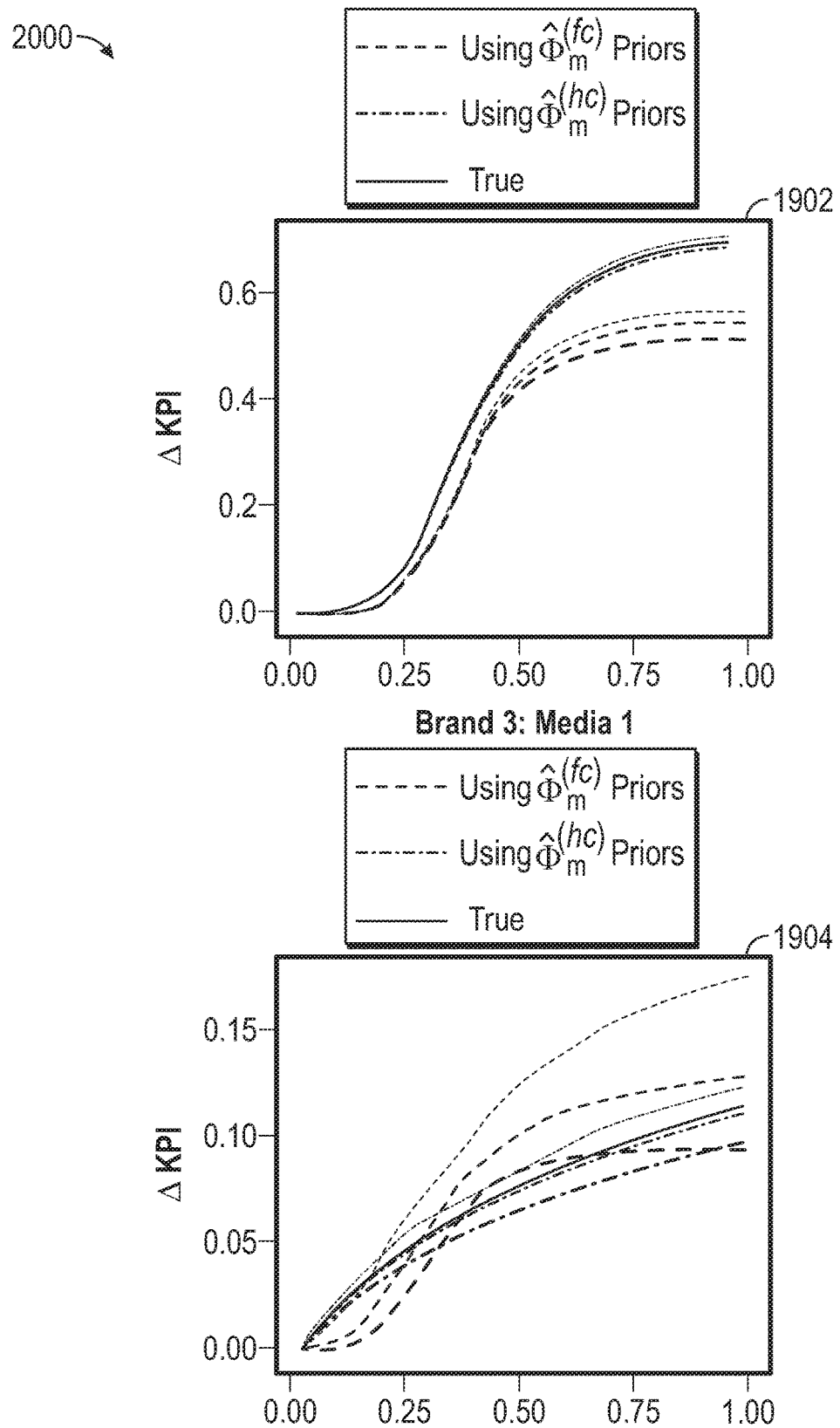

Referring now to FIGS. 20A-20B, a comparison of estimated response curves summarized over the 100 simulated datasets with 5th and 95th percentiles (in dashed lines) with the true response curves (solid curve), of media 1 (chart 1902) and media 2 (chart 1904) for two example brands is shown. FIGS. 20A-20B compares the pointwise mean of estimated response curves from each of the 100 simulated datasets for two example brands. The curves estimated by brand-specific models using $\{\Phi_m\}^{(fc)}$ show both high estimation error and large uncertainties, which confirms the importance to incorporate a category-brand hierarchy when there is variation among the brands.

Through this simulation scenario, the importance of allowing for a category-brand hierarchy in the category model when there is variation among the brands can be seen. The benefits of incorporating as many brands as possible in a category study can also be seen. Yet, this simulation only explores nontrivial variation in media variable coefficients and assumes the same shape parameters across brands within the same category. In order to gain benefits from pooling different brands together, the brands have to share similarity on some level. If there is significant variation among all media parameters across brands—such that the response curves do not share the same basic shape—one can go back to the same parameter to observation ratio as fitting a single media mix model using a single dataset. Large distinctions among brands may be the case in some categories, and in those cases category analysis is not likely to provide much improvement from analyses of individual brands. The complexity of a model may be restricted to the amount of and the information content within our data and more and/or better data can support more complex models. If there is sufficient information content in the datasets, e.g., through a category of significantly more brands than have been simulated here, it may be worthwhile to explore variations across brands in terms of media response in a more complex manner.

Case Study of the Shampoo Category

Figure 22:
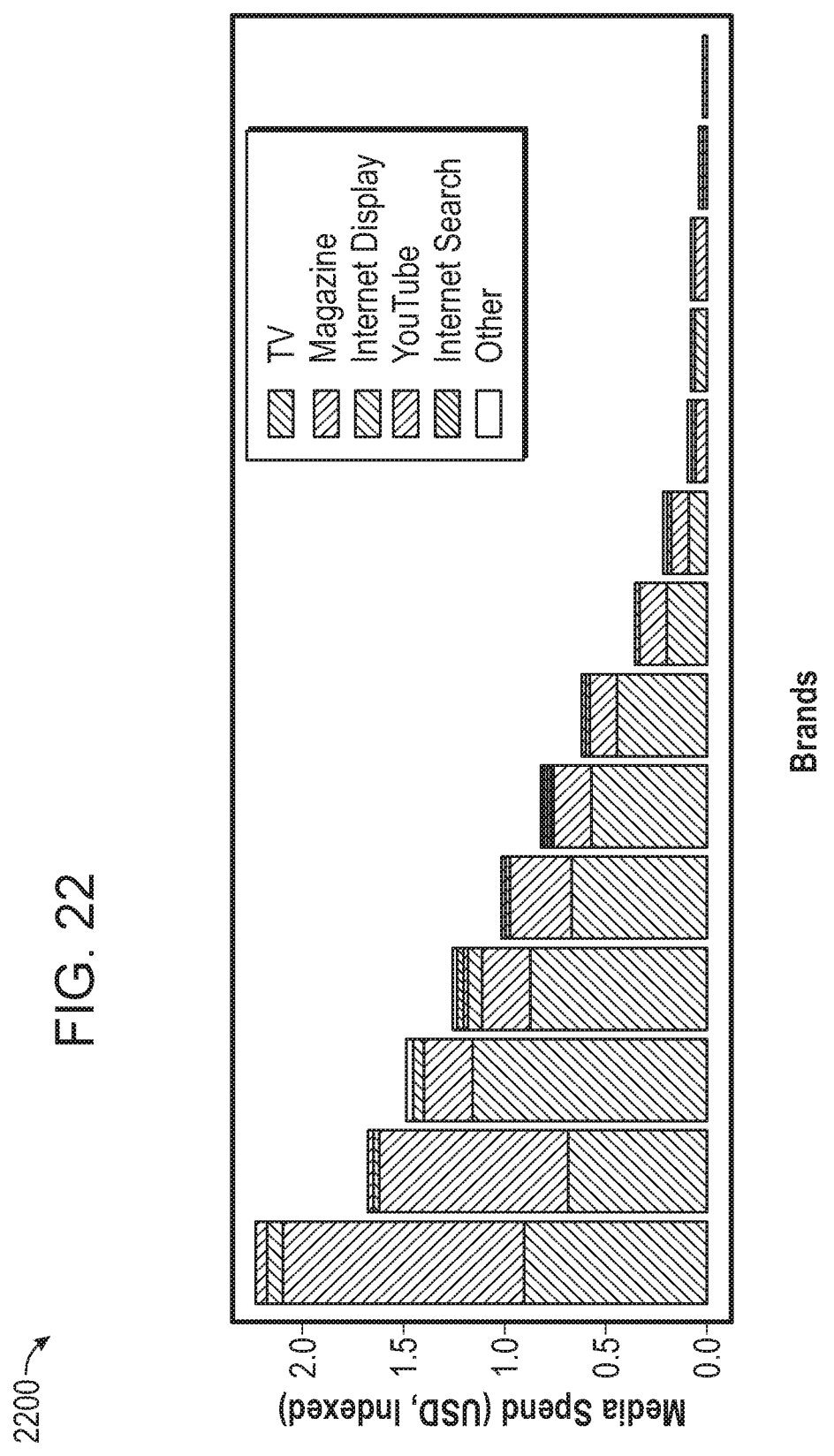
Figure 23:
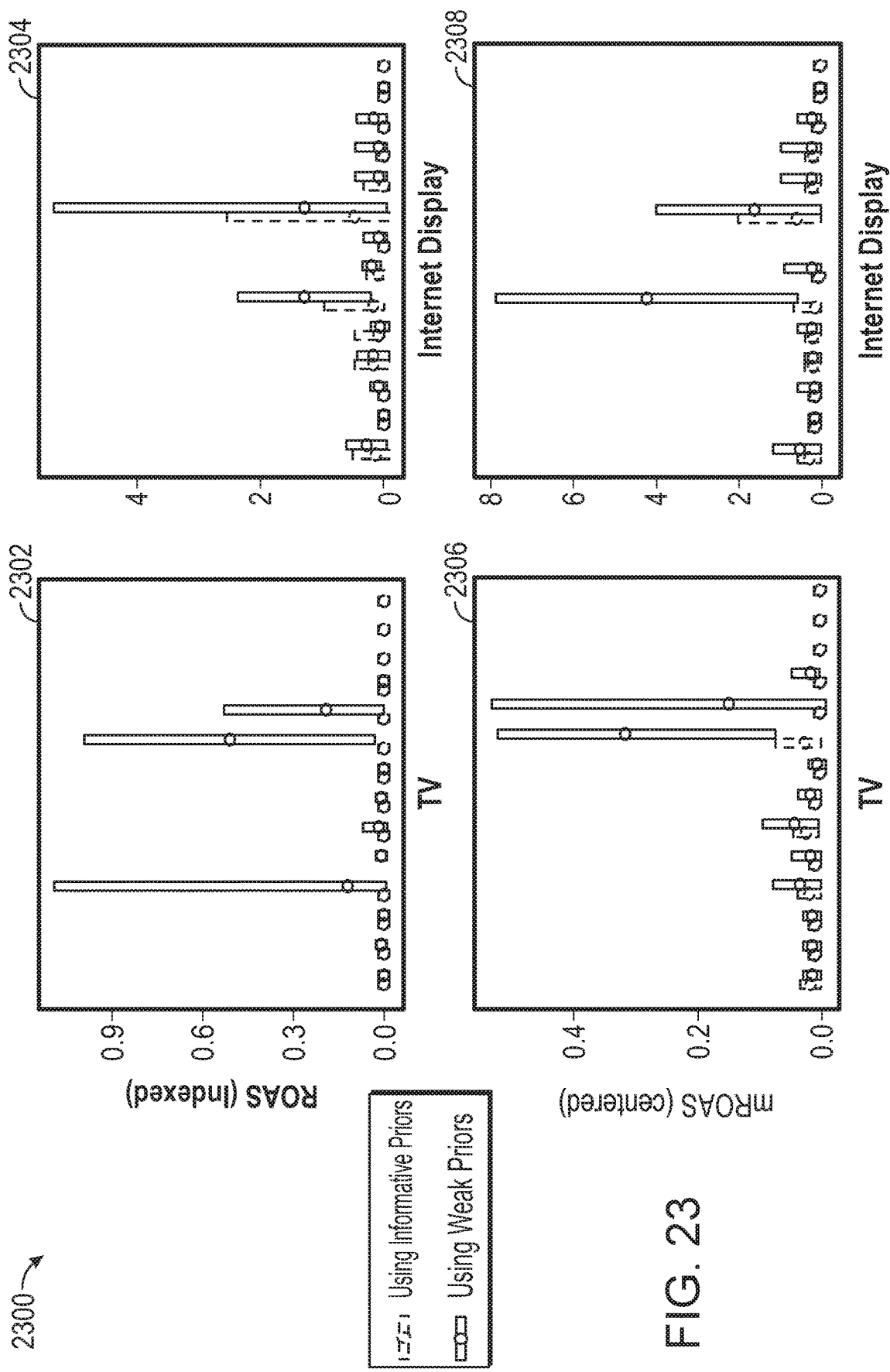
FIG. 23 is a set of charts comparing ROAS and mROAS of a brand Bayesian hierarchical media mix model generated based on the shampoo data and informative priors and weak priors according to an illustrative implementation.
Figure 24:
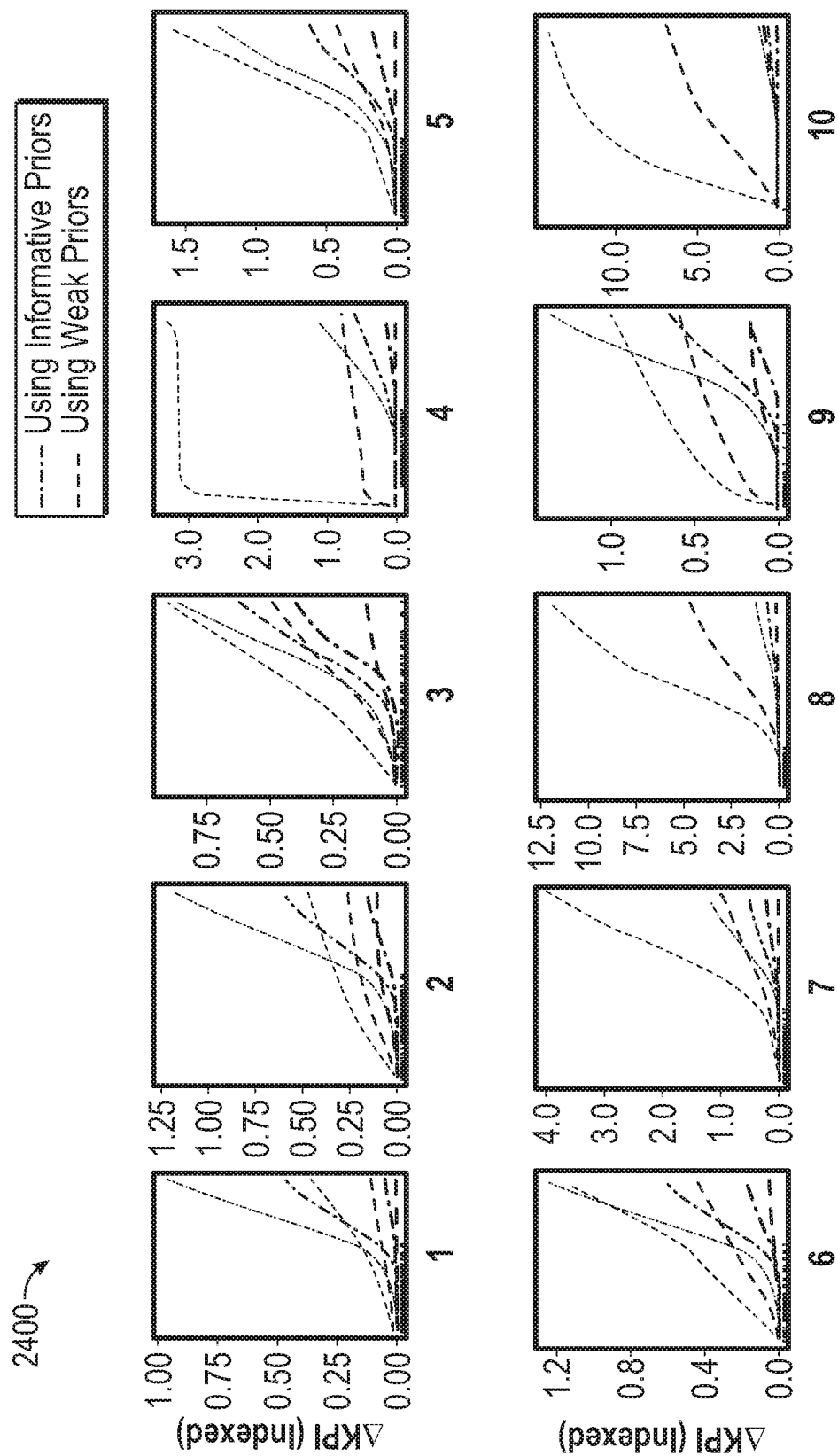
FIG. 24 is a set of charts comparing response of the brand Bayesian hierarchical media mix model generated based on the shampoo data using either weak priors and informative priors according to an illustrative implementation.

Data from a shampoo category can be used to provide an example of category-brand analysis, as well as to discuss some challenges faced in real world MMM analysis. The data used was consolidated by Neustar MarketShare and included sources such as Kantar Media, IRI, ITG, JD Power, and Rentrak (e.g., data sources 110). The dataset and the model setup is discussed with reference to FIGS. 21-22. The discussion with reference to FIGS. 23-24 compares the brand-specific results using informative priors and weak priors.

Data and Model Setup

Figure 21:
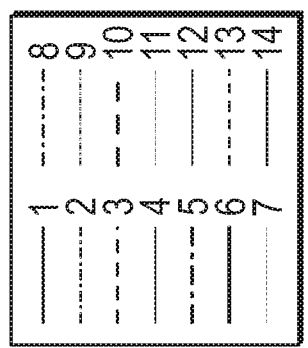
FIG. 21 is a chart illustrating price per volume for shampoo data for shampoo brands used to generate the Bayesian hierarchical models discussed herein according to an illustrative implementation.
Figure 21:
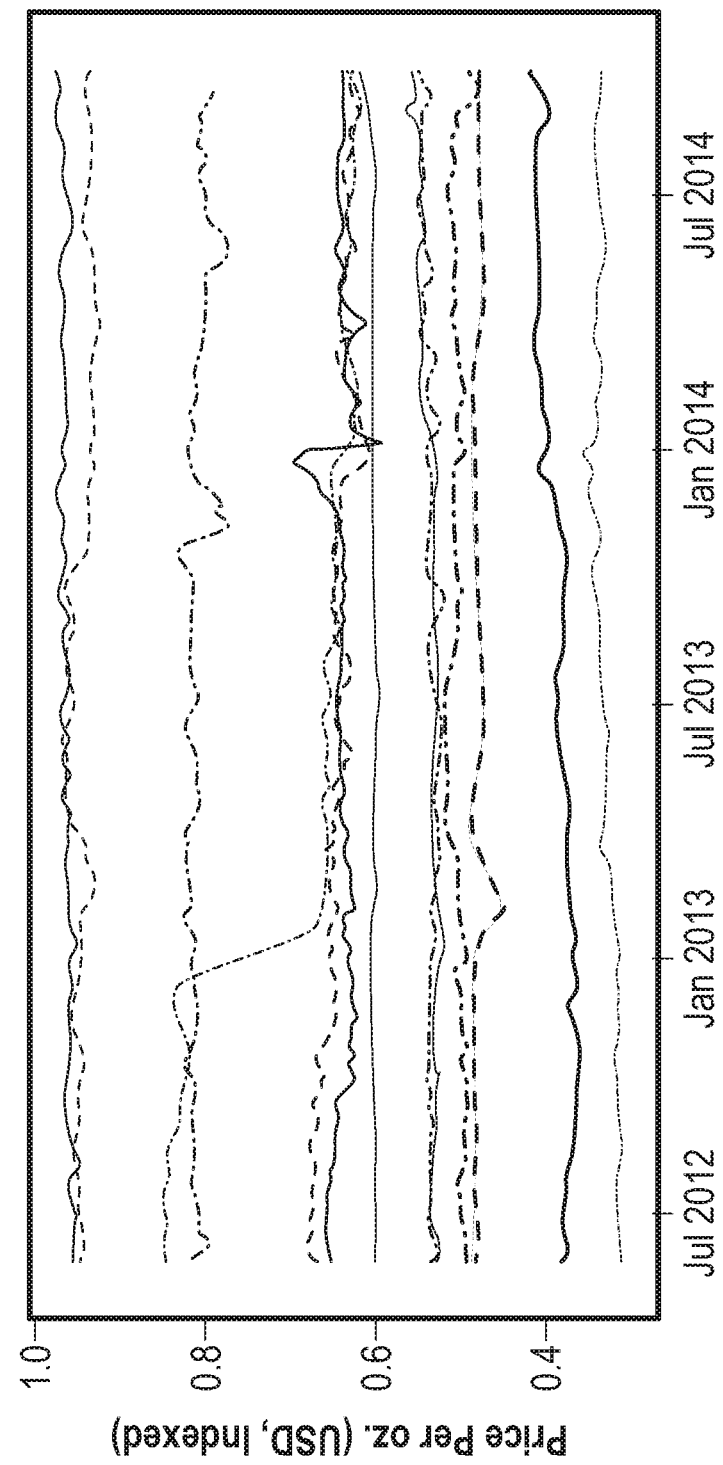

The dataset includes B=14 shampoo brands and covers 2.5 years (T=130 weeks) of weekly data from April of 2012, through September of 2014. All weekly observations are aggregated at the national level. These 14 brands make up about 60% of the total volume sales of the US shampoo industry over these 2.5 years. The average weekly volume sales ranges from 0.6 million oz. to 44.3 million oz. The dataset includes supermarket brands (low price, e.g., brand 10), as well as some salon brands (high price, e.g., brand 13) (FIG. 21). From here on, the 14 brands can be referred to as brand 1 to brand 14, sorted by media spend in a descending order.

Referring to FIG. 21, chart 2100 illustrates average weekly price per volume (indexed) for the 14 shampoo brands for the dataset. Referring to FIG. 22, chart 2200 illustrates media spend (indexed) split by channels for the 14 shampoo brands (in descending order of total media spend over 2.5 years).

During the timespan of the dataset, 57.8% of the total media spend (in US dollars) of the 14 shampoo brands was on TV, with 36.7% on magazines, 3.7% on Internet display (including Google Display Network and non-Google platforms), 1.3% on YouTube, 0.4% on Internet search (including Google and non-Google search), and the rest 0.2% among other channels, such as out-of-home (OOH), newspaper, etc. Particularly, the media spend data collected cover both the shampoo products and conditioner products, and sometimes other relevant hair products (e.g. hair spray, hair cream) of the 14 brands in our study, as such hair products are often advertised together and their advertising expenses inseparable. FIG. 22 displays the distribution of overall media spend among the major channels split by brands.

The category model (e.g., HCM 134) described in Equations 6-7 and 9-10 can be used for the shampoo category. The media variables are spend (in US dollars) in the major six media channels: TV, magazine, Internet display, YouTube (split into MastHead v.s. non-MastHead ads), and Internet search. Alternatively, one can also use media exposure variables instead of spend, such as TV Grips, digital display impressions, etc. In this case study, we don't have reliable exposure data for all major media channels and thus resort to using media spend variables.

The following control variables can also be incorporated, price per 16 oz. (in US dollars), All Commodity Volume (ACV) weighted distribution of product, ACV weighted distribution of retailer feature and/or display promotions, the competitor equivalent of these three merchandising variables, as well as the number of social mentions split by sentiment (positive, neutral, and negative). The volume sales can be used as the response variable.

When calculating the competitor variables, such as price and promotional distribution, first, the 14 shampoo brands can be grouped into three clusters by their weekly price using a k-means algorithm and then calculate the competitor variables within a cluster (direct competition) and across different clusters (indirect competition). The grouping of brands may be motivated by the difference in shampoo brand targeting between supermarket brands and salon brands; price can be used as a proxy to the brands' market targeting. There can be other methods to obtain a meaningful clustering of direct competition within a category, and as seen elsewhere herein (e.g., with reference to the discussion of FIGS. 25-30). Details on constructing the competitor variables is described further herein.

For m=1, . . . , M, a Beta(2,2) prior can be used on the media shape parameters $\mathcal{K}_m$ and a Gamma(3,1) on $\mathcal{S}_m$, as well as a Uniform(0,5) prior on the coefficients of the media variables. We use a $N(0,3^2)$ prior on the coefficients of the control variables. Model training was implemented in the RStan language. A multiplicative model form can be used by applying the logarithm transformation on the response variable, volume sales of each shampoo brand. Four parallel chains were run, each with 2000 MCMC iterations and a warm up phase of 1000 iterations.

Comparison of Brand-Specific Models Using Informative and Weak Priors

To understand the benefits of deploying informative priors derived from the category model, the baseline brand-specific models can first be developed, using weak priors, similar to the ones we use in the category model. In the study, the competitor variables were excluded from the brand-specific models. The brand-specific models were developed using the informative priors in the format of the joint posterior samples estimated by the HCM, $\{\Phi_m\}^{(c)}$.

Referring now to FIG. 23, charts 2300 illustrate a comparison of estimated average ROAS and mROAS for TV and Internet display for the 14 shampoo brands. Charts 2302 and 2304 illustrate ROAS for TV (chart 2302) and Internet (chart 2304). Charts 2306 and 2308 illustrate mROAS for TV (chart 2306) and Internet (chart 2308). The bottom level of each bar represents the 5th percentile of the estimated values, while the top level the 95th percentile and the dot the posterior mean.

The average ROAS and mROAS can be compared with estimates for all 14 brands from the brand-specific models.

FIG. 23 displays the comparison for two media channels: TV and Internet display. For both media channels, using informative priors derived from the category analysis helps reduce the estimation uncertainty of ROAS and mROAS metrics. The results of brand-specific models using informative priors display a larger similarity among brands, compared to that using weak priors, which is consistent with our assumption and model design.

Referring now to FIG. 24, charts 2400 illustrate response curves estimated by the brand-specific models using informative priors with 5th and 95th percentiles (in dotted lines), compared with that using weak priors with 5th and 95th percentiles (in dotted lines), for TV of ten example brands of the shampoo category.

FIG. 24 compares the estimated response curves for TV across the 10 of the 14 shampoo brands with non-zero TV spend. The informative priors help reduce the estimation uncertainty, as indicated by narrower credible intervals of the response curves (dotted lines in FIG. 24). The level of uncertainty reduction varies across brand. Similarly to what we observed in the simulation studies, brands with a smaller range of media spend benefit more from the category-derived informative priors. For example, brand 10, a small brand, has limited media spend. When using only the brand's own data and weak priors, the estimated response curve has quite wide uncertainty (blue dotted lines in Figure FIG. 24). In comparison, the informative priors do not seem to influence the results for TV of brand 3 as much.

It should be recognized that brand 4 yields a strange estimated response curve when using weak priors, a sharp increase in impact at the early section of the curve and then an almost-flat section. This strange pattern is likely from the brand's lack of observations where the media spend is small, as indicated by the tick marks on the x-axis. Therefore, without borrowing strength from other brands with small media spend, the model for brand 4 with weak priors cannot well tease out the absolute impact of this media channel.

At the same time, differences in estimated response curves among brands should be observed. One explanation for this may be that the same media used by different brands have different effects, which is plausible, as well-designed and executed ad campaigns may have more impact on audience purchasing behavior. Another explanation may be that the category data is insufficient to develop a strong informative prior, so that the brand-level results are largely influenced by noise or bias in the brand-level data.

Figure 25:
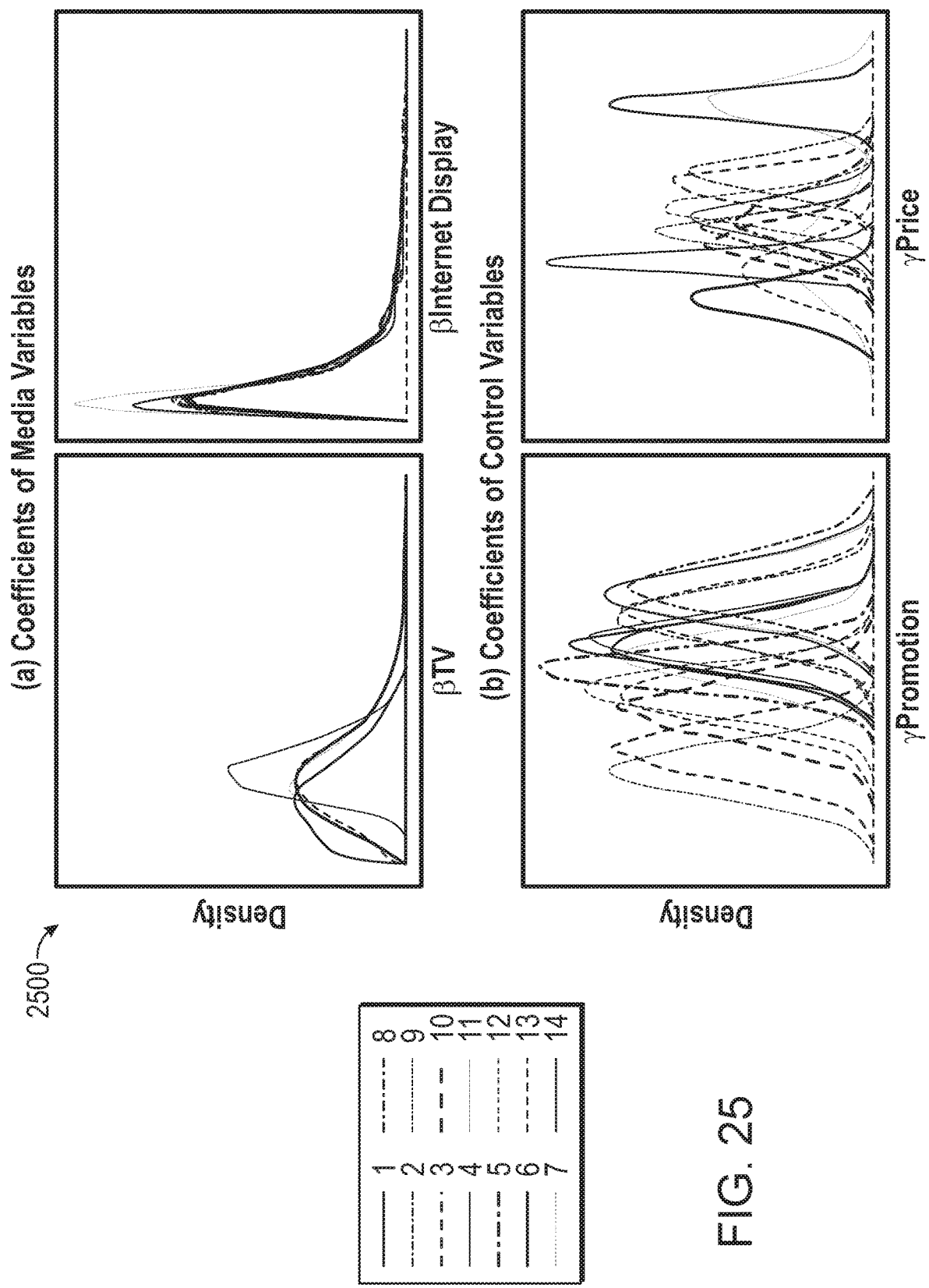
FIG. 25 is a set of charts illustrating posterior distributions of model parameters for the shampoo brands determined based on a category Bayesian hierarchical media mix model according to an illustrative implementation.

Referring to FIG. 25, charts 2500 illustrate posterior distributions of brand-specific media and control coefficients compared across brands, estimated by the HCM for the shampoo category. Across the brands, the similarity in media effects of TV and Internet display. The top rows of FIG. 25 displays the posterior density of brand-specific media coefficients $\beta_{m,b}$, b=1, . . . ,14, for TV and Internet display, estimated by the HCM. A similar comparison across brands, for control variables, such as price per volume and retailer promotion distribution, displays a much larger diversity across brands (bottom row charts of FIG. 25). The similarity of estimated media coefficients can be interpreted as the media effects share more similarity across brands, or that the pooled category dataset is insufficient in distinguishing the brand-effect of media variables. The control variables, however, have a much stronger signal, and thus are easier to distinguish.

Soda Category Study

Another real case study using the soda category data can be performed that focuses on what is different compared to the shampoo category. Though both are part of the CPG industry, the uniqueness of these two categories can result in different modeling decisions. The source for the soda category data is the same as those for the shampoo category.

Figure 26:
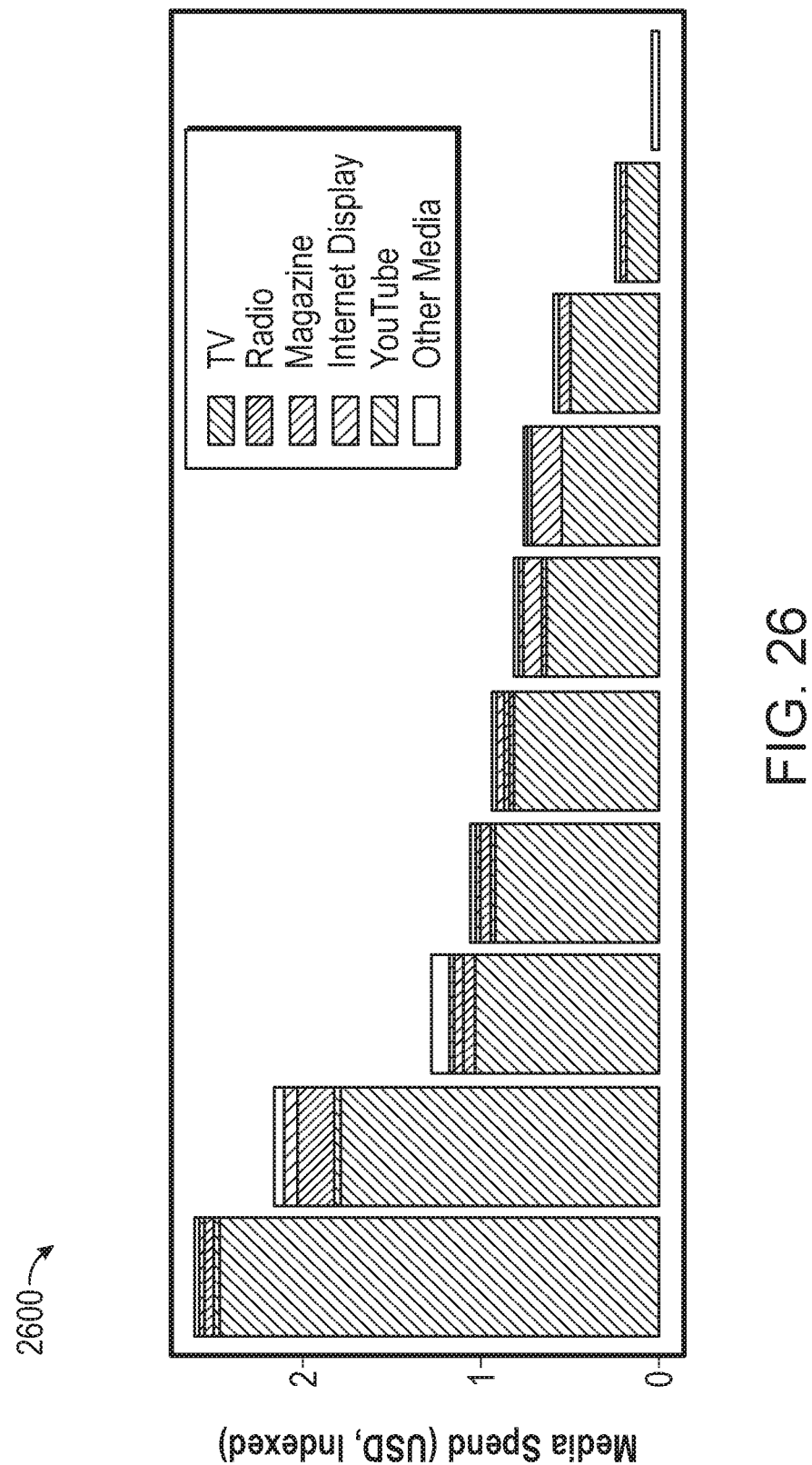
FIG. 26 is a charts illustrating media spend for multiple soda brands according to an illustrative implementation.

Referring now to FIG. 26, chart 2600 illustrates media spend (indexed) split by channels for the 10 soda brands (in descending order of total media spend over 2.5 years). The dataset includes B=10 soda brands and covers T=130 weeks of weekly observations from January of 2012 to September of 2014. The average weekly volume sales ranges from 16 million oz. to 181 million oz. The data of soda sales collected by IRI cover only retail sales, not sales through restaurant and bars. From here on, we refer to these 10 soda brands as brand 1 to brand 10, sorted by media spend in a descending order. During the 2.5 years of our observation, 86.1% of the total media spend (in US dollars) of the 10 soda brands were spent on TV, with 4.5% on radio, 3.5% on magazines, 2.1% on Internet display, 1.7% on an online video service, and 2.1% on other media channels (0.09% on Internet search, 0.07% on newspaper, and 1.9% on business-to-business), as summarized in FIG. 26.

Gathering complete sales data of the soda category may be difficult because sales through restaurants and bars are hard to track and not included in our dataset. Also, the soda category has one dominating media channel, TV. Further, the distribution of weekly spend on TV is extremely long-tailed: the maximum weekly spend on TV is about 11 times the 90th-percentile and more than three times the 99th-percentile. The long tail is from large brands spending much more than smaller brands, as well as large amounts of budget spend concentrated within a small number of weeks due to flighted campaigns.

Figure 27:
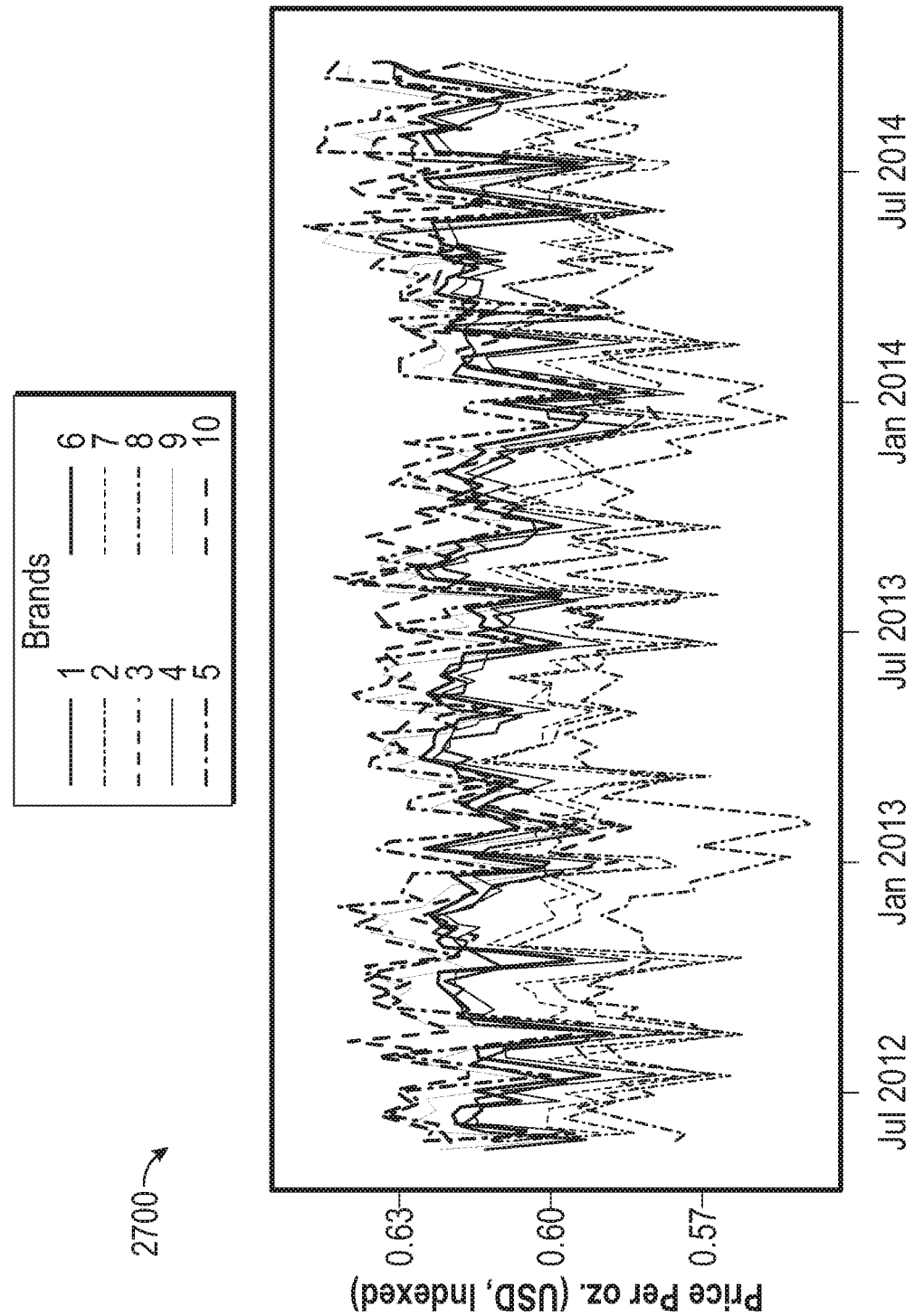
FIG. 27 is a chart illustrating price per volume of the soda brands according to an illustrative implementation.

Referring to FIG. 27, chart 2700 illustrates average weekly price per volume (indexed) for the 10 soda brands. There is no major separation among brands in terms of retail prices (FIG. 27), unlike retail prices of shampoo brands that of the previous discussion (FIG. 21).

Figure 28:
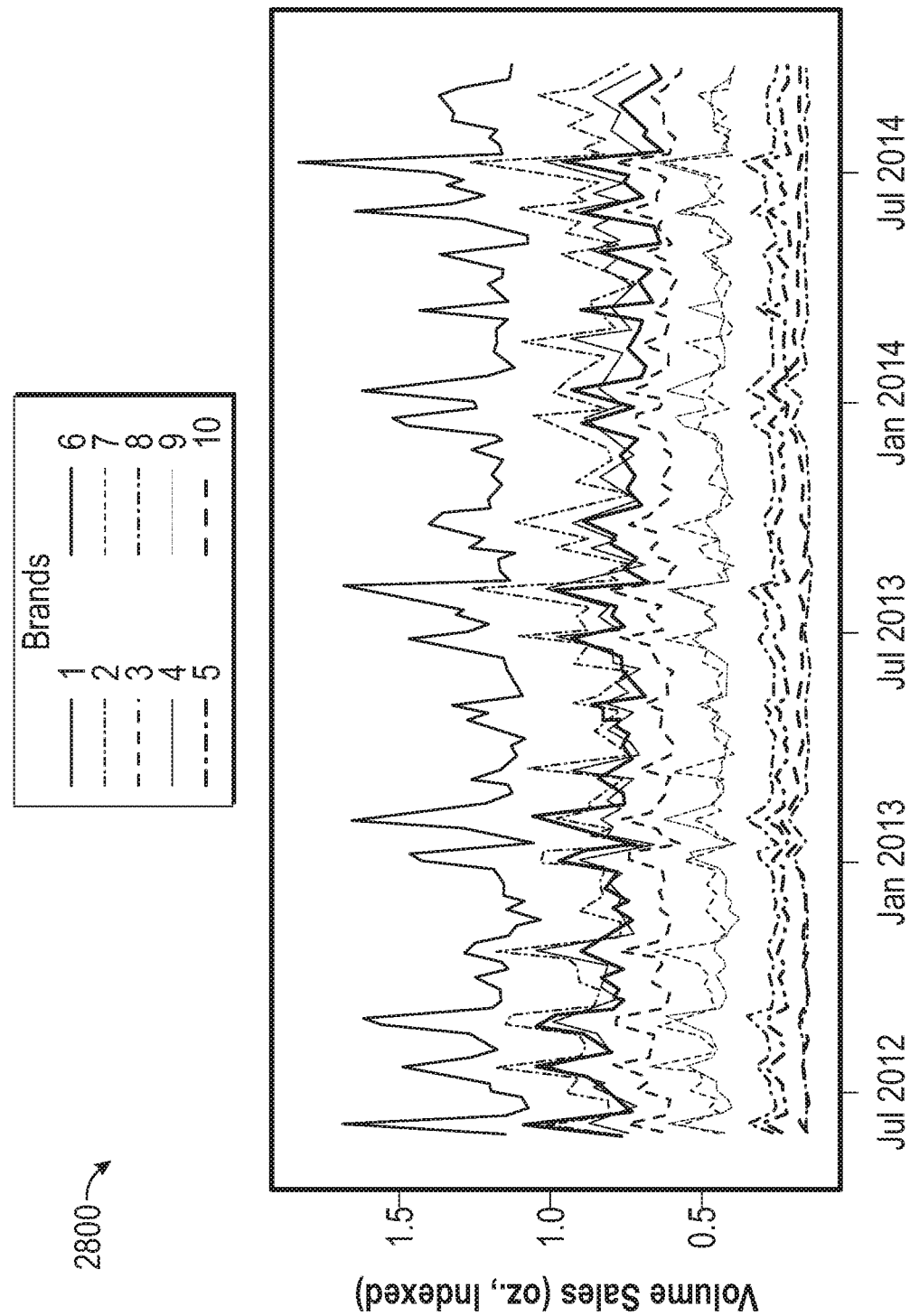
FIG. 28 is a chart illustrating indexed sales (e.g., response) for the soda brands according to an illustrative implementation.

Referring to FIG. 28, chart 2800 illustrates weekly volume sales (indexed) of the 10 soda brands. Strong seasonality exists in volume sales of the soda category (FIG. 28), which may be due to soda consumption patterns, such as over major sports events and holiday seasons.

The 10 soda brands include sub-brands of the same main brand. For example, data for two different types of the same soda, e.g., diet soda and caffeine free soda for one particular soda brand are gathered separately when possible. Still, this introduces unique traits of the soda category that are not observed among the shampoo category, e.g., potential halo effects of advertising among the sub-brands of the main brand. The Diet-typed sodas have distinctively different demographics than the other brands, and hence an often adopted media channel, magazines, compared to radio for the other soda brands. These Diet-typed sodas are not direct competitors with the other brands, and vice versa.

Based on the above observations made of the soda category, a logarithm transformation can be applied to the media variables to redistribute the long tails. The category total weekly volume sales can be used as a proxy of category seasonality in the model. Soda brands which share a parent brand can be identified, and incorporate "sibling" brand media variables into the model. Instead of identifying direct competitors by price in shampoo category, demographic targeting of the soda brands to establish direct competition.

Figure 29:
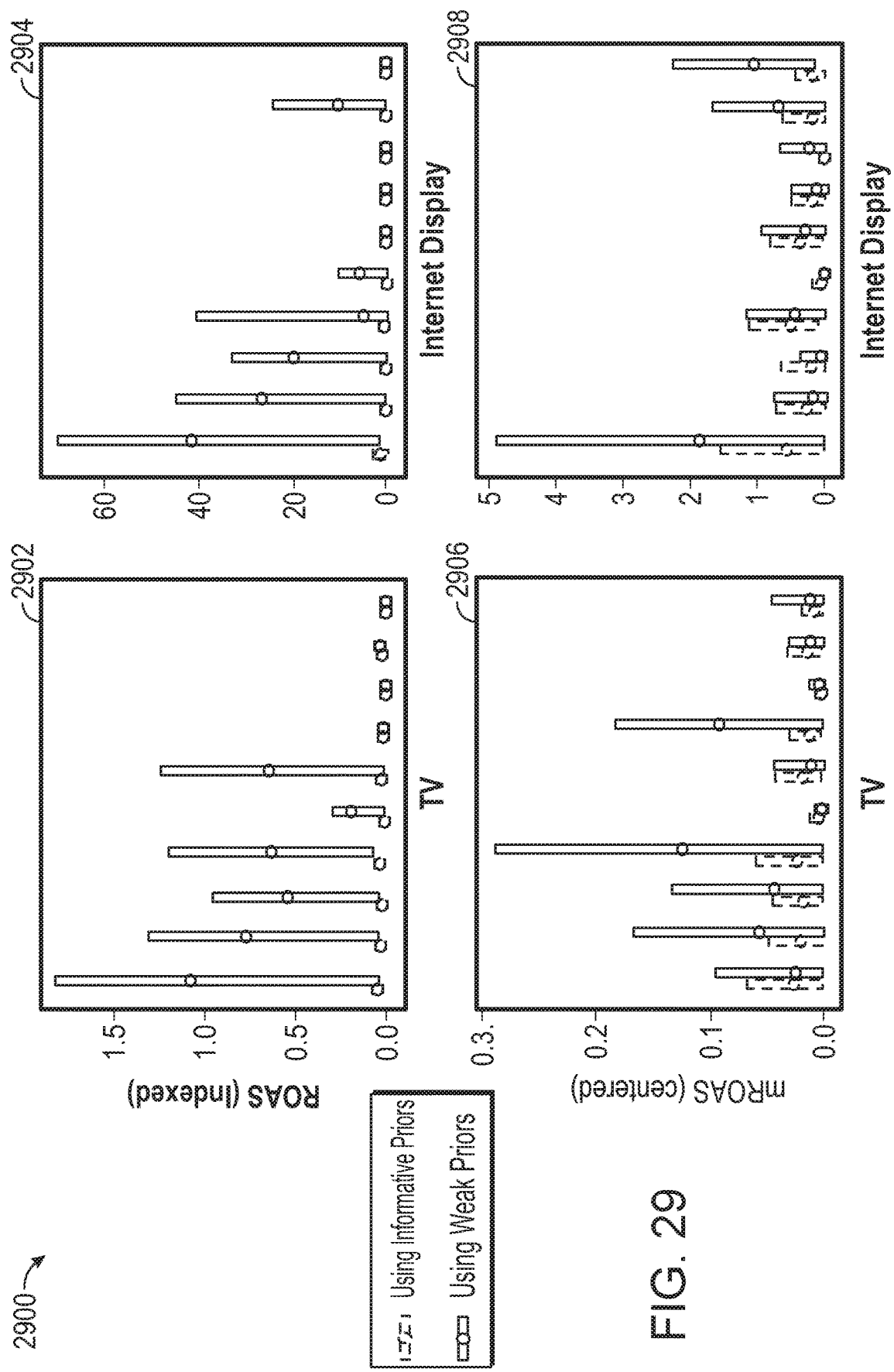
FIG. 29 is a set of charts illustrating ROAS and mROAS of a brand Bayesian hierarchical media mix models for the soda brands for a brand Bayesian hierarchical media mix model using informative priors and weak priors according to an illustrative implementation.

Referring to FIG. 29, charts 2900 illustrate a comparison of estimated average ROAS and mROAS for TV for the 10 soda brands. Charts 2902 and 2906 illustrate ROAS and mROAS for TV advertising while charts 2904 and 2908 illustrate ROAS and mROAS for Internet advertising. The bottom level of each bar represents the 5th percentile of the estimated values, while the top level the 95th percentile and the dot the posterior mean. There may be more than one reasonable approach to address the unique features of the soda category; each modeler would have their own preference based on their experiences and prior knowledge.

Comparison of Brand-Specific Models Using Informative and Weak Priors

To understand how information is extracted from the hierarchical category MMM impact brand-specific estimates, two sets of MMMs are developed using individual brand's data: the first set uses the informative priors derived from the category, the second set uses the same weak priors we used in the category model.

Figure 30:
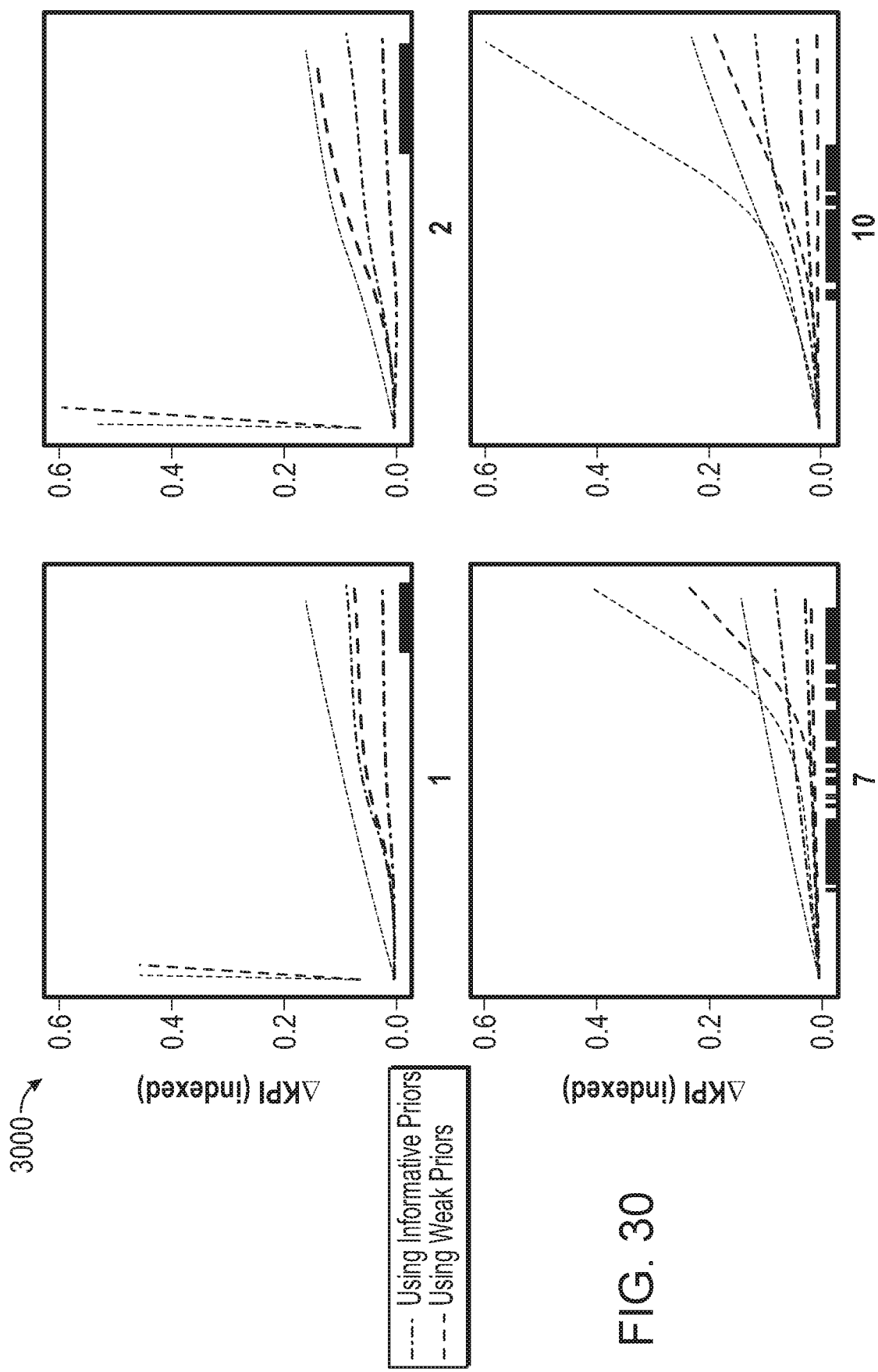
FIG. 30 is a set of charts comparing response curves of a brand Bayesian hierarchical media mix model for the soda brands based on informative priors and weak priors according to an illustrative implementation.

Referring to FIG. 30, charts 3000 illustrate response curves estimated by the brand-specific models using informative priors with 5th and 95th percentiles (in dotted lines), compared with that using weak priors with 5th and 95th percentiles (in dotted lines), for TV of four example brands of the soda category.

FIG. 29 compares the ROAS and mROAS for TV for all B=10 brands, estimated using weak priors (WP) or informative priors (IP) derived from the category model, while FIG. 30 compares the corresponding response curves for four example brands. The estimates made with the weak priors have very large uncertainties compared to those made with the informative priors. The reduced uncertainties by using informative priors could be due to improved estimates from pooling different brands' information and better seasonality estimates using the category total sales.

Comparing the response curves of TV estimated from the soda category (FIG. 30) to that from shampoo (FIG. 24), we see that soda brands spent almost twice on TV over the same period of time as shampoo brands did, yet the effects of TV in the soda category estimated using the informative priors are much smaller than that in the shampoo category. Such low estimated impact of TV could result from a higher brand stability and awareness of the soda brands—all of the 10 soda brands have existed for many years with high levels of brand awareness. As a result, TV campaigns mostly aim to retain that brand awareness, to "remind people of their brands." Such a long-term effect of media is not captured by the MMM structure we use in this paper. Several studies focus on the long-term effects of marketing efforts.

In comparison, several of the shampoo brands are relatively new; even for the well-known brands, some of them have introduced significantly different lines of products in the time period we studied. The functionality of TV ads to introduce new brands or products potentially leads to more short-term impact of TV campaigns on consumers, which can be captured by the models discussed herein.

Unlike the response curves of TV for shampoo brands displaying an "S" curve (FIG. 24), those for soda brands yield a curve similar to an effective reach curve (FIG. 30), which can be approximated using the Hill transformation when fixing S at 1. When there is not enough information in the dataset, one choice a modeler can make is to reduce the complexity of the model, i.e., reduce the number of parameters to estimate in the model.

From the above discussion and results, it can be seen that different product categories can be quite different in terms of their business models, how media affects sales, interactions between brands, and relevant control variables. It is important to understand the category and customizing the analysis in any applied setting. The domain knowledge, coupled with the method of pooling different brands together, helps develop a meaningful MMM.

Media mix modelers are often faced with challenges from insufficient data quantity and information content relative to the model complexity. As discussed herein, pooling datasets of different brands within the same product category can achieve more useful variation in the data and improved range of media observations, compared to using an individual brand's dataset. It is difficult for a single brand to greatly vary their media spend pattern over time; even if it does, it takes a couple of years to obtain enough observations for an MMM analysis. Such variation in media spend is relatively easier to obtain with multiple brands. We demonstrate that a hierarchical Bayesian model can be used to learn certain aspects of media effects across brands. Such learnings can then be passed onto brand-specific MMMs via informative Bayesian priors, which have the advantage of anonymity of the brand-specific data. Our approach of category analysis is not limited to the exact model specification, as long as the category model specification is consistent with that of brand-specific models.

Through three scenarios of simulated data (the simulations discussed with reference to FIGS. 7-20) and two case studies (the studies discussed with reference to FIGS. 21-30), it can be seen that the informative priors derived from the hierarchical category model can both improve the accuracy and reduce the uncertainty of estimating the media response curve, and thus render more accurate ROAS and media optimization results. Such benefits are large for small brands within the category for estimating and extrapolating media effects, as well as for large brands that always maintain a certain level of media spend in particular channels. Furthermore, the category dataset can also be used to better understand the product's intrinsic trend and seasonality that is independent of each brand's media activities. As included herein, an example within the soda category, of using the category total sales as a proxy of the seasonality of underlying demand for soda is discussed. Modelers can also use the category dataset to better understand the impact of competitor activities on brand KPIs. In the third simulation scenario, an example of how including competitor activities in the category model can improve the understanding of media effects is discussed. The improvement in estimation accuracy and uncertainty then propagates to brand-specific models via informative priors. Even when the brand models lack access to competitor data, the priors developed using the dataset that did include competitor data help reduce the bias caused by the omitted variables.

Through the case studies of shampoo and soda categories, the unique features of each category and accounting for them in a reasonable way in the category model is shown. Such customization of category analyses includes, but is not limited to, transformation on the explanatory variables, specification of inter-brand relationships (competition and halo effects). For categories with a more complex structure, one might consider extending the category-brand hierarchy. For example, for the automobile category, it may be worthwhile to investigate using a hierarchy of category—segments (CUV v.s. conventional)—brands instead. As discussed herein, the study focuses in part on improving the lack of variation in MMM datasets by pooling different brands together.

The simulated data by the following process, for a category of B brands, M media channels over T weeks. The process may include seven steps. In the first step, for given $(\beta_m, \eta_m)$, $m=1, \ldots, M$, brand-specific coefficients $\beta_{m,b} \sim \text{Normal}^+(\beta_m, \eta_m^2)$ can be randomly sampled. In the second step, underlying demand of products of a category with seasonality of T weeks using a sinusoidal function can be simulated. In the third step, randomly brand size $\beta_b$ to brand b=1, . . . , B, for example $\beta_m \sim \text{Normal}(100, 50^2)$ can be pseudo-randomly assigned. In the fourth step, for each brand b, the median planning seasonality pattern that is correlated with the product demand seasonality can be simulated, for example, with a correlation of 0.8. Further, M media variables that are correlated with the media planning seasonality patterns and scaled proportional to the brand's size can be simulated. Further, C control variables, e.g., price variables can be a monthly pattern as many CPG products are can be simulated. In step 5, for each brand b, competitor variables can be determined based on the other brands within the category. In step 6, for each brand b and media channel m, the rate of incremental sales: $r_{t,m,b} = \beta_{m,b} h_m(x_{t,m,b})$ can be determined. Further, for each brand b and control variable c, including competitor variables, the rate of incremental sales: $r_{t,c,b} = r_{c,b} z_{t,c,b}$ can be determined. In the seventh step, the sales as a product of brand size and media incremental rate of sales can be determined via the relationship: $y_{tm} = \beta_b \exp(\Sigma_{m=1}^{M} r_{t,m,b} + \Sigma_{c=1}^{C} r_{t,c,b} N(0, \sigma^2))$ for given $\sigma$.

The above simulation is based on the following assumptions: media variables impact sales in a multiplicative model form; each brand's media expenditure is correlated with the size of the brand.

Calculation of ROAS and mROAS

Using estimated model parameters, the average ROAS for media m, brand b, over the T weeks of simulated data can be calculated as follows (Equation 17), $$ROAS_{m,b} = \frac{\sum_{t=1}^{T} (\hat{y}_t(X_{t,m,b} = x_{t,m,b}) - \hat{y}_t(X_{t,m,b} = 0))}{\sum_{t=1}^{T} x_{t,m,b}}$$

where $\hat{y}_t(X_{t,m,b}=x)$ denotes model predicted response when media variable $X_{t,m,b}$ takes value x. Similarly, the average mROAS at 1% multiplicative incremental on the media variable m for brand b can be determined via (Equation 18), $$mROAS_{m,b} = \frac{\sum_{t=1}^{T} (\hat{y}_t(X_{t,m,b} = 1.01 \times x_{t,m,b}) - \hat{y}_t(X_{t,m,b} = 0))}{0.01 \times \sum_{t=1}^{T} x_{t,m,b}},$$

Because some of the simulations discussed herein assume a logarithm transformation on the response variable and no media lag, using a short hand $\hat{y}_t(X_{t,m,b}=x_{t,m,b})$, the result may be (Equations 19-20), $$ROAS_{m,b} = \frac{\Sigma_{t=1} \left( \hat{y}_t \cdot \left(1 - \frac{\hat{y}_t(X_{t,m,b}=0)}{\hat{y}_t}\right)\right)}{\sum_{t=1}^{T} x_{t,m,b}} = \frac{\Sigma_{t=1} \hat{y}_t \cdot (1 - \exp(-\hat{\beta}_{m,b} h_m(x_{t,m,b})))}{\sum_{t=1}^{T} x_{t,m,b}},$$

-continued and, $$mROAS_{m,b} = \frac{\sum_{t=1}^{T}(\hat{y}_t \cdot (\exp\{\hat{\beta}_{m,b}(h_m(1.01 \times x_{t,m,b}) - h_m(x_{t,m,b}))\} - 1)}{0.01 \times \sum_{t=1}^{T} x_{t,m,b}}.$$

Calculation of Competitor Variables

Sometimes a change in a brand's KPI is not due to anything the brand initiated, but rather its competitor's activities, such as price changes, new product launches, massive media spends, etc. The goal is to include competitive factors into the category-level model, while at the same time to reduce the dimension of competitor variables, which is on the scale of number of brands within the category. This appendix discusses one approach of summarizing competitor variables.

First, the brands b=1, . . . , B can be grouped within a category into several direct-competing clusters $\{C^1, C^9\}$. This can be done differently based on the business model of a category. For example, the price can be used to determine direct competitors in the shampoo category, and targeted demographics in the soda category. There can be other reasonable clustering methods.

Denote $b \in C_b$. So if brands 1, . . . , 5 are clustered into two groups $\{C^1 = \{1,2\}, C^2 = \{3,4,5\}\}$, it can write that $1 \in C_1 = C^1$ and similarly $5 \in C_5 = C^2$. After clustering the brands, for each brand b, all other brands c, $c \neq b$ can be put into two groups: direct competitors (which are in the same price cluster as brand b), and the rest as indirect competitors. In this manner, for each competitive variable, the dimension from number of brands to two: a variable for direct competitors and a variable for indirect competitors can be reduced. In our case studies of the shampoo and soda categories, the model direct competitor variables may be important. Indirect competitor variables may be less significant.

Competitor Price

For brand b=1, . . . , B, a weighted average of the direct competitor prices can be determined as (Equation 30), $$CP_{t,b}^{DR} = \frac{\sum_{c \in C_b, c \neq b} P_{t,c} S_{t,c}}{\sum_{c \in C_b, c \neq b} S_{t,c}}$$

and indirect competitor prices as (Equation 31), $$CP_{t,b}^{IDR} = \frac{\sum_{c \notin C_b} P_{t,c} S_{t,c}}{\sum_{c \notin C_b} S_{t,c}}$$

The calculation of indirect competitors' weighted average price may be misleading, when brands of a category are grouped into more than two price groups. For example, when three clusters are formed by price (high-priced, mid-priced, and low-priced), the meaningful way to measure the level of competitiveness of the mid-priced group against the other two groups is by the level of price separation between them. In other words, a more expensive high-priced group and a cheaper low-priced group means less competition for the mid-priced group. The weighted average price calculated in (10), however, can fail to distinguish the levels of such separation. In such cases, a weighted average price in relative terms can be used, by calculating the absolute distance between prices of different brands.

Competitor Media

For brand b=1, . . . , B, a normalized sum of competitor media variables can be determined as follows (Equation 32), $$CM_{t,b}^{DR} = \frac{\sum_{c \in C_b, c \neq b} X_{t,c}}{\sum_t \sum_{c \in C_b} X_{t,c}}$$

where $X_{t,c}$ is total media spend of direct competitor c of brand b. The sum can be normalized by the total media spend of the brand cluster $C_b$, so that this competitor media variable is comparable across brand clusters of different sizes, i.e. containing various number of brands. Similarly, indirect competitor media variable can be defined as (Equation 33), $$CM_{t,b}^{IDR} = \frac{\sum_{c \notin C_b} X_{t,c}}{\sum_t \sum_{c \notin C_b} X_{t,c}}$$

Competitor Distribution

The product or promotional distribution variables of competitor products behave similarly to competitor media variables, in that it is additive among competitors, and that we need to normalize the variable by each brand cluster, so that the competitor distribution variables are comparable across brand clusters of different sizes.

Figure 31:
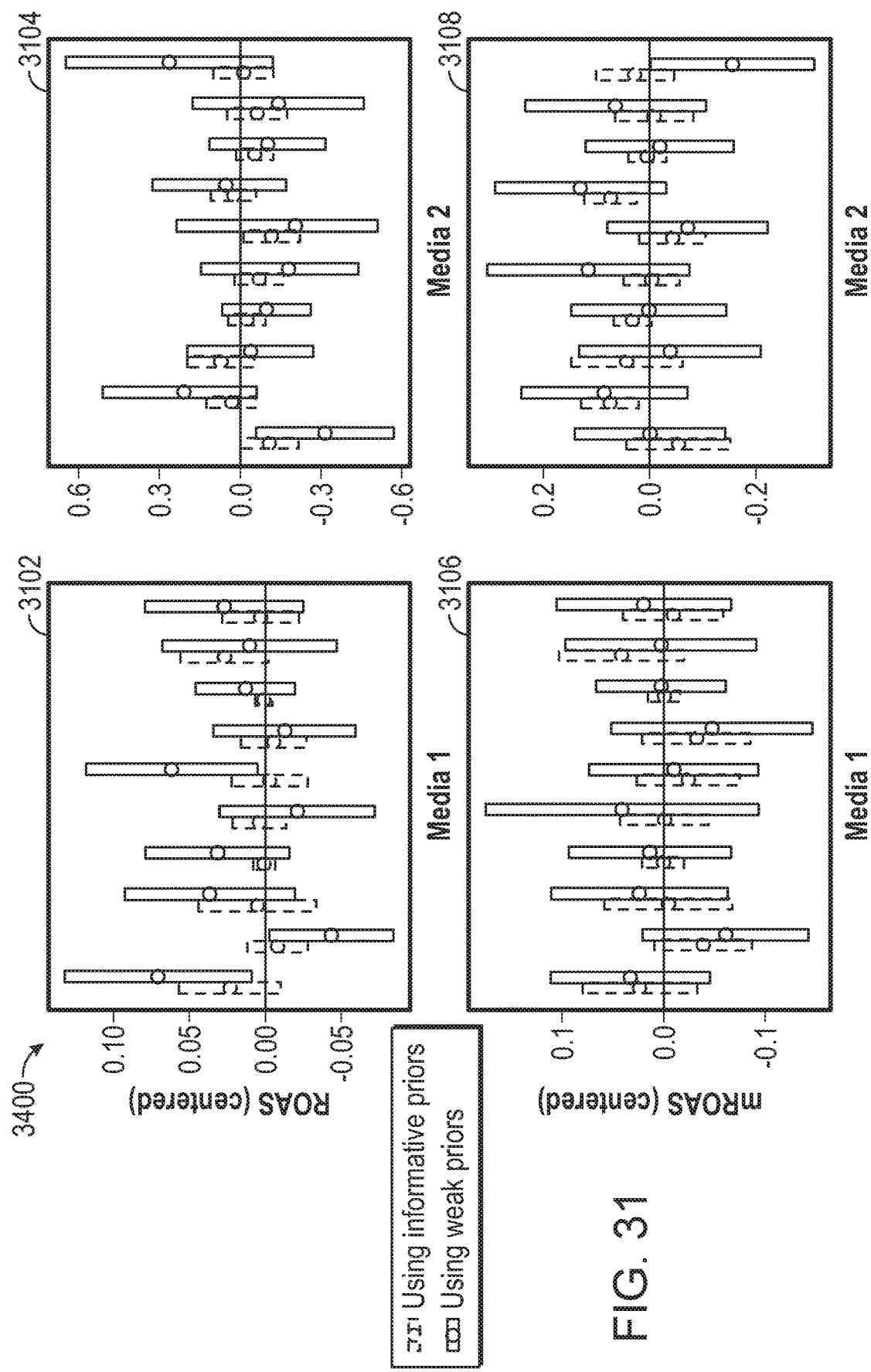
FIG. 31 is a set of charts comparing ROAS and mROAS for a brand Bayesian hierarchical model that is generated based on informative priors and weak priors according to an illustrative implementation.

Referring to FIG. 31, charts 3100 illustrate another view of FIG. 9 comparison of estimated ROAS (charts 3102 and 3106) and mROAS (3104 and 3108) of media 1 and 2 for the 10 simulated brands after subtracting the true values. The bottom level of each bar represents the 5th percentile of the estimated values, while the top level the 95th percentile and the dot the posterior mean.

Therefore, for brand b=1, . . . , B, we calculate a normalized sum of competitor distribution variables as follows (Equations 34-35), $$CD_{t,b}^{DR} = \frac{\sum_{c \in C_b, c \neq b} D_{t,c}}{\sum_t \sum_{c \notin C_b} D_{t,c}}$$

$$CD_{t,b}^{IDR} = \frac{\sum_{c \notin C_b} D_{t,c}}{\sum_t \sum_{c \notin C_b} D_{t,c}}$$

Figure 32:
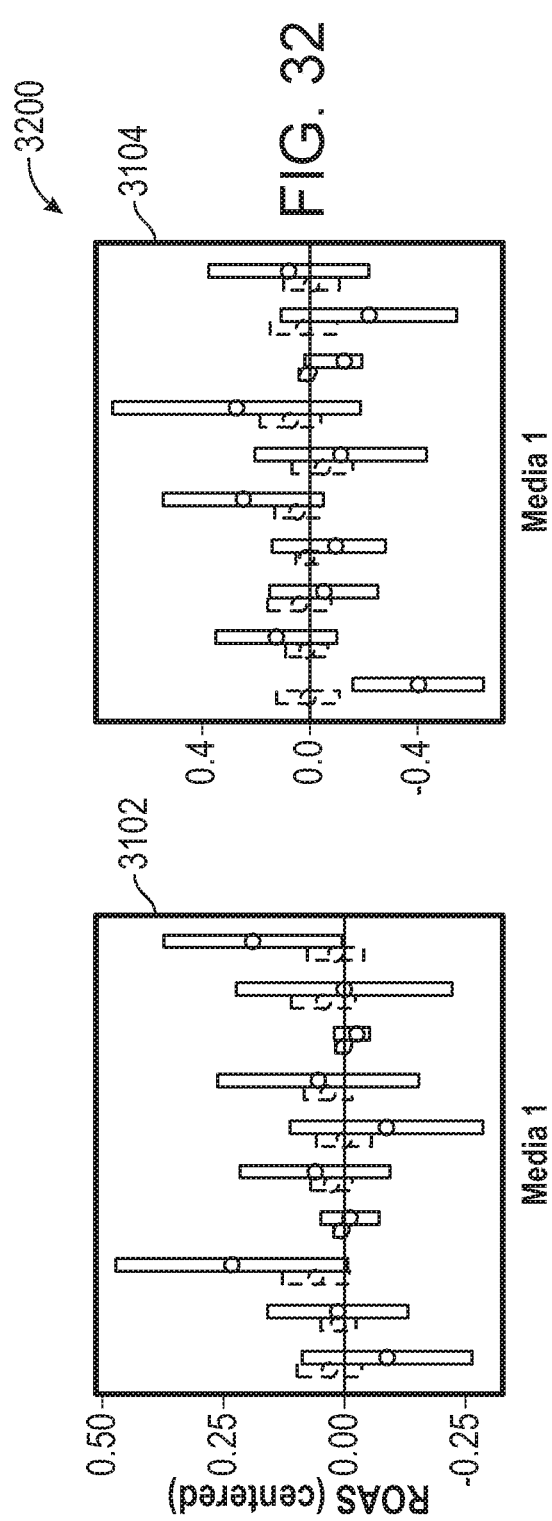
FIG. 32 is a set of charts comparing ROAS and mROAS after subtracting a true value for a brand Bayesian hierarchical model that is generated based on informative priors and weak priors according to an illustrative implementation.
Figure 33:
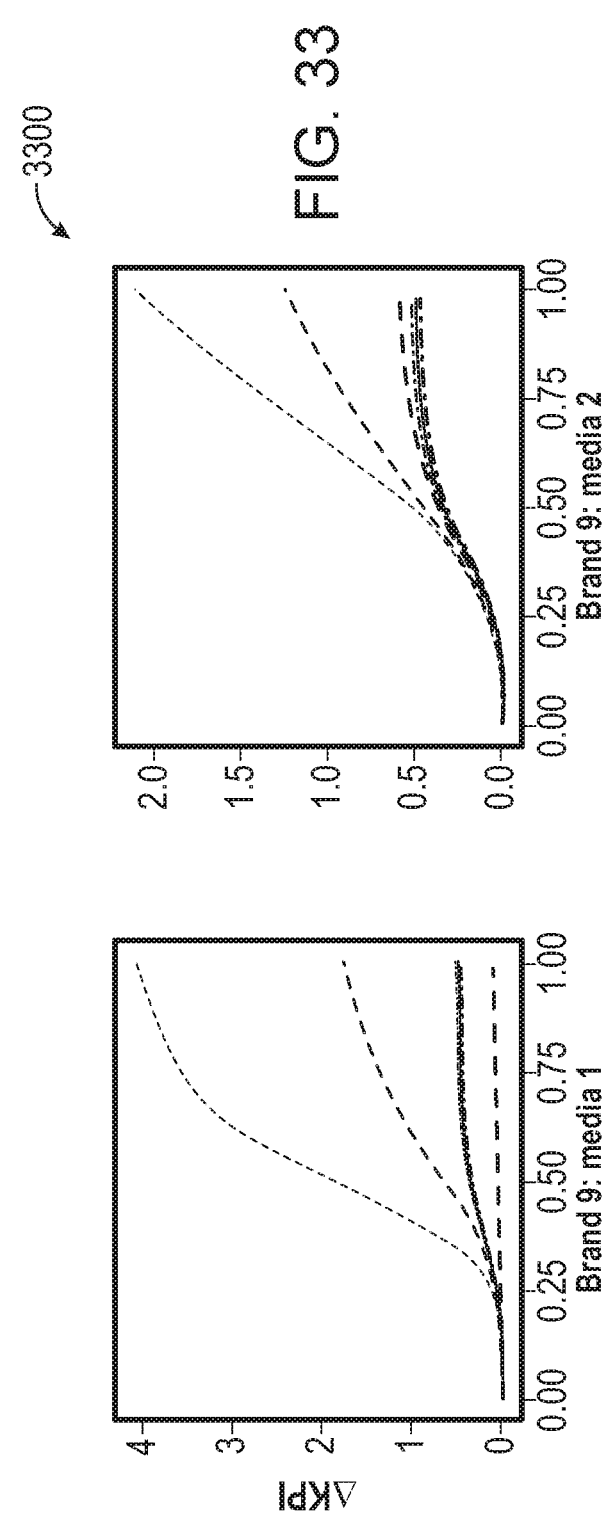
FIG. 33 is a set of charts comparing response curves for a brand Bayesian hierarchical media mix model generated based on informative priors and weak priors according to an illustrative implementation.

Referring to FIG. 32, charts 3200 illustrate a comparison of estimated average ROAS (chart 3202) and mROAS (chart 3204) of media 1 for the 10 brands simulated in an example dataset in discussed with further reference to FIGS. 13-14, after subtracting the true values. The bottom level of each bar represents the 5th percentile of the estimated values, while the top level the 95th percentile and the dot the posterior mean.

Referring now to FIG. 33, charts 3300 illustrate response curves of media 1 estimated by the brand-specific models using informative priors with 5th and 95th percentiles (in dotted lines), compared with that using weak priors with 5th and 95th percentiles (in dotted lines), and the true response curve (in red), for an example dataset as discussed with reference to FIGS. 13-14.

Figure 34:
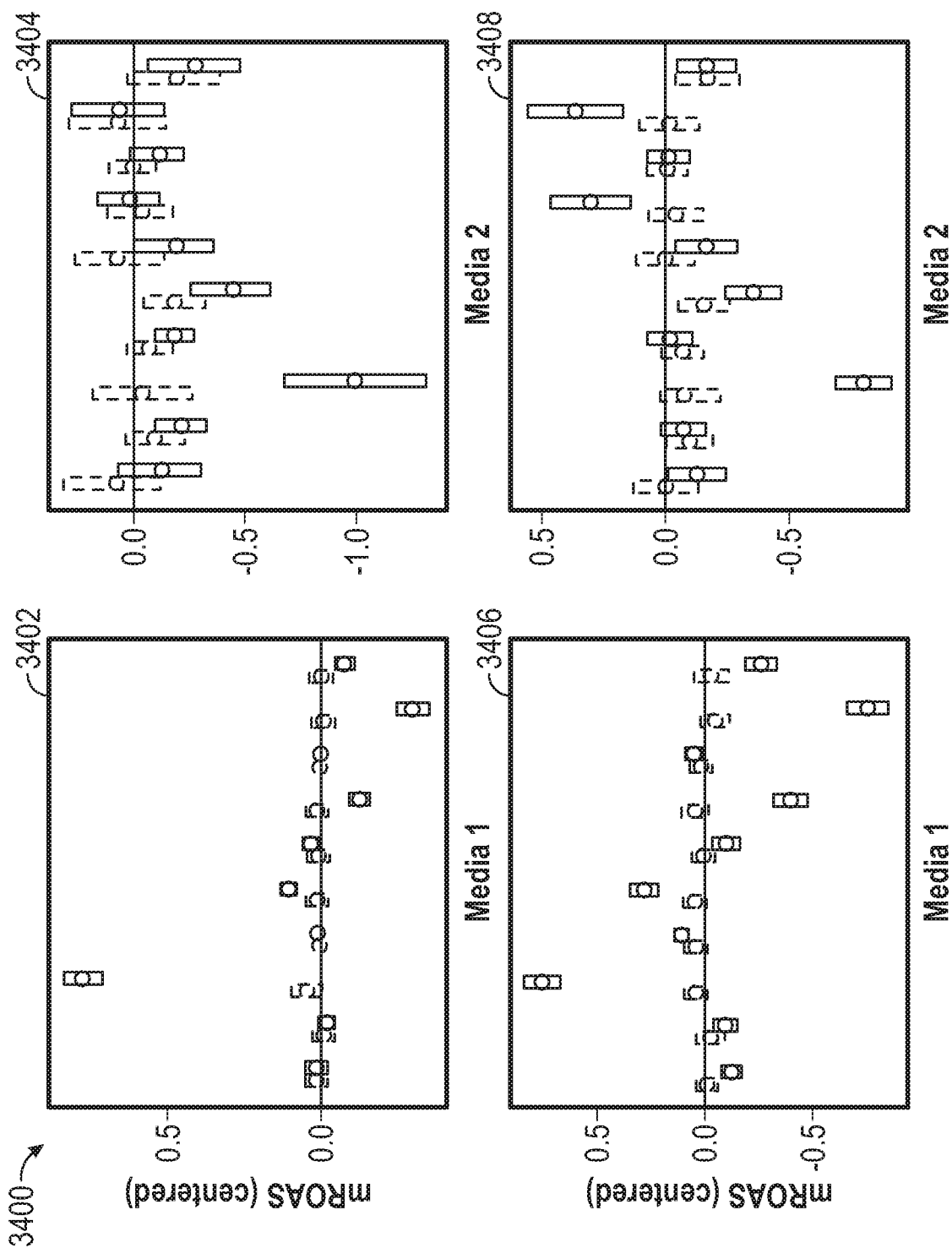
FIG. 34 is a set of charts comparing ROAS and mROAS for a brand Bayesian hierarchical media mix model generated based on priors generated by a category Bayesian hierarchical media mix model and a flat category Bayesian hierarchical media mix model according to an illustrative implementation.
Figure 35:
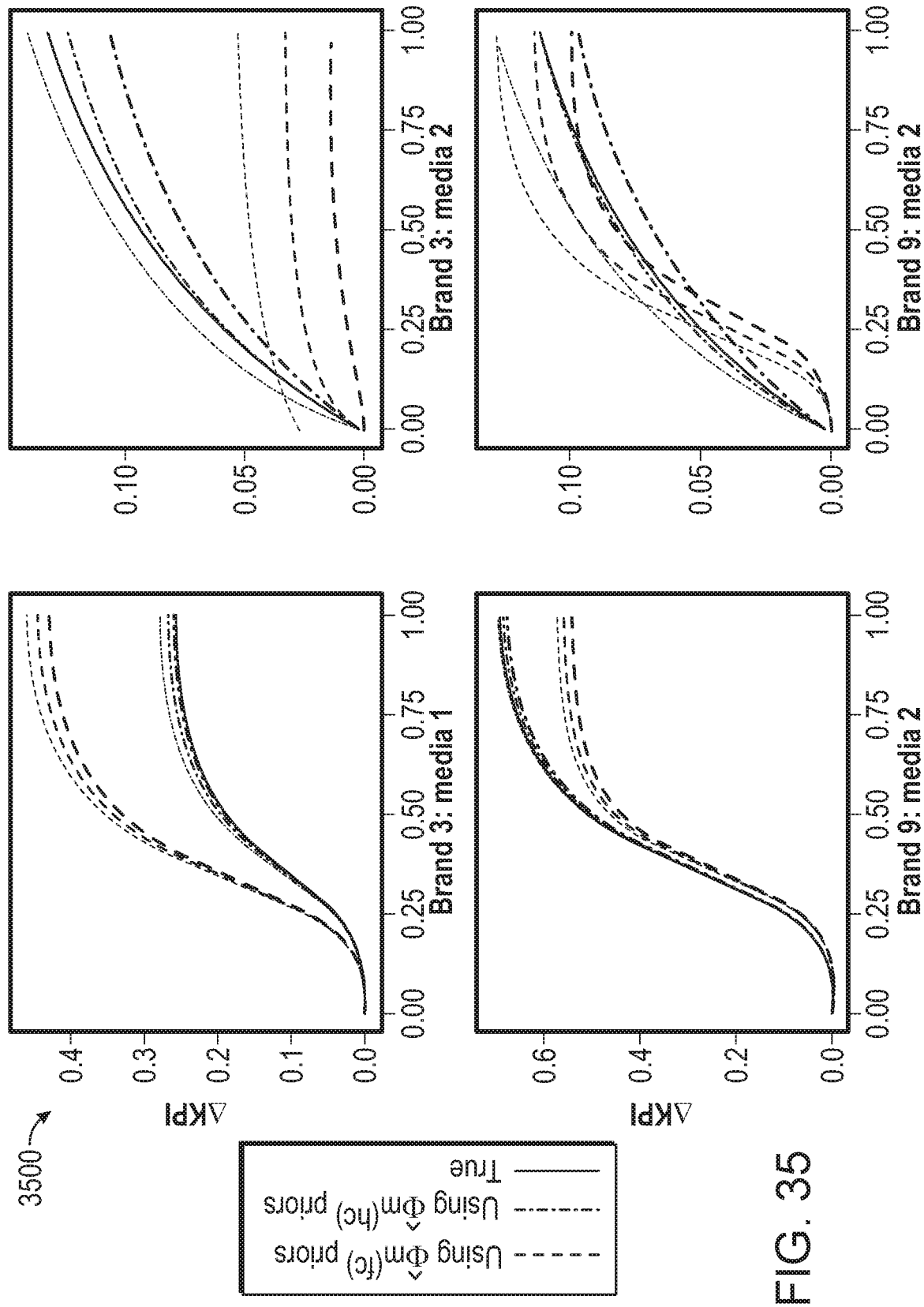
FIG. 35 is a set of charts comparing response curves for a brand Bayesian hierarchical media mix model generated based on priors generated by a category Bayesian hierarchical media mix model and flat category Bayesian hierarchical media mix model according to an illustrative implementation.

Referring to FIG. 34, charts 3400 illustrate a comparison of estimated average ROAS (charts 3402 and 3406) and mROAS (charts 3404 and 3408) of media 1 and 2 for the 10 brands simulated in as discussed with reference to FIGS. 18-20, after subtracting the true values.

The bottom level of each bar represents the 5th percentile of the estimated values, while the top level the 95th percentile and the dot the posterior mean.

Referring to FIG. 35, charts 3500 illustrate response curves of media 1 and 2 estimated by the brand-specific models using informative priors from the HCM and the FCM with 5th and 95th percentiles (in dotted lines), compared with the true response curve (in red), for an example dataset as discussed with further reference to FIGS. 18-20.

Figure 36:
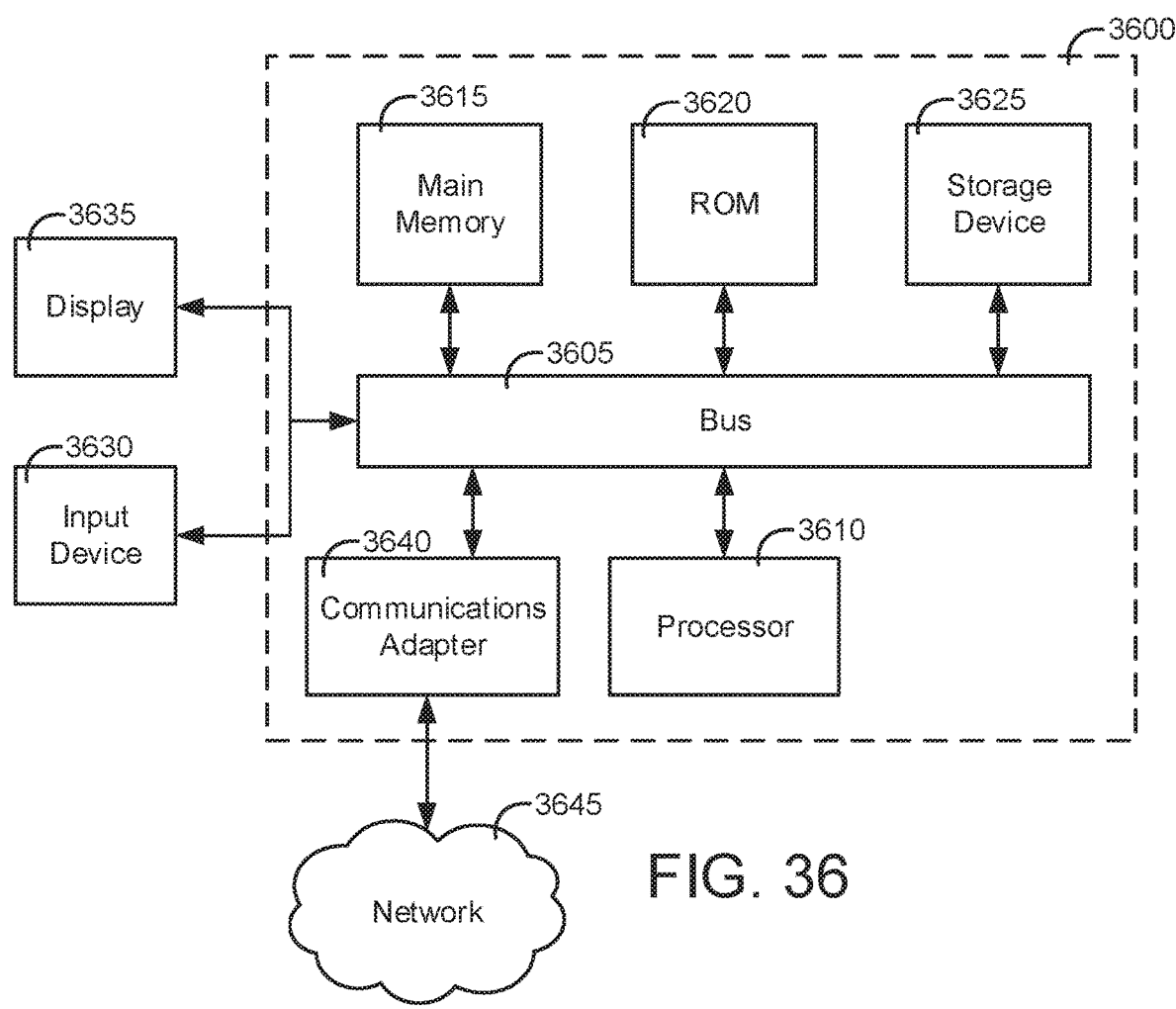
FIG. 36 is a block diagram of a computing system according to an illustrative implementation.

FIG. 36 illustrates a depiction of a computer system 3600 that can be used, for example, to implement an illustrative user device 104, an illustrative content management system 108, an illustrative content provider device 106, an illustrative analysis system 150, and/or various other illustrative systems described in the present disclosure. The computing system 3600 includes a bus 3605 or other communication component for communicating information and a processor 3610 coupled to the bus 3605 for processing information. The computing system 3600 also includes main memory 3615, such as a random access memory (RAM) or other dynamic storage device, coupled to the bus 805 for storing information, and instructions to be executed by the processor 3610. Main memory 3615 can also be used for storing position information, temporary variables, or other intermediate information during execution of instructions by the processor 3610. The computing system 3600 may further include a read only memory (ROM) 3620 or other static storage device coupled to the bus 3605 for storing static information and instructions for the processor 3610. A storage device 3625, such as a solid state device, magnetic disk or optical disk, is coupled to the bus 3605 for persistently storing information and instructions.

The computing system 3600 may be coupled via the bus 3605 to a display 3635, such as a liquid crystal display, or active matrix display, for displaying information to a user. An input device 3630, such as a keyboard including alphanumeric and other keys, may be coupled to the bus 3605 for communicating information, and command selections to the processor 3610. In another implementation, the input device 3630 has a touch screen display 3635. The input device 3630 can include a cursor control, such as a mouse, a trackball, or cursor direction keys, for communicating direction information and command selections to the processor 3610 and for controlling cursor movement on the display 3635.

In some implementations, the computing system 3600 may include a communications adapter 3640, such as a networking adapter. Communications adapter 3640 may be coupled to bus 3605 and may be configured to enable communications with a computing or communications network 3645 and/or other computing systems. In various illustrative implementations, any type of networking configuration may be achieved using communications adapter 3640, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 3600 in response to the processor 3610 executing an arrangement of instructions contained in main memory 3615. Such instructions can be read into main memory 3615 from another computer-readable medium, such as the storage device 3625. Execution of the arrangement of instructions contained in main memory 3615 causes the computing system 3600 to perform the illustrative processes described herein. One or more processors in a multi-processing arrangement may also be employed to execute the instructions contained in main memory 3615. In alternative implementations, hard-wired circuitry may be used in place of or in combination with software instructions to implement illustrative implementations. Thus, implementations are not limited to any specific combination of hardware circuitry and software.

Although an example processing system has been described in FIG. 36, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TELEVISION channel, on a satellite TELEVISION channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving a brand data set for each of a plurality of brands within a category, each brand data set comprising content input for a particular brand of the plurality of brands for a plurality of media channels at a plurality of times and a response for the particular brand of the plurality of brands at the plurality of times;
determining a plurality of informative priors by generating a category Bayesian hierarchical model based on the plurality of brand data sets for the plurality of brands and a plurality of weak priors; and
generating a brand Bayesian hierarchical model that models response for the particular brand for each of the plurality of media channels based on the brand data set for the particular brand and the plurality of informative priors, wherein generating the brand Bayesian hierarchical model based on the informative priors provides data anonymity of the plurality of brand data sets from the brand data set of the particular brand.

2. The method of claim 1, wherein generating the brand Bayesian hierarchical model that models response for a particular brand of the plurality of brands for each of the plurality of media channels comprises:
generating a joint empirical distribution based on the plurality of informative priors; and
generating the brand Bayesian hierarchical model for the particular brand based on the brand data set for the particular brand of the plurality of brands and the joint empirical distribution.

3. The method of claim 2, wherein generating the category Bayesian hierarchical model based on the joint empirical distribution comprises:
pseudo-randomly selecting a sample of the joint empirical distribution for each iteration of an iterative fitting algorithm; and
generating the brand Bayesian hierarchical model by fitting the brand Bayesian hierarchical model with the iterative fitting algorithm and the pseudo-randomly selected samples of the joint empirical distribution.

4. The method of claim 1, wherein the category Bayesian hierarchical model comprises a geometric adstock function and a Hill function, the geometric adstock function and the Hill function modelling carryover and shape effects for the category Bayesian hierarchical model; and
wherein the brand Bayesian hierarchical model comprises a second geometric adstock function and a second Hill function, the second geometric adstock function and the second Hill function modelling carryover and shape effects for the brand Bayesian hierarchical model.

5. The method of claim 1, the method further comprising:
scaling the content input of each brand data set between zero and one;
generating the category Bayesian hierarchical model based on the scaled content input of the plurality of brand data sets; and
generating the brand Bayesian hierarchical model based on the scaled content input of the brand dataset of the particular brand of the plurality of brands.

6. The method of claim 1, wherein generating the brand Bayesian hierarchical model comprises fitting a plurality of model parameters; and
wherein the method further comprises:
generating an average return on average spend for the particular brand for each of the plurality of media channels based on the plurality of model parameters; and
generating an incremental return on average spend for a particular increment of the content input for the particular brand for each of the plurality of media channels based on the plurality of model parameters.

7. The method of claim 1, wherein generating the category Bayesian hierarchical model comprises generating the category Bayesian hierarchical model based on one or more competitor variables so that the category Bayesian hierarchical model accounts for behavior of competitors of the particular brand of the plurality of brands.

8. The method of claim 7, wherein the competitor variables comprise a direct competitor product price variable and an indirect competitor product price variable; and
wherein the method further comprising generating the competitor product price variable and the indirect competitor product price variable based on the plurality of brand data sets.

9. The method of claim 8, wherein generating the direct competitor product price variable and the indirect competitor product price variable comprises:
generating a direct competitor group by grouping some of the plurality of brands into the direct competitor group based on product prices of the plurality of brands;

generating an indirect competitor group by grouping some of the plurality of brands into the indirect competitor group based on the product prices of the plurality of brands;

generating the direct competitor product price variable by generating a weighted average of competitor prices for direct competitor group; and generating the indirect competitor product price variable by generating a weighted average of competitor prices for the indirect competitor group.

10. A system comprising:

at least one computing device operably coupled to at least one memory and configured to:

receive a brand data set for each of a plurality of brands within a category, each brand data set comprising content input for a particular brand of the plurality of brands for a plurality of media channels at a plurality of times and a response for the particular brand of the plurality of brands at the plurality of times;

determine a plurality of informative priors by generating a category Bayesian hierarchical model based on the plurality of brand data sets for the plurality of brands and a plurality of weak priors; and generate a brand Bayesian hierarchical model that models response for the particular brand for each of the plurality of media channels based on the brand data set for the particular brand and the plurality of informative priors, wherein generating the brand Bayesian hierarchical model based on the informative priors provides data anonymity of the plurality of brand data sets from the brand data set of the particular brand.

11. The system of claim 10, wherein the computing device is configured to generate the brand Bayesian hierarchical model that models response for a particular brand of the plurality of brands for each of the plurality of media channels by:

generating a joint empirical distribution based on the plurality of informative priors; and generating the brand Bayesian hierarchical model for the particular brand based on the brand data set for the particular brand of the plurality of brands and the joint empirical distribution.

12. The system of claim 11, wherein the computing device is configured to generate the brand Bayesian hierarchical model based on the joint empirical distribution by:

pseudo-randomly selecting a sample of the joint empirical distribution for each iteration of an iterative fitting algorithm; and generating the brand Bayesian hierarchical model by fitting the brand Bayesian hierarchical model with the iterative fitting algorithm and the pseudo-randomly selected samples of the joint empirical distribution.

13. The system of claim 10, wherein the category Bayesian hierarchical model comprises a geometric adstock function and a Hill function, the geometric adstock function and the Hill function modelling carryover and shape effects for the category Bayesian hierarchical model; and wherein the brand Bayesian hierarchical model comprises a second geometric adstock function and a second Hill function, the second geometric adstock function and the second Hill function modelling carryover and shape effects for the brand Bayesian hierarchical model.

14. The system of claim 10, wherein the computing device is configured to:

scaling the content input of each brand data set between zero and one;

generating the category Bayesian hierarchical model based on the scaled content input of the plurality of brand data sets; and generating the brand Bayesian hierarchical model based on the scaled content input of the brand dataset of the particular brand of the plurality of brands.

15. The system of claim 10, wherein the computing device is configured to generate the brand Bayesian hierarchical model comprises fitting a plurality of model parameters; and wherein the computing device is configured to:

generate an average return on average spend for the particular brand for each of the plurality of media channels based on the plurality of model parameters; and generate an incremental return on average spend for a particular increment of the content input for the particular brand for each of the plurality of media channels based on the plurality of model parameters.

16. The system of claim 10, wherein the computing device is configured to generate the category Bayesian hierarchical model by generating the brand Bayesian hierarchical model based on one or more competitor variables so that the brand Bayesian hierarchical model accounts for behavior of competitors of the particular brand of the plurality of brands.

17. One or more computer-readable storage media having instructions stored thereon that, when executed by at least one processor, cause the at least one processor to perform operations comprising:

receiving a brand data set for each of a plurality of brands within a category, each brand data set comprising content input for a particular brand of the plurality of brands for a plurality of media channels at a plurality of times and a response for the particular brand of the plurality of brands at the plurality of times;

determining a plurality of informative priors by generating a category Bayesian hierarchical model based on the plurality of brand data sets for the plurality of brands and a plurality of weak priors; and generating a brand Bayesian hierarchical model that models response for the particular brand for each of the plurality of media channels based on the brand data set for the particular brand and the plurality of informative priors, wherein generating the brand Bayesian hierarchical model based on the informative priors provides data anonymity of the plurality of brand data sets from the brand data set of the particular brand; and wherein generating the brand Bayesian hierarchical model that models response for a particular brand of the plurality of brands for each of the plurality of media channels comprises:

generating a joint empirical distribution based on the plurality of informative priors; and generating the brand Bayesian hierarchical model for the particular brand based on the brand data set for the particular brand of the plurality of brands and the joint empirical distribution.

18. The one or more computer-readable storage medium of claim 17, wherein generating the brand Bayesian hierarchical model based on the joint empirical distribution comprises:

pseudo-randomly selecting a sample of the joint empirical distribution for each iteration of an iterative fitting algorithm; and generating the brand Bayesian hierarchical model by fitting the brand Bayesian hierarchical model with the iterative fitting algorithm and the pseudo-randomly selected samples of the joint empirical distribution.

19. The one or more computer-readable storage medium of claim 17, wherein the category Bayesian hierarchical model comprises a geometric adstock function and a Hill function, the geometric adstock function and the Hill function modelling carryover and shape effects for the category Bayesian hierarchical model; and wherein the brand Bayesian hierarchical model comprises a second geometric adstock function and a second Hill function, the second geometric adstock function and the second Hill function modelling carryover and shape effects for the brand Bayesian hierarchical model.

20. The one or more computer-readable storage medium of claim 17, the method further comprising:

scaling the content input of each brand data set between zero and one;

generating the category Bayesian hierarchical model based on the scaled content input of the plurality of brand data sets; and generating the brand Bayesian hierarchical model based on the scaled content input of the brand dataset of the particular brand of the plurality of brands.

\* \* \* \* \*